(12) United States Patent
Yamaji et al.

(10) Patent No.: US 8,558,871 B2
(45) Date of Patent: Oct. 15, 2013

(54) PLAYBACK DEVICE THAT CAN PLAY STEREOSCOPIC VIDEO, INTEGRATED CIRCUIT, PLAYBACK METHOD AND PROGRAM

(75) Inventors: Osamu Yamaji, Osaka (JP); Germano Leichsenring, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/394,837

(22) PCT Filed: Sep. 27, 2010

(86) PCT No.: PCT/JP2010/005804
§ 371 (c)(1),
(2), (4) Date: Mar. 8, 2012

(87) PCT Pub. No.: WO2011/039990
PCT Pub. Date: Apr. 7, 2011

(65) Prior Publication Data
US 2012/0169729 A1    Jul. 5, 2012

(30) Foreign Application Priority Data
Oct. 2, 2009   (JP) .................................. 2009-230394

(51) Int. Cl.
*H04N 13/00*   (2006.01)

(52) U.S. Cl.
USPC .......................................................... 348/42

(58) Field of Classification Search
USPC ............................................... 348/42, 46–49
IPC ....................................................... H04N 13/00
See application file for complete search history.

(56) References Cited

U.S. PATENT DOCUMENTS

| | | | |
|---|---|---|---|
| 7,002,618 B2 | 2/2006 | Lipton et al. | |
| 7,030,890 B1 | 4/2006 | Jouet et al. | |
| 7,519,278 B2 | 4/2009 | Ikeda et al. | |
| 7,583,888 B2 | 9/2009 | Ikeda et al. | |
| 7,609,948 B2 | 10/2009 | Ikeda et al. | |
| 7,853,125 B2 | 12/2010 | Ikeda et al. | |
| 7,856,169 B2 | 12/2010 | Ikeda et al. | |

(Continued)

FOREIGN PATENT DOCUMENTS

| | | |
|---|---|---|
| EP | 1501316 | 1/2005 |
| EP | 1863032 | 12/2007 |

(Continued)

OTHER PUBLICATIONS

Search report from E.P.O., mail date is Dec. 6, 2012.

(Continued)

*Primary Examiner* — Tung Vo
(74) *Attorney, Agent, or Firm* — Greenblum & Bernstein, P.L.C.

(57) ABSTRACT

Inconsistency between a left-view video image and a right-view video image possibly occurs in a playback device having a function of switching between a monoscopic playback mode for monoscopically playing back video images and a stereoscopic playback mode for stereoscopically playing back video images. The present invention aims to prevent such inconsistency when switching from the monoscopic playback mode to the stereoscopic playback mode. Specifically, the present invention prevents the inconsistency by invalidating a rendering request which is Graphics#drawImage, copying a content stored in the left-view graphics plane to a right-view graphics plane, switching a graphics plane setting after the copying, and then removing prohibition of a rendering request which is StereoGraphics#drawImage.

12 Claims, 37 Drawing Sheets

(56) References Cited

U.S. PATENT DOCUMENTS

| | | |
|---|---|---|
| 7,877,002 B2 | 1/2011 | Ikeda et al. |
| 7,949,225 B2 | 5/2011 | Ikeda et al. |
| 8,027,566 B2 | 9/2011 | Ikeda et al. |
| 2002/0154214 A1 | 10/2002 | Scallie et al. |
| 2003/0156188 A1 | 8/2003 | Abrams, Jr. |
| 2005/0030301 A1 | 2/2005 | Harrold et al. |
| 2005/0212798 A1 | 9/2005 | Lefebvre et al. |
| 2005/0248561 A1 | 11/2005 | Ito et al. |
| 2005/0262084 A1 | 11/2005 | Tomita |
| 2006/0078301 A1 | 4/2006 | Ikeda et al. |
| 2007/0286576 A1 | 12/2007 | Ikeda et al. |
| 2008/0008450 A1 | 1/2008 | Ikeda et al. |
| 2008/0008451 A1 | 1/2008 | Ikeda et al. |
| 2008/0010664 A1 | 1/2008 | Pelizza et al. |
| 2008/0018731 A1 | 1/2008 | Era |
| 2008/0025697 A1 | 1/2008 | Ikeda et al. |
| 2008/0201695 A1 | 8/2008 | Zhou |
| 2008/0232772 A1 | 9/2008 | Ikeda et al. |
| 2008/0232773 A1 | 9/2008 | Ikeda et al. |
| 2008/0232774 A1 | 9/2008 | Ikeda et al. |
| 2008/0266386 A1 | 10/2008 | Maeda |
| 2008/0267523 A1 | 10/2008 | Shimoyama et al. |
| 2009/0138934 A1 | 5/2009 | Aoki et al. |
| 2010/0118119 A1 | 5/2010 | Newton et al. |
| 2010/0226628 A1 | 9/2010 | Yamaji et al. |
| 2011/0080462 A1 | 4/2011 | Yamaji et al. |
| 2011/0261157 A1* | 10/2011 | Kiyama .................. 348/43 |
| 2012/0242802 A1* | 9/2012 | Tsukagoshi ............. 348/46 |

FOREIGN PATENT DOCUMENTS

| | | |
|---|---|---|
| JP | 4266774 | 2/2009 |
| WO | 2007/052736 | 5/2007 |
| WO | 2008/044191 | 4/2008 |
| WO | 2010/095403 | 8/2010 |

OTHER PUBLICATIONS

U.S.A. Office action, mail date is Nov. 27, 2012.

* cited by examiner

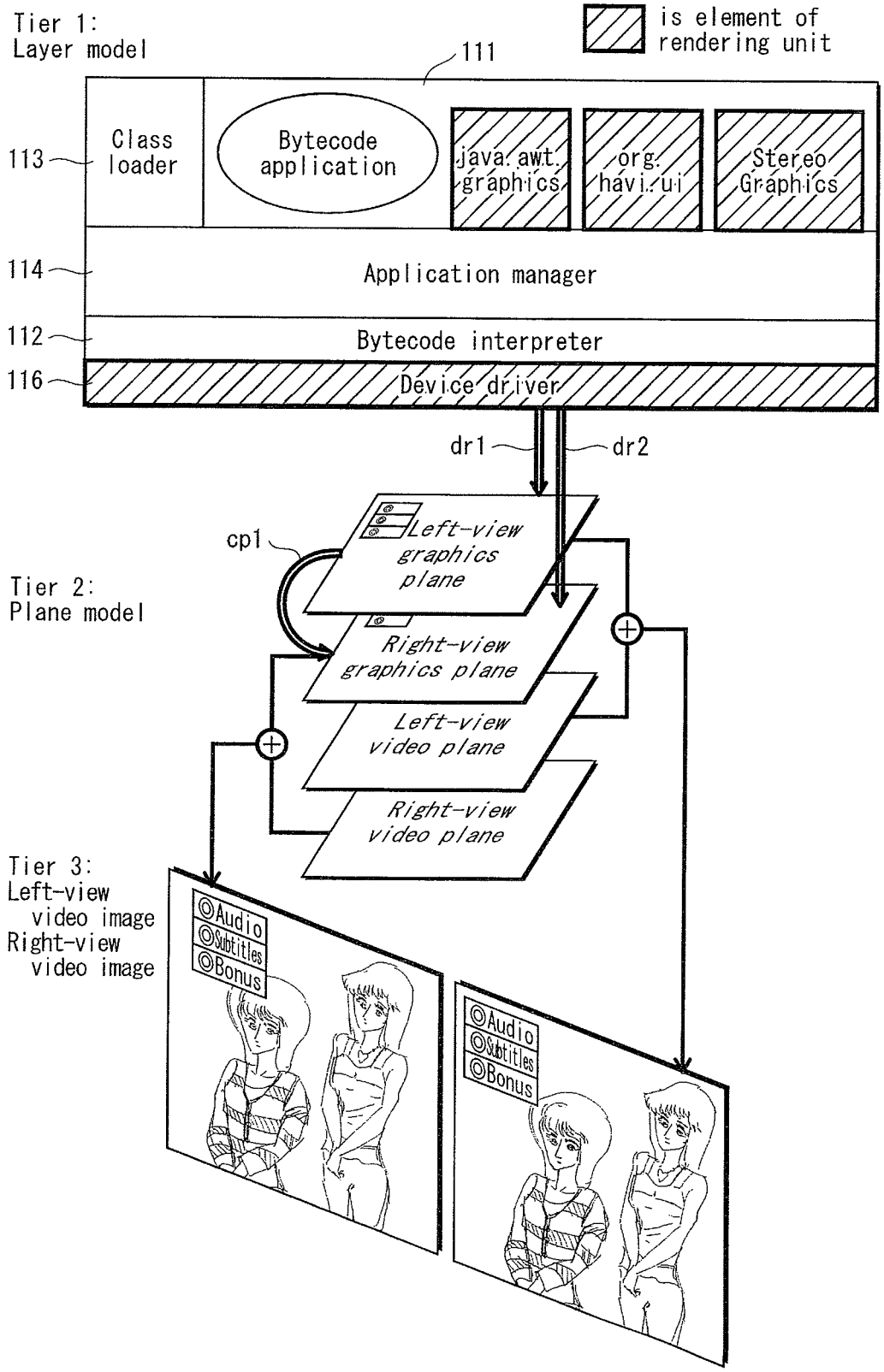

FIG. 7C 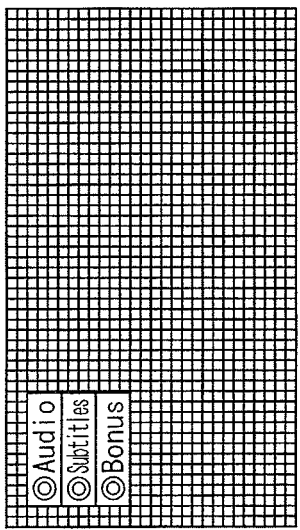 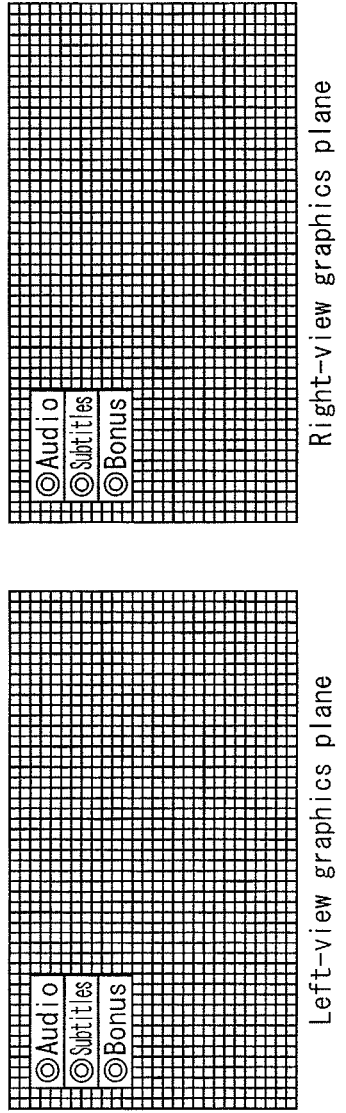

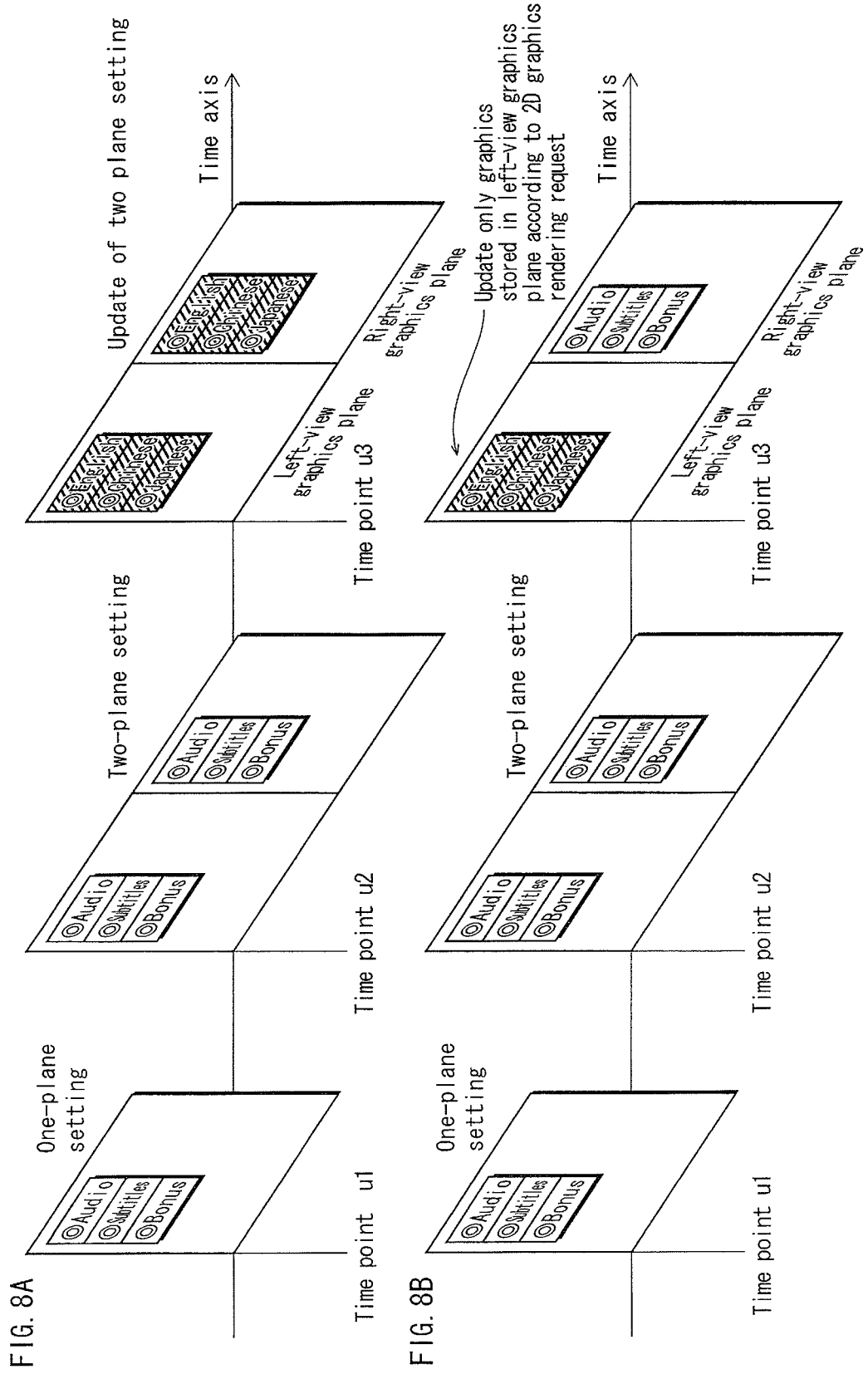

FIG. 9A java.awt.Graphics#drawImage

First argument: rendering positions  $(x_1, y_1)$  $(x_2, y_2)$
Second argument: rendering image (Image1)

FIG. 9B

StereoGraphics#drawImage

First argument: rendering position $(x_1, y_1)$ $(x_2, y_2)$
                in left-view graphics plane
Second argument: rendering image (Image1)
                in left-view graphics plane
Third argument: rendering position $(x_3, y_3)$ $(x_4, y_4)$
                in right-view graphics plane
Fourth argument: rendering image (Image2)
                in right-view graphics plane

FIG. 9C

HScreen#setConfiguration

First argument: resolution (width × height)
Second argument: number of graphics planes (number1)

FIG. 10A

| Type | Image copy (java.awt.Graphics#drawImage) |
|---|---|
| Rendering position | x1 = 50, y1 = 100, x2 = 250, y2 = 170 |
| Rendering image | Bitmap image 1 (width of 200, height of 70) |

FIG. 10B

| Type | Left-view and right-view simultaneous image copy (StereoGraphics#drawImage) |
|---|---|
| Rendering position in left-view graphics plane | x1 = 50, y1 = 100, x2 = 250, y2 = 170 |
| Rendering image for left-view graphics plane | Bitmap image 2 (width of 200, height of 70) |
| Rendering position in right-view graphics plane | x1 = 55, y1 = 100, x2 = 255, y2 = 170 |
| Rendering image for right-view graphics plane | Bitmap image 3 (width of 200, height of 70) |

FIG. 10C

| Type | Mode switching request (HScreen#setConfiguration) |
|---|---|
| Resolution | 1920x1080 |
| Graphics plane setting | Two-plane setting |

Tier 1:

Tier 2:
Stack for
thread-to-thread
transfer

Tier 3:
Elements of
rendering unit

Tier 4:
Plurality of
plane memories
and output system

FIG. 14A 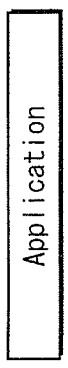 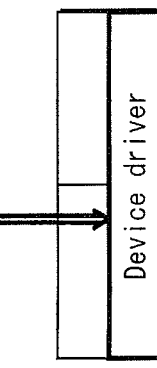
FIG. 14B 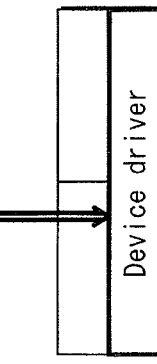 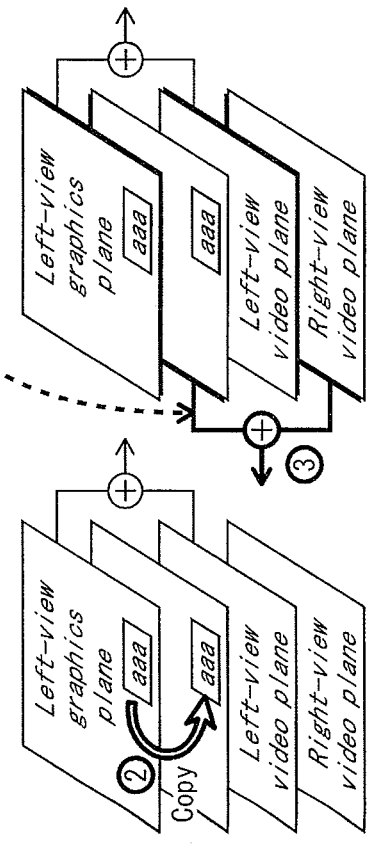
FIG. 14C 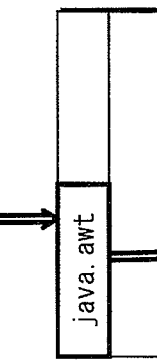 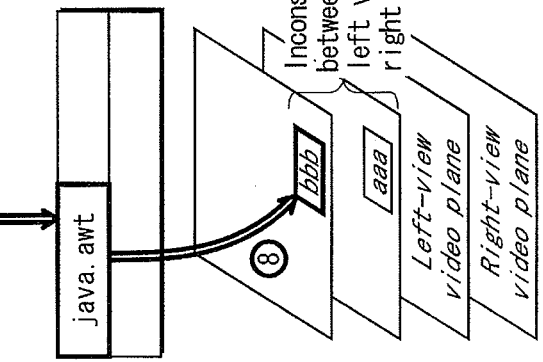
FIG. 14D 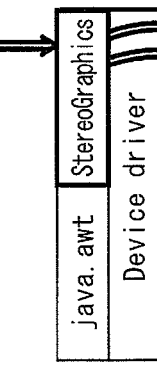 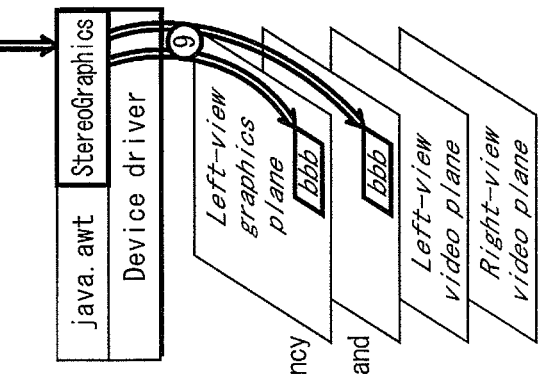

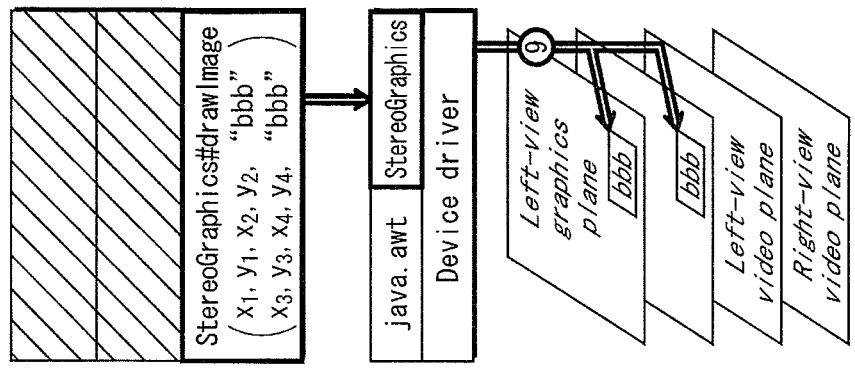
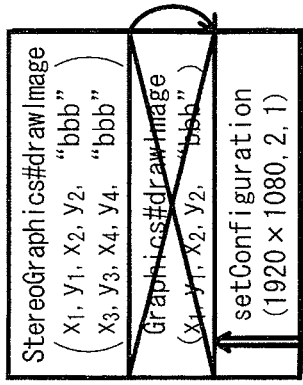
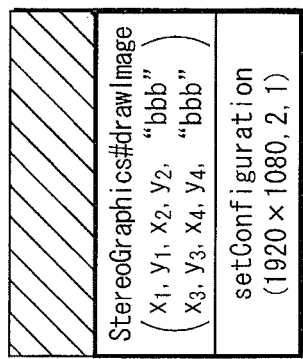
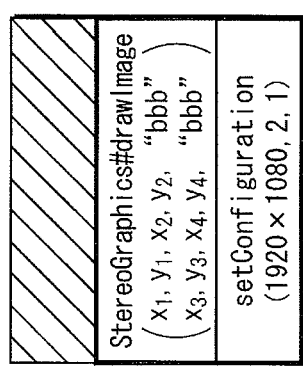
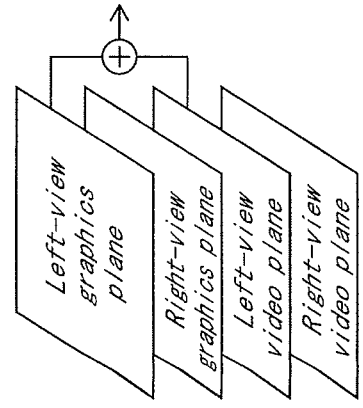
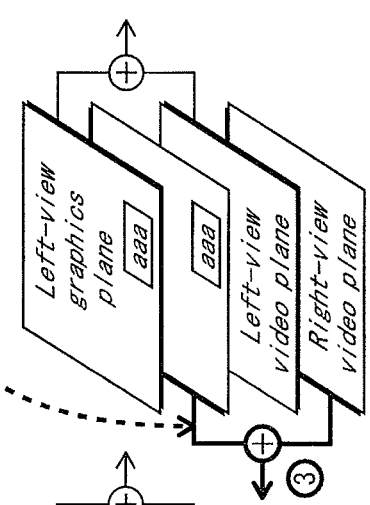
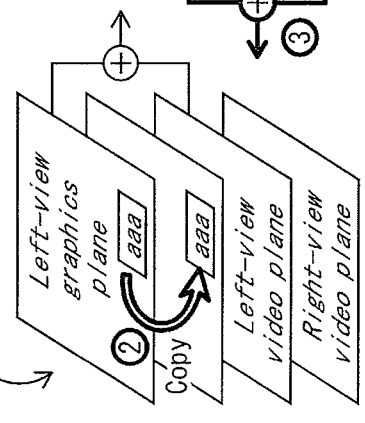
FIG. 16A  FIG. 16B  FIG. 16C  FIG. 16D

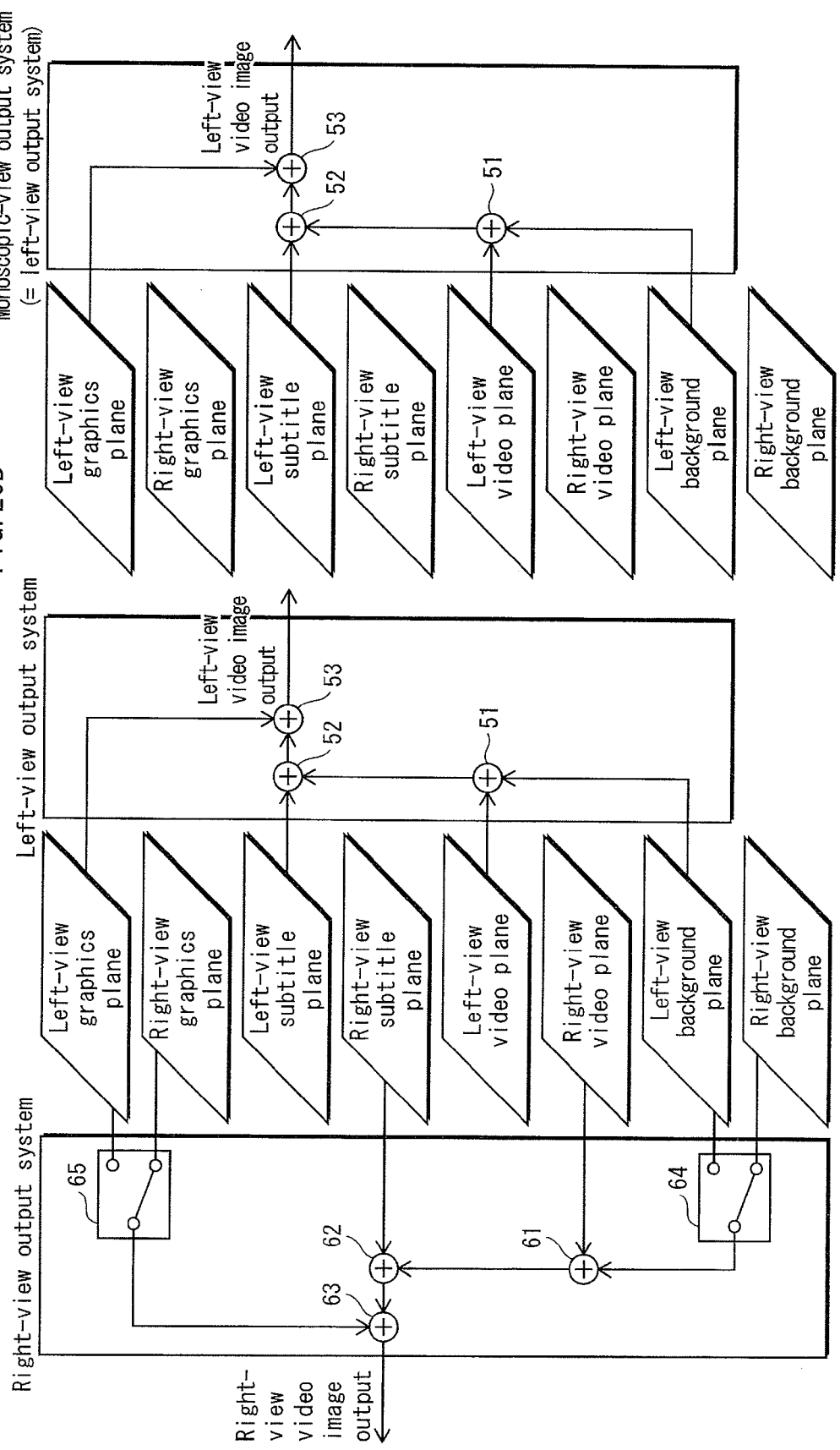

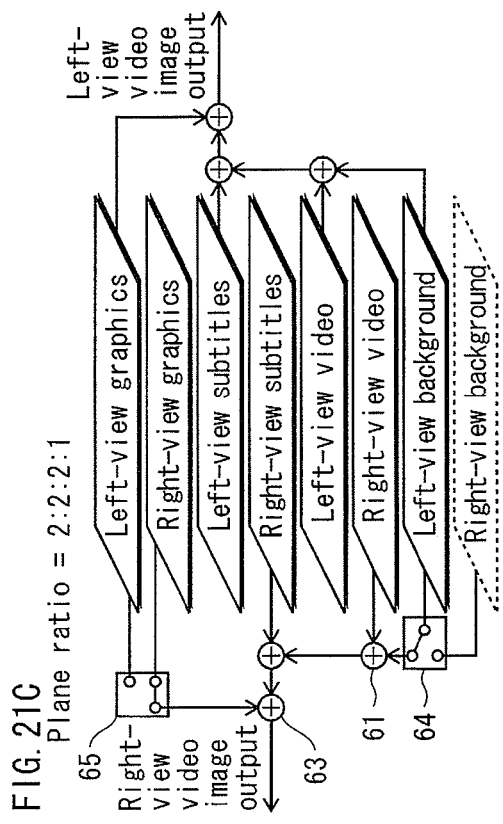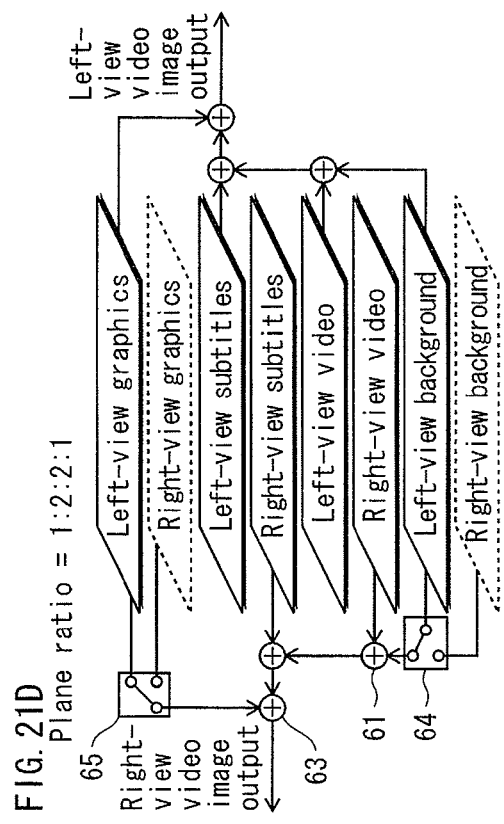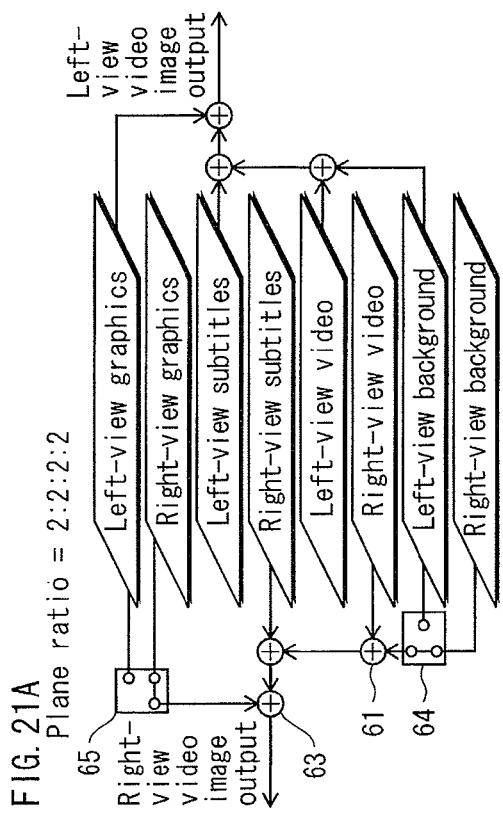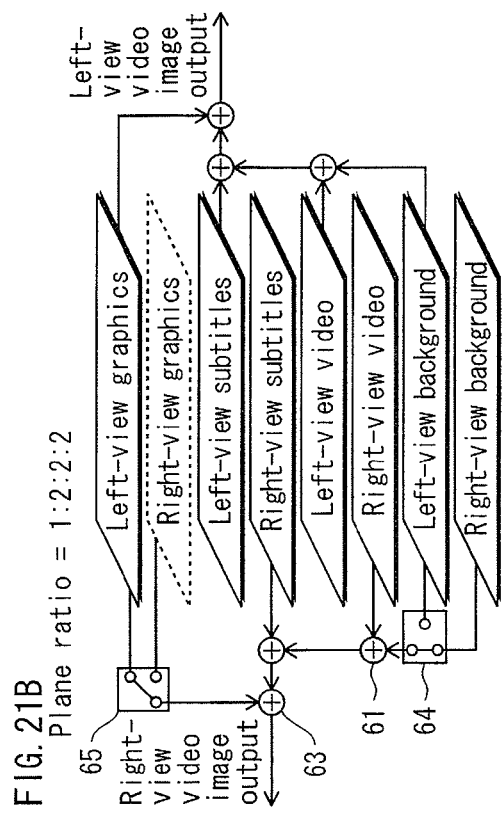

FIG. 22A java.awt.Graphics#drawImage

First argument: rendering positions $(x_1, y_1)$ $(x_2, y_2)$
Second argument: rendering image (Image1)

FIG. 22B

StereoGraphics#drawImage

First argument: rendering position $(x_1, y_1)$ $(x_2, y_2)$
  in left-view graphics plane
Second argument: rendering image (Image1)
  in left-view graphics plane
Third argument: rendering position $(x_3, y_3)$ $(x_4, y_4)$
  in right-view graphics plane
Fourth argument: rendering image (Image2)
  in right-view graphics plane

FIG. 22C

HScreen#setConfiguration

First argument: resolution (width × height)
Second argument: number of graphics planes (number1)
Third argument: number of background planes (number2)

FIG. 22D

StereoGraphics#drawBGImageMono

First argument: bitmap image file (width × height)

FIG. 22E

StereoGraphics#drawBGImageStereo

First argument: bitmap image file (width × height)
Second argument: bitmap image file (width × height)

FIG. 23A  Image rendering request

| Type | Image copy (java.awt.Graphics#drawImage) |
|---|---|
| Rendering position | x1 = 50, y1 = 100, x2 = 250, y2 = 170 |
| Rendering image | Bitmap image 1 (width of 200, height of 70) |

FIG. 23B  Left/right image rendering request

| Type | Left-view and right-view simultaneous image copy (StereoGraphics#drawImage) |
|---|---|
| Rendering position in left-view graphics plane | x1 = 50, y1 = 100, x2 = 250, y2 = 170 |
| Rendering image for left-view graphics plane | Bitmap image 2 (width of 200, height of 70) |
| Rendering position in right-view graphics plane | x1 = 55, y1 = 100, x2 = 255, y2 = 170 |
| Rendering image for right-view graphics plane | Bitmap image 3 (width of 200, height of 70) |

FIG. 23C  Composition mode switching request

| Type | Mode switch request (HScreen#setConfiguration) |
|---|---|
| Resolution | 1920x1080 |
| Graphics plane setting | Two-plane setting |
| Background plane setting | One-plane setting |

FIG. 23D  Background rendering request (one-plane setting)

| Type | Background image rendering (StereoGraphics#drawBGImageMono) |
|---|---|
| Rendering image | Bitmap image 4 (width of 1920, height of 1080) |

FIG. 23E  Background rendering request (two-plane setting)

| Type | Background image rendering (StereoGraphics#drawBGImageStereo) |
|---|---|
| Rendering image (left) | Bitmap image 5 (width of 1920, height of 1080) |
| Rendering image (right) | Bitmap image 6 (width of 1920, height of 1080) |

PLAYBACK DEVICE THAT CAN PLAY STEREOSCOPIC VIDEO, INTEGRATED CIRCUIT, PLAYBACK METHOD AND PROGRAM

TECHNICAL FIELD

The present invention belongs to a technical field of graphics rendering technology by a bytecode application.

BACKGROUND ART

The bytecode application refers to an executable program obtained by compiling a class structure written in an object-oriented programming language. The bytecode application is described in machine-independent code (bytecode). One typical example of a bytecode application is a Java application.

The bytecode application is provided with various functions by a middleware. Each of the functions is provided to the bytecode application by calling a member function of a package implemented by the middleware. The package implemented by the middleware includes a library of programs used for rendering processes. Examples of the rendering processes include drawing of graphical objects such as lines and rectangles with a specified color, filling of a specified area, and copying and pasting of a specified image. The middleware is provided with a rendering unit that executes graphics rendering using the functions included in the library. The bytecode application successively issues requests for appropriate rendering processes to realize various processes of rendering graphics. One example of the package is java.awt and application program interfaces for graphics rendering are methods of the java.awt package. A platform used for activating the bytecode application is structured on the premises of monoscopic playback. The present invention is not limited to this, and the platform is structured on the premises of stereoscopic playback in some cases. The platform structured on the premises of the stereoscopic playback has a left-view graphics plane and a right-view graphics plane. These graphics planes are used in accordance with a mode (monoscopic mode or stereoscopic mode).

In addition, a Patent Literature 1 recites technology that ensures consistency between video images outputted before and after switching between the monoscopic mode and the stereoscopic mode by preparing video images in a way that the images before and after the mode switching appear to be the same.

CITATION LIST

Japanese Patent Application Publication Patent No. 4266774

SUMMARY OF INVENTION

Technical Problem

It is desired to facilitate user operation during playback of stereoscopic content by activating an application and causing the application to render GUI that is in synchronization with playback of moving images. This idea is based on technology of realizing advanced processing that causes the application to perform GUI processing in conjunction with the existing DVD-MHP content or BD-ROM content. Content creators desire to apply this technology to the stereoscopic content.

When executed, the bytecode application and java.awt.Graphics are processed by a plurality of threads. Also, thread-to-thread transfer of parameters is performed through stacks. Therefore, a large time lag occurs between a graphics rendering request being made by the bytecode application and the request being received. Therefore, the following case is not rare. That is, after the java.awt.Graphics accepts the mode switching request made by one of the application threads, the java.awt.Graphics receives a 2D graphics rendering request made by another application thread.

Because the 2D graphics rendering request arrives with delay, the graphics is written in only the left-view graphics plane from among the right-view graphics plane and the left-view graphics plane that have been reserved according to the mode switching, in response to the 2D graphics rendering request. In such a case, inconsistency between the right-view and left-view graphics occur, which makes the viewer uncomfortable.

Even if the inconsistency between the left view and right view occurs due to the 2D graphics rendering request, a period in which the inconsistency exists can be very short if the graphics is updated in response to an immediate issuance of a subsequent 3D graphics rendering request. However, even if the inconsistency between the left view and the right view exists for a short period of time at a time of stereoscopic playback, such inconsistency makes the viewer very uncomfortable. As a result, the viewer possibly hates viewing stereoscopic content from such uncomfortable experience, and possibly adversely reacts to products relating to stereoscopic content. No matter how long such a period is, the inconsistency between the left view and the right view is not acceptable.

In order to avoid such inconsistency between left-view and right view graphics, it is possible that manufacturers may define uniform rules for generating applications. However, applications for displaying content-specific GUIs are uniquely generated by content providers. Even if generation of the applications in accordance with the uniform rules is desired in view of playback quality, the manufactures cannot just force the content providers to accept such a desire.

The present invention has an objective to provide a playback device that does not make the viewer uncomfortable even if a long time lag occurs between the bytecode making a rendering request and the rendering unit receiving it.

Solution to Problem

A playback device that can solve the above-stated problem is a playback device, comprising: a platform unit operable to activate and execute a bytecode application, the bytecode application issuing a 2D graphics rendering request and a 3D graphics rendering request; and a pair of a left-view graphics plane and a right-view graphics plane that are used according to a current plane setting, the plane setting being one of: a one-plane setting with which only the left-view graphics plane is used at a time of monoscopic playback; and a two-plane setting with which the pair is used at a time of stereoscopic playback, wherein the platform unit includes a rendering unit operable to: switch between the one-plane setting and the two-plane setting; render graphics on the left-view graphics plane in response to the 2D graphics rendering request when the current plane setting is the one-plane setting; and render graphics on the pair in response to the 3D graphics rendering request when the current plane setting is the two-plane setting, and the rendering unit switches from the one-plane setting to the two-plane setting by: invalidating a newly-issued 2D graphics rendering request; copying graphics stored in the left-view graphics plane to the right-view graphics plane; and accepting the 3D graphics rendering request after the copying.

Advantageous Effects of Invention

The playback device having the above-stated solution invalidates the 2D graphics rendering request when switching from the one plane setting to the two-plane setting. Therefore, even if the 2D graphics rendering request reaches the rendering unit after the switching from the one-plane setting to the two-plane setting, the 2D graphics rendering request is invalidated before the content stored in the left-view graphics plane is copied to the right-view graphics plane.

The content stored in the left-view graphics plane is copied to the right-view graphics plane after the 2D graphics rendering request on a stack is temporarily invalidated. Therefore, it is unlikely that only the content stored in the left-view graphics plane is updated in response to the 2D graphics rendering request that has reached the rendering unit after the switching has been made from the one plane setting to the two-plane setting. Accordingly, even if the manufacture of the playback device activates an application generated by a content provider to display the 3D graphic, the manufacture can give its enough attention to maintain playback quality of stereoscopic contents so as to avoid making the viewer of the 3D graphics feel uncomfortable.

The 2D graphics rendering request is invalidated before the content stored in the left-view graphics plane is copied to the right-view graphics plane. Therefore, a case does not occur in which only the content stored in the left-view graphics plane is updated part way through copying of the content stored in the left-view graphics plane to the right-view graphics plane. It is possible to eliminate possibility that pixels that have been copied to the right-view graphics plane from among the pixels stored in the left-view graphics plane are subsequently rewritten in response to the 2D graphics rendering request part way through the copying between the planes.

When the switching is made from the one-plane setting to the two-plane setting, it is reliably ensured that the content stored in the left-view graphics plane and the content stored in the right-view graphics plane are the same. Therefore, the inconsistency between the left view and the right view will not occur even for a short period of time. Therefore, it is possible to make improvement such that the 3D graphics has perfect quality.

The 2D graphics rendering request is invalidated after the one-plane setting is switched to the two-plane setting. This eliminates the possibility that only the content stored in one of the graphics planes is rewritten. Thus, the quality of the 3D graphics rendered by the application is ensured by the platform of the application. Therefore, the content providers can let the manufactures to maintain the quality of the 3D graphics rendered by the application. In such a way, the content providers can concentrate on generating the stereoscopic contents. Therefore, the generation of the stereoscopic contents can be greatly accelerated, and thus it is possible to provide the enhanced stereoscopic contents.

Even if time lag occurs between the bytecode application making the rendering request and the rendering module receiving the rendering request, the time lag does not cause degradation of the quality of the stereoscopic video images. Therefore, even implementation of software is acceptable that causes the time lag between the bytecode application making the rendering request and the rendering module receiving the rendering request. Software implementation when the manufactures develop playback devices can be flexible. Therefore, development of the playback devices can be accelerated, and it is possible to provide enhanced playback devices that can perform stereoscopic playback.

The following case is possible with current software implementation in the playback device. That is, the 2D graphics rendering request is processed by the java.awt.Graphics, the device driver of the playback device copies the content stored in the left-view graphics plane to the right-view graphics plane, and the java.awt.Graphics and the device driver are executed in parallel. However, according to the present invention, the 2D graphics rendering request is invalidated before the content stored in the left-view graphics plane is copied to the right-view graphics plane. Therefore, it is possible, even with software implementation form in which the java.awt.Graphics and the device driver are executed in parallel, to reliably ensure that the content stored in the left-view graphics plane and the content stored in the right-view graphics plane are the same when the current plane setting is the two-plane setting. Therefore, the software implementation can be flexible for the manufactures of the playback devices.

The above-stated playback device may be configured as follows if desired. For example, the playback device may further comprise: a decoder operable to decode a stereoscopic video stream stored on a recording medium to obtain left-view picture data and right-view picture data; a left-view video plane operable to store therein the left-view picture data; a right-view video plane operable to store therein the right-view picture data; a left-view composition unit operable to composite the graphics stored in the left-view graphics plane with the left-view picture data; and a right-view composition unit operable to composite one of the graphics stored in the left-view graphics plane and graphics stored in the right-view graphics plane with the right-view picture data, wherein the composition unit starts to composite the graphics stored in the right-view graphics plane with the right-view picture data after the rendering unit has copied the graphics stored in the left-view graphics plane to the right-view graphics plane, and the rendering unit performs the acceptance of the 3D graphics rendering request after the composition unit has composited the graphics stored in the right-view graphics plane with the right-view picture data.

With such a structure, content stored in the video plane and the content stored in the graphics plane will not be composited and outputted until the content stored in the left-view graphics plane has been copied to the right-view graphics plane. Therefore, the graphics will not be composited with the moving image and outputted to the viewer with inconsistency between the content stored in the left-view graphics plane and the content stored in the right-view graphics plane. Thus, it is possible to maintain perfect consistency between the graphics to be viewed by the left eye and the graphics to be viewed by the right eye.

BRIEF DESCRIPTION OF DRAWINGS

FIG. 4 is a block diagram showing a functional structure of a rendering unit 115.

FIGS. 7A, 7B and 7C show copy processing between planes.

FIGS. 8A and 8B show graphics update after switching from a one-plane setting to a two-plane setting.

FIGS. 9A, 9B and 9C show one example of API of graphics rendering functions supported by a BD-J module 15.

FIGS. 10A, 10B and 10C show a specific example of making rendering request that can be defined by an application program interface shown in FIGS. 8A and 8B.

FIGS. 14A, 14B, 14C and 14D show, in a continuous photographic manner, how a plurality of code pieces in the stack are processed, when the mode switching is performed without invalidation.

FIGS. 16A, 16B, 16C and 16D show, in a continuous photographic manner, how a plurality of API call code pieces in the stack are processed, when the mode switching is performed after invalidation.

FIGS. 20A and 20B show a layer structure of the plane memories and the structural elements of the composition unit.

FIGS. 21A, 21B, 21C and 21D respectively show four composition modes (composition modes 1, 2, 3 and 4) that are performed when the plane composition unit 20 switch among four types of output systems.

FIGS. 22A, 22B, 22C, 22D and 22E show one example of API of graphics rendering functions supported by a BD-J module 15.

FIGS. 23A, 23B, 23C, 23D and 23E show an example of the call code of API of the graphics rendering functions shown in FIGS. 22A, 22B, 22C, 22D and 22E.

DESCRIPTION OF EMBODIMENTS

The following describes embodiments of a playback device, an integrated circuit, a playback method and a program that are included in the present application, with reference to the drawings.

The playback device having the above-described means for solving the problems can be implemented as a player device that plays back the package media. The integrated circuit including the above-mentioned solution to problems can be implemented as a system LSI included in the player device. The playback method can be implanted as a time-series procedure realized by such player device. The program is recorded in a computer readable recording medium, and can be implemented as an executable format program that is installed in the player device.

1. Usage Pattern of Playback Device

Figure 1:
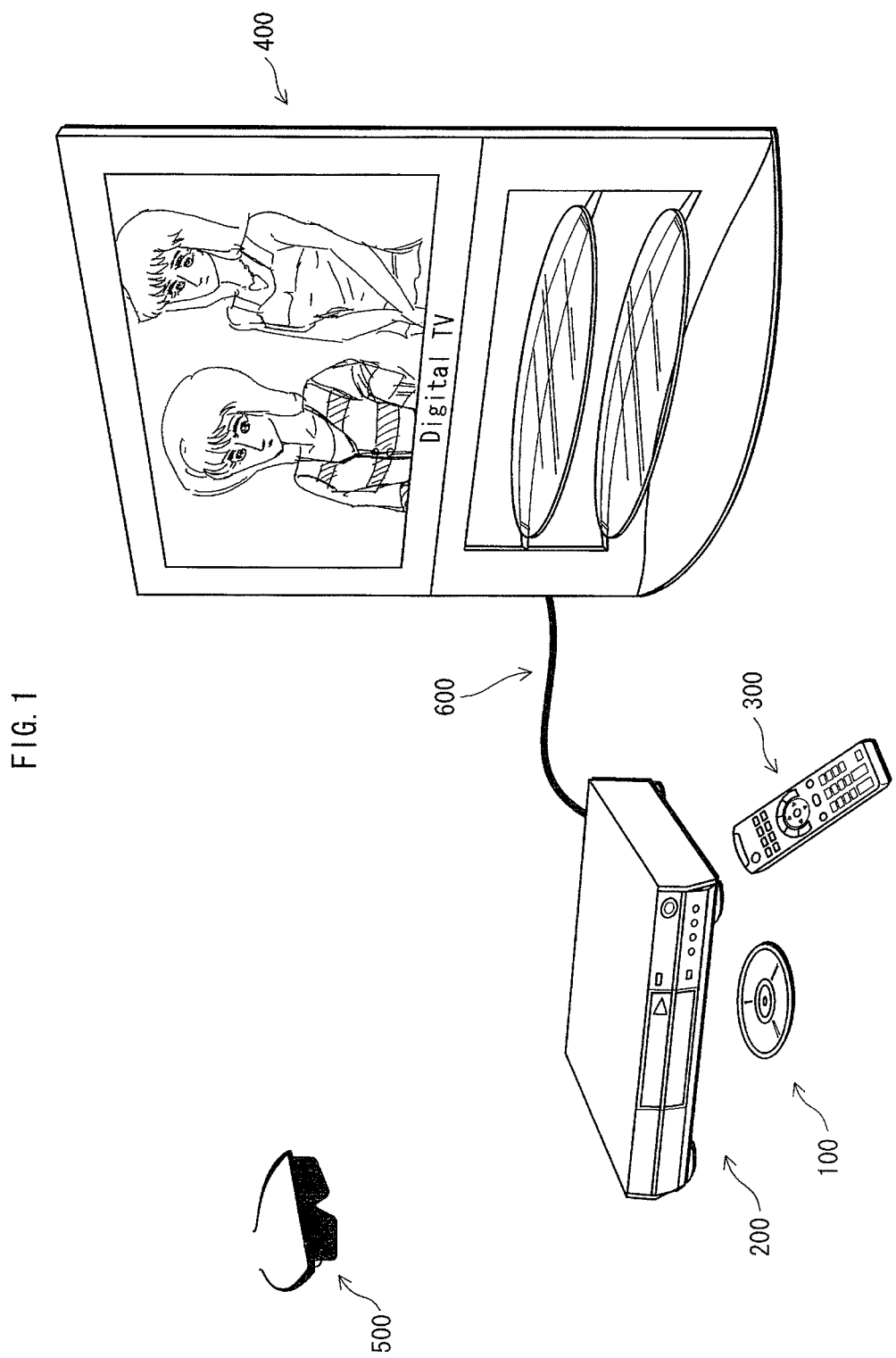
FIG. 1 shows a home theater system that is composed of a recording medium (package media), a playback device (player device), a display device and glasses.

FIG. 1 shows a home theater system that is composed of a recording medium (package media), a playback device (player device), a display device and glasses. As shown in FIG. 1, the above-mentioned recording medium (package medium) and playback device (player device) compose the home theater system together with the display device, the glasses and a remote control, and are used by the user.

1.1 Recording Medium 100

The recording medium 100 is an optical disc that supplies movies, for example, to the above-mentioned home theater system.

1.2 Playback Device 200

The playback device 200 is connected to a TV 400, and plays back the recording medium 100. Such playback is performed by repeating output of left-view video images (L images) and output of right-view video images (R images) alternately. In such a way, video images are played back as 2D video images and 3D video images. The 2D video images are also referred to as monoscopic video images. The 2D video images are expressed by pixels in presentation positions of the display screen positioned on an X-Y plane, with the X-Y plane being a plane including such a display screen of the display device. The playback mode of the playback device for playing back the 2D video images is referred to as a "2D playback mode" or a "monoscopic playback mode". Graphics that is displayed by the playback device in the 2D playback mode is referred to as "2D graphics".

The 3D video images, on the other hand, are images to which depth in a Z direction is added, with a Z axis being a straight line that is orthogonal to the plane (X-Y plane in the above). The playback mode of the playback device for playing back the 3D video images is referred to as a "3D playback mode" or a "stereoscopic playback mode". Graphics that is displayed by the playback device in the 3D playback mode is referred to as "3D graphics".

1.3 Remote Control 300

The remote control 300 is a device that receives an operation for hierarchized GUI from the user. The remote control 300 is for receiving the operation. The remote control 300 includes a menu key for calling a menu constituting GUI, an arrow key for moving a focus among GUI components constituting the menu, an enter key for activating the GUI component currently focused, and a return key for going back to a superordinate page of the hierarchically organized menu, and numeric keys.

1.4 TV 400

TV 400 (also referred to as a display device 400) receives video output from the playback device 200 and alternately outputs L-images and R-images with the same timing. The respective timings are brought into agreement by setting the frame rate at which video images are output to be equal to the frame rate at which display is switched. Alternatively, the frame rate at which display is switched may be multiplied in order to reduce the burden imposed on the eyes of the viewer. In this case, the display device 400 accumulates a pair of L-image and R-image that are output in a row and switches the accumulated images at high speed. As a result, display is executed at high frame rate.

1.5 Shutter Glasses 500

The shutter glasses 500 are composed of liquid crystal shutters and a control unit and enables the user to realize stereoscopic viewing by using binocular parallax. The liquid crystal shutters of the shutter glasses 500 are made with liquid crystal lenses having the property that the optical transmittance varies with the voltage applied thereto. The control unit of the shutter glasses 500 receives from the playback device a synchronous signal indicating the switching between the output of R-images and L-images and switches between first and second states according to the synchronous signal.

In the first state, the application voltage is controlled so that the liquid crystal lens for the right eye becomes non-transparent and that the liquid crystal lenses for left eye becomes transparent. In this state, an L-image is perceived by the left eye but not by the right eye.

In the second state, the application voltage is controlled so that the liquid crystal lens for the right eye becomes transparent and that the liquid crystal lens for the left eye become non-transparent. In this state, an R-image is perceived by the right eye but not by the left eye.

In general, an R-image and an L-image in a stereo pair represent the right view and left view in such a manner that the same object appears slightly differently due to the difference between positions at which the respective images are captured.

By making an adjustment such that the apparent difference corresponds to the difference as perceived by the left and right eyes (i.e., corresponds to the binocular parallax), the human perception system creates an illusion of a stereoscopic image. Accordingly, the shutter glasses 500 are controlled to switch between the first state and the second state in synchronism with the switching between R-image output and L-image output, the viewer creates an illusion of depth in an monoscopic image (i.e., flat image). The following now describes the time interval at which R- and L-images are displayed.

More specifically, when monoscopically displayed, each pair of an R-image and an L-image are slightly different from each other and the difference corresponds to the human parallax. By sequentially presenting such images alternately at short intervals, the human visual system perceives the images stereoscopically. The duration of this time interval should be short enough for the human visual system to create an optical illusion that a three-dimensional (i.e., stereoscopic) image is displayed. In the present embodiment, each frame period, which is a display cycle used by the television set 400 when playing back a video stream is divided into two. The halves of each frame period are allocated one to an R-image and the other to an L-image, so that the R- and L-images are alternated at the time intervals each having a duration corresponding to half a frame period. A half a frame period allocated for displaying an image to the left eye is referred to as a "left-view period" in which an image, whereas a half a frame period allocated for displaying an image to the right eye is referred to as a "right-view period". When one frame period is equal to $\frac{1}{24}$ second, then the left-view period and the right-view period are each equal to $\frac{1}{48}$ second. When one frame period is equal to $\frac{1}{60}$ second, then the left-view period and the right-view period are each equal to $\frac{1}{120}$ second.

First Embodiment

From among a plurality of embodiments of a playback device having the above-described means for solving the problems, the following describes an embodiment of a playback device which employs a two-plane setting as a graphics plane setting. Here, the two-plane setting is a plane setting in which left-view and right-view graphics planes are used at a time of stereoscopic playback.

2. Internal Structure of Playback Device

Figure 2:
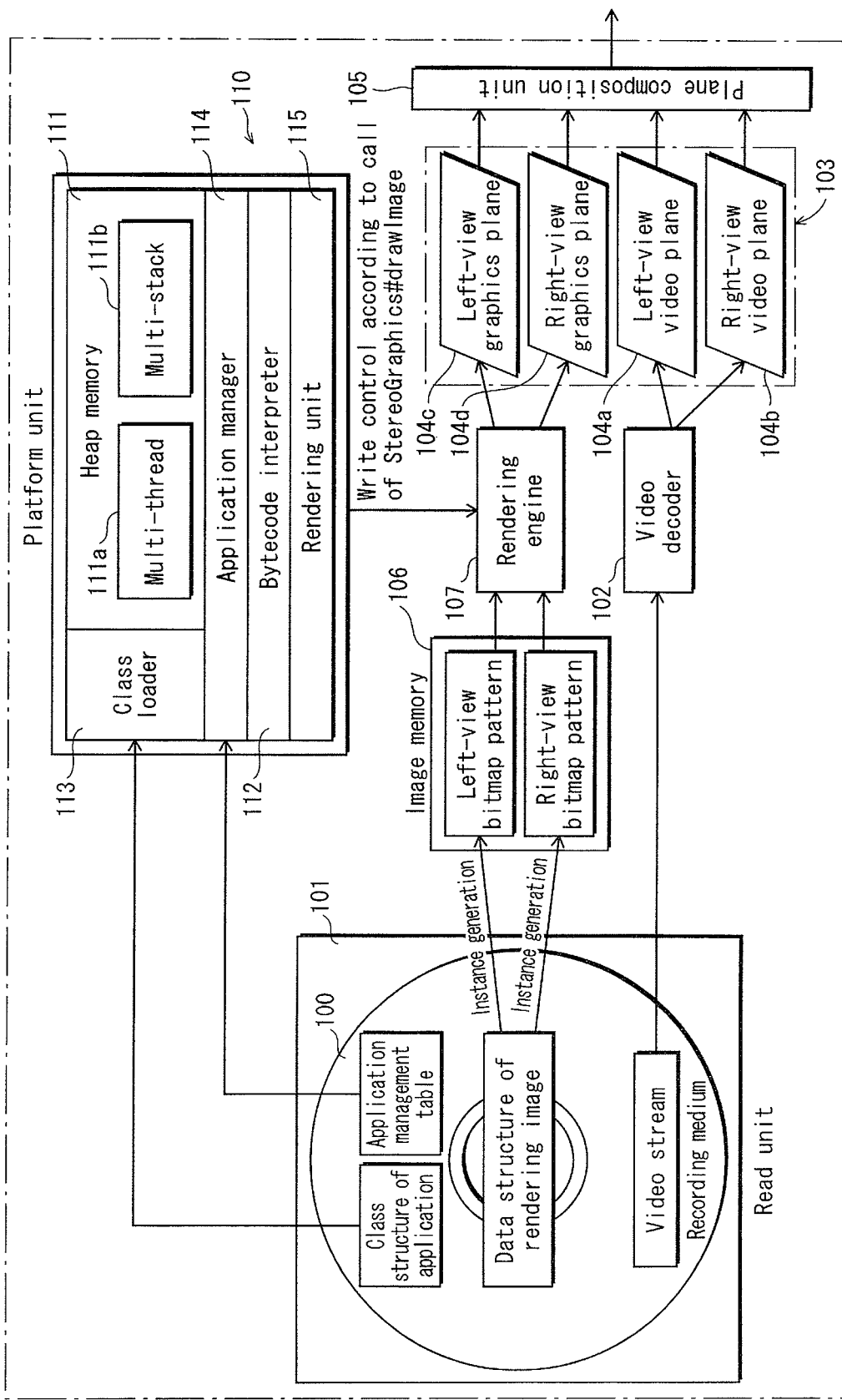
FIG. 2 is a block diagram that shows an internal structure of the playback device.

FIG. 2 shows the basic internal structure of the playback device having the above-described means for solving the problems As shown in the figure, a playback device 200 includes a read unit 101, a video decoder 102, a plane memory set 103 (which includes video planes 104a and 104b and graphics planes 104c and 104d), a plane composition unit 105, an image memory 106, a rendering engine 107, a platform unit 110, a heap memory 111, a bytecode interpreter 112, a class loader 113, an application manager 114, and a rendering unit 115.

2.1 Read Unit 101

The read unit 101 reads, from the recording medium 100, a video stream, data structures of images to be rendered, class structures of bytecode applications and an application management table. The read video stream is supplied to the video decoder 102.

2.2 Video Decoder 102

The video decoder 102 decodes the read video stream into uncompressed pictures and writes the uncompressed pictures into the plane memory set 103.

The plane memory set 103 includes a plurality of plane memories. A plane memory is used to store pieces of pixel data together describing a full-screen image on a line-by-line basis and to output the pieces of pixel data according to horizontal and vertical synchronous signals. The individual plane memories are used to store a full-screen image of one of video, subtitles, GUI, and background image obtained as a result of decoding.

These plane memories are organized in a layer model and the data stored in the individual plane memories is used for layer composition. The layer composition is done by overlaying, for all combinations, two plane memories of different hierarchical levels in the layer model, by superimposing corresponding pixel values stored in the two plane memories.

2.4.1 Left-View Video Plane 104a and Right-View Video Plane 104b

The left-view video plane 104a and the right-view video plane 104b are included in the plane memory set. The left-view graphics plane 104a stores therein left-view video images, and the right-view graphics plane 104b stores therein the right-view video images.

2.4.2 Left-View Graphics Plane 104c and Right-View Graphics Plane 104d

The left-view graphics plane 104c and the right-view graphics plane 104d are included in the plane memory set and each used to store an uncompressed graphics to be overlaid with a picture stored on a corresponding one of the video planes. The left-view graphics plane 104c is a left-view plane memory for storing the left-view graphics. The right-view graphics plane 104d is a right-view plane memory for storing the right-view graphics. There are two types of graphics plane settings. One of the plane settings is a one-plane setting in which only left-view graphics plane is used for graphics rendering at the time of monoscopic playback and the stereoscopic playback. The other is a two-plane setting in which both the left-view graphics plane and the right-view graphics plane are used at the time of the stereoscopic playback. Here, the "graphics" is content to be displayed that is expressed by ARGB format pixel data stored in these graphics planes. The graphics includes characters obtained by decoding text code using a font, a bitmap image represented by code, and a GIF/JPEG/PNG image obtained by decoding GIF/JPEG/PNG data (referred to as a "rendering image" in the present Description.

2.5 Plane Composition Unit 105

The plane composition unit 105 composites layers stored in a plurality of plane memories. The plane composition unit 105 is composed of a left-view output system and a right-view output system. The left-view output system and the right-view output system composite the layers stored in the plane memories independently from one another. The left-view output system and the right-view output system are composed of a plurality of adders and connectors between the adders. The left-view output system is also used in the 2D playback mode. The right-view output system is used only in the 3D playback mode. In the right-view output system, when the left-view graphics plane is a source of supply to the adders, the graphics plane setting may be the one-plane setting. When the right-view graphics plane is a source of supply to the adders, on the other hand, the graphics plane setting may be the two-plane setting.

2.6 Image Memory 106

The image memory 106 is a memory used to store a rendering image, which is created as an instance of a data structure stored on the recording medium 100. The rendering image is a ARGB format bitmap image. A bytecode application specifies a bitmap image with the use of an instance variable. In the 3D playback mode, the image memory 106 separately stores an image object for a right eye and an image object for a left eye.

2.7 Rendering Engine 107

A rendering engine 107 performs a rendering process of the left-view graphics plane 104c and of the right-view graphics plane 104d. The image rendering by the rendering engine 107 is performed by copying am image object stored in the image memory 106 to the graphics planes 104c and 104d. The image object to be copied is specified with the use of an instance variable.

2.10 Platform Unit 110

A platform unit 110 is composed of: a built-in program stored on non-volatile memory, such as ROM; and hardware components (including MPU, registers, and peripheral circuits) that execute the built-in program. The platform unit 110 activates a bytecode application, which is an instance of a class structure stored on the recording medium 100.

2.11 Heap Memory 111

A heap memory 111 is a work area in which the bytecode application is activated, and is composed of a multi-thread 111a and a multi-stack 111b.

2.11.1 Multi-Thread 111a

The multi-thread 111a is a group of logical executable subjects (threads) that execute bytecodes. The multi-thread 111a performs calculation with use of a local variable and an argument stored in a operand stack as operands. Then, the multi-thread 111a stores the calculation results in the local variable or the operand stack. The number of physical executable subjects in the playback device is only an MPU. On the other hand, the maximum number of logical executable subjects (threads) is 64. As long as the number of logical executable subjects is equal to or less than 64, a new thread can be created, and/or a thread can be deleted. The number of threads that are in operation may be increased or decreased during the operation of the platform. Since the number of threads can be increased arbitrarily, the bytecodes that compose the bytecode application may be executed in parallel by the threads so as to accelerate the bytecode application. Bytecodes that compose the bytecode application loaded from the recording medium and bytecodes that compose a resident-type bytecode application such as java.awt.Graphics or HAVi may be executed in parallel.

2.11.2 Multi-Stack 111b

The multi-stack 111b is a group of stacks. The stacks are in one-to-one correspondence with the threads. Each of the stacks includes therein a program counter and one or more frames. The "program counter" shows which part of the instance is currently executed. The "frame" is a stack-type area that is allocated to one call of the method. The frame is composed of an "operand stack" storing therein an argument for the one call, and a "local variable stack" used by the called method. The frame is piled on the stack each time one call is made. Therefore, even when one method is recursively called, one frame is piled.

2.12 Bytecode Interpreter 112

A bytecode interpreter 112 converts the bytecodes allocated to the threads into native code pieces, and causes the MPU to execute the resultant code pieces. The bytecode interpreter 112 causes the bytecode application to perform multi-thread processing.

2.13 Class Loader 113

A class loader 113 loads the bytecode application by generating, in the heap memory 111, the instance of the class structure of the application recorded in the recording medium 100.

2.14 Application Manager 114

An application manager 114 performs application signaling of the bytecode application (e.g. starting the bytecode application and ending the bytecode application) after verifying the bytecode application based on an application management table.

2.15 Rendering Unit 115

A rendering unit 115 is a middleware program for a built-in device that provides various functions to the bytecode application operating on the platform unit. The package implemented by the middleware program includes a library of programs used for rendering processes in the left-view graphics plane 104c and the right-eye graphics plane 104d through the rendering engine 107. Examples of the rendering processes include drawing of graphical objects such as lines and rectangles with a specified color, filling of a specified area, and copying and pasting of a specified image. The bytecode application successively issues, to the rendering unit 115, requests for appropriate rendering processes to realize various processes of rendering graphics.

The following more specifically describes the processing of these elements with reference to drawings.

3. Viewing of Stereoscopic Video Images by Shutter Glasses 500

Figure 3:
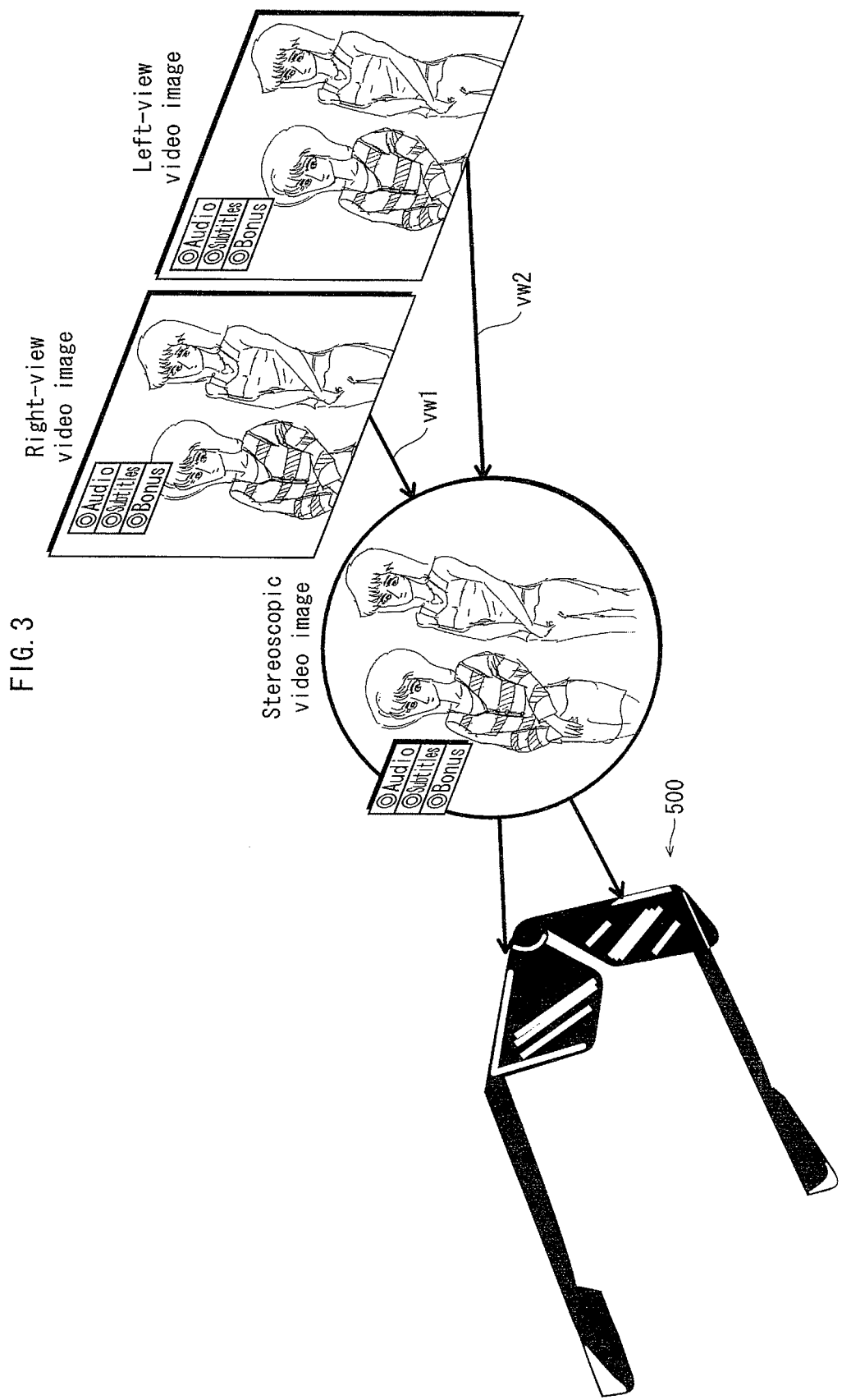
FIG. 3 shows how picture data stored in each of video planes 104*a* and 104*b* is viewed by the user wearing shutter glasses 500.

FIG. 3 shows how picture data stored in video planes 104*a* and 104*b* is viewed by the user wearing shutter glasses 500.

An arrow vw1 in FIG. 3 shows an input of an image for a view point in a right-view period. An arrow vw2 shows an input of an image for a view point in a left-view period. In the right-view period, content stored in the right-view video plane enters the left eye of the user through the shutter glasses 500, as shown by the arrow vw1. In the left-view period, content stored in the left-view video plane enters the right eye of the user through the shutter glasses 500, as shown by the arrow vw2. Such shutter switching realizes the stereoscopic playback of the video stream. In FIG. 3, a menu that is composed of three button members (to which character sequences such as subtitles, audio and bonus are given) are composed of the graphics that are stored in the graphics plane. In such a way, the object to be played back stereoscopically is not limited to video. The menu composed of graphics can be played back stereoscopically.

This concludes the viewing of the stereoscopic video images by the user wearing the shutter glasses 500. The following describes the graphics planes in detail.

The following describes a plane setting for the graphics planes 104*c* and 104*d* (graphics plane setting). Such plane settings include the two-plane setting and the one-plane setting.

4.1 Two-Plane Setting

The two-plane setting is a plane setting for playing back, in a 3D-LR mode, graphics rendered by the bytecode application, when the playback device is in a 3D playback mode. The 3D-LR mode is a playback mode in which a stereoscopic effect is created by writing left-view graphics in the left-view graphics plane and right-view graphics in the left-view graphics plane.

4.2 One-Plane Setting

The one-plane setting is a plane setting for playing back, in a 1plane+Offset mode, graphics rendered by the bytecode application, when the playback device is in the 3D playback mode. The 1plane+Offset mode is a playback mode for changing how the viewer perceives the depth by shifting, to the left or the right, coordinates of pixels on a line-by-line basis in the plane memory, in one of the left-view period and right-view period so as to displace an imaging point of one of a line of right-view sight and a line of left-view sight in a direction closer to the user than the screen or in a direction further back than the screen. Specifically, the imaging point of lines of both eyes is located in a position closer to the user than the screen by shifting the pixel coordinates to: the left in the left-view period; and the right in the right-view period. The imaging point of the lines of both eyes is located in a position further back than the screen, on the other hand, by shifting the pixel coordinates to: the right in the left-view period; and the left in the right-view period.

Such shifting is optimal for easily creating stereoscopic video images since only one plane memory is needed for creating stereoscopic view. Such shifting, however, merely creates stereoscopic video images by bringing the monoscopic video images closer to the user or further back than the screen. Therefore, such shifting is suitable for achieving a stereoscopic effect for menus and subtitles. However, such shifting is not enough for realizing a stereoscopic effect for characters and objects. This is because dents and concavity and convexity of faces of the characters cannot be reproduced with such shifting.

A video stream to be played back is a combination of a base-view video stream and a dependent-view video stream. Even when the playback device is set to be in the 3D playback mode, the graphics plane setting is the one-plane setting as a general rule. Only when the bytecode application makes a plane setting request and switches the graphics plane setting to the two-plane setting, switching can be made to the two-plane setting.

It is necessary that the bytecode application makes a plane setting request prior to rendering and sets the graphics plane setting to the two-plane setting, in the following case. That is, the data structure of a right-view rendering image and the data structure of a left-view rendering image are recorded in the recording medium, and the bytecode application is about to realize the stereoscopic playback of the images and the button members with use of these data structures.

4 Functional Structure of Rendering Unit 115

A rendering unit 115 as described in the above is an element for processing these rendering requests and plane setting requests. In view of functions of software, the internal structure of the rendering unit is as shown in FIG. 4. FIG. 4 is a block diagram showing a functional structure of the rendering unit 115. Tier 1 shows a layer structure of software in the internal structure of FIG. 2. Tier 2 shows a layer structure of plane memories, the right-view output system and the left-view output system, in the internal structure of FIG. 2. Tier 3 shows right-view and left-view video images.

Hatched parts in the layer model shown in Tier 1 show elements of the rendering unit 115. As shown by the hatched parts in FIG. 4, the rendering unit 115 is composed of "org.havi.ui" and "java.awt.Graphics" that are resident-type bytecode applications, and a "device driver" that is a built-in program of the playback device written in native code. The following describes the elements of the rendering unit 115.

4.1 org.havi.ui Module

The "org.havi.ui" manages the left-view graphics plane and the right-view graphics plane as HAVi graphics devices.

4.2 java.awt.Graphics Module

The "java.awt.Graphics module" is an improved version of java.awt.Graphics module. java.awt (Abstract Window Toolkit) is a basic library that is a group of functions for configuring GUI. The java.awt has two classes (component and container). The component provides a rendering area of Java application, and the container provides functions of arranging and storing a plurality of components. The improved version is different from the general java.awt.Graphics only in that the improved version does not perform rendering of the 2D graphics when the current plane setting is the two-plane setting. The special processing by such java.awt.Graphics is to ignore the 2D graphics rendering request. In the first embodiment, an example of the "ignorance" is to delete all the call code pieces of the 2D graphics rendering requests stored in the stack, and returning Exception to threads that have made the requests. After the ignorance, the java.awt.Graphics does not render the 2D graphics until the switching of the graphics plane setting from the two-plane setting to the one-plane setting is instructed and the right-view output system is released.

4.3 Device Driver 116

The device driver 116 writes the graphics to the left-view graphics plane and the right-view graphics plane in accordance with requests from the java.awt.Graphics and the org.havi.ui.

When the graphics plane setting is switched from the one-plane setting to the two-plane setting, one-screen worth of pixel data stored in the left-view graphics plane is copied to the right-view graphics plane so as to switch between the output systems. Arrows dr1 and dr2 in FIG. 4 symbolically show access from the device driver to the left-view graphics plane and the right-view graphics plane, respectively.

With such access, content stored in the left-view graphics plane is copied to the right-view graphics plane. An arrow cp1 symbolically shows copy from the left-view graphics plane to the right-view graphics plane. When the right-view output system is added after the copy, a right-view video image and a left-view video image composited with the graphics are outputted from the playback device, as shown in Tier 3 of FIG. 4.

4.4 StereoGraphics Module

The "StereoGraphics module" is a resident-type bytecode application that is specially implemented in the playback device, and is for rendering the graphics in response to a request for rendering the 3D graphics. The StereoGraphics module is executed only when switching of the graphics plane setting from the one-plane setting to the two-plane setting is instructed. When the graphics plane setting is switched from the two-plane setting to the one-plane setting, the StereoGraphics module ends an operation.

The most important steps in the present embodiment are three steps, that is, the "addition of the right-view output system", the "copy between planes" and the "ignorance of the 2D graphics rendering request". The following describes these steps and elements for executing these steps.

The plane composition unit 105 executes the addition of the right-view output system. The following describes an internal structure of the composition unit.

5 Internal Structure of Plane Composition Unit 105

Figure 5B:
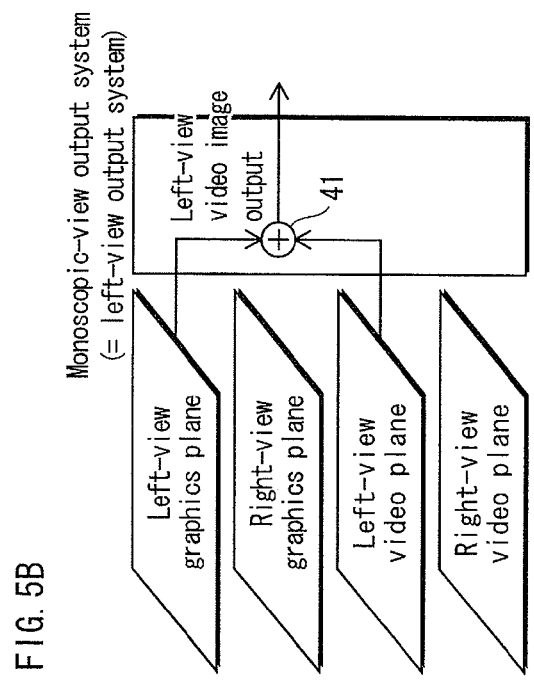
FIGS. 5A, 5B, 5C and 5D each show an internal structure of a plane composition unit.
Figure 5A:
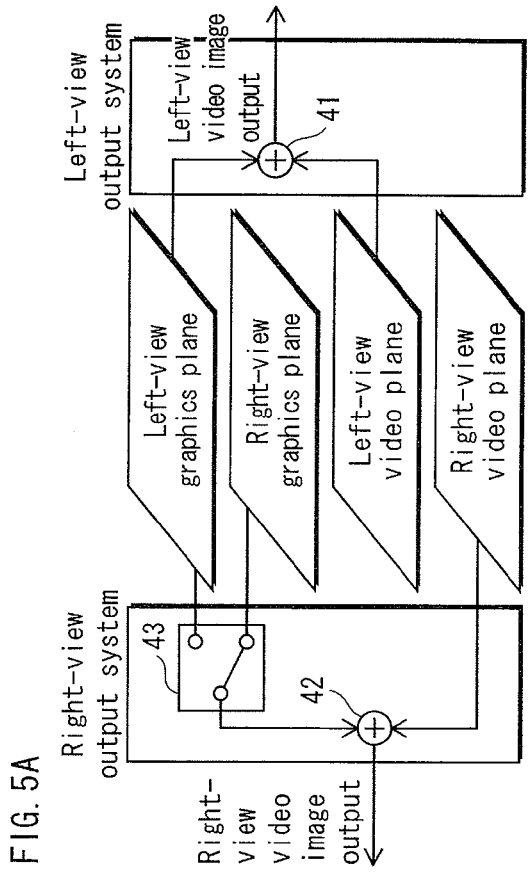

FIG. 5A shows a layer structure of the plane memories and the structural elements of the composition unit. The composition unit includes, as elements, an adder 41 that is provided in the left-view output system of the layer structure of the plane memories, an adder 42 that is provided in the right-view output system of the layer structure of the plane memories, and a switch 43.

5.1 Adder 41

The adder 41 composites, in the left-view output system, content stored in the left-view video plane and content stored in the left-view graphics plane.

5.2 Adder 42

The adder 42 composites, in the right-view output system, content stored in the right-view video plane and one of content stored in the left-view graphics plane and content stored in the right-view graphics plane. The composition by these adders 41 and 42 is to overlay pixel values of the pixel data pieces stored in the video planes and the graphics planes. The overlay of the pixel values is to multiply the pixel value of each line in each plane memory by transmittance α as an weight, and multiply the pixel value of each line in the plane memory positioned in a lower level by (1−transmittance α) as an weight. Then, the pixel values weighted with luminance are added, and the result of the addition is a pixel value of the pixels of each line in the level. Each of the adders 41 and 42 includes a line memory that stores pixel data of line pixels in the plane memory, a multiplication unit that multiplies each pixel value in the pixel line by transmittance. Each of the adders 41 and 42 performs the above-described addition on each of the pixel values of the line pixels.

5.3 Switch 43

The switch 43 switches a source of supply of the pixel data to the adder 42 between the left-view graphics plane and the right-view graphics plane. When the left-view graphics plane is the source of supply of the pixel data to the adder 42, the graphics plane setting is the "one-plane setting". When the right-view graphics plane is the source of supply of the pixel data, the graphics plane setting is the "two-plane setting".

5.4 Variations of Composition Modes 5.4.1 Composition Modes

Figure 5D:
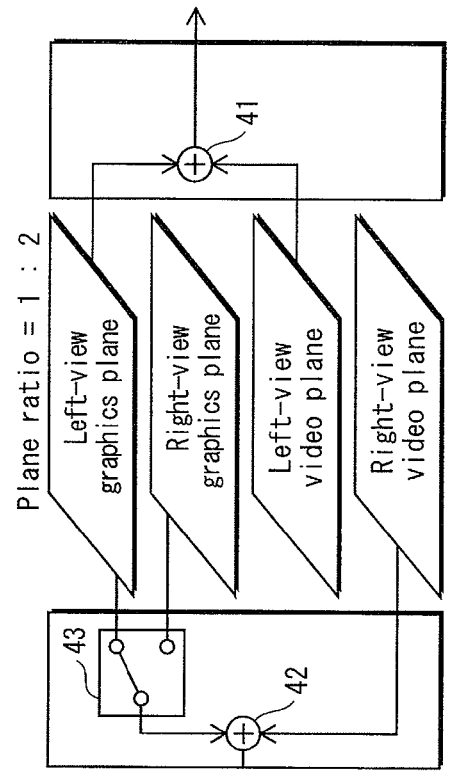
Figure 5C:
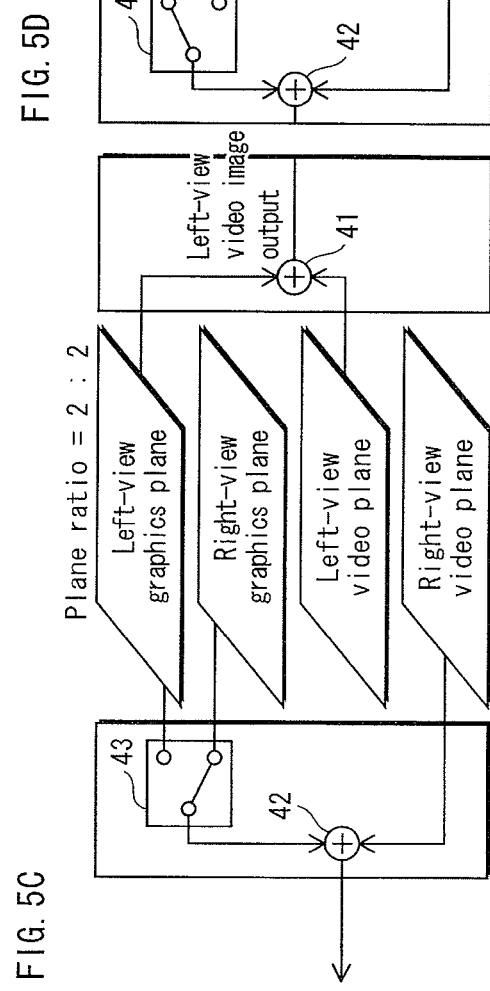

The output system in the 2D playback mode is fixed as shown in FIG. 5B. In the 3D playback mode, on the other hand, there are the right-view output system and the left-view output system. In the left-view output system, there are two kinds of variations as shown in FIGS. 5C and 5D, depending on whether the source of supply of the data to the adder is the right-view plane memory or the left-view plane memory. That is, there is no variation of the output system in the 2D playback mode. There are two composition modes (composition mode A and composition mode B) for the plane composition unit 20, in switching between the two output systems, in the 3D playback mode. The following describes the above-mentioned modes with use of FIGS. 5C to 5D.

FIG. 5C shows a composition mode (composition mode A) for the output system in which the ratio of the number of graphics planes to the number of video planes is 2 to 2. Since the number of graphics planes is two, the source of supply to the adder 42 is the right-view graphics plane.

5.4.2 Composition Mode B

FIG. 5D shows a composition mode (composition mode B) for the output system in which the ratio of the number of graphics planes to the number of video planes is 1 to 2. In the composition mode B, only the left-view graphics plane is used. As a result, left-view and right-view video images outputted from the graphics plane are the same. Therefore, the user perceives the outputted images monoscopically.

In the 2D playback mode, the plane composition unit 105 does not have the right-view output system. Therefore, the plane composition unit 105 is in a state shown in FIG. 5B. However, when switching is made from the 2D playback mode to the 3D playback mode, the right-view output system is added to the plane composition unit 105. Therefore, plane composition unit 105 is in a state shown in FIG. 5C or FIG. 5D. Thus, the "addition of the right-view output system" is to validate the adder 42 and the switch 43. The "release of the right-view output system", on the other hand, is to invalidate the adder 42 and the switch 43.

The following describes the copy between the planes in detail. The copy between the planes is to copy all the pixels stored in the left-view graphics plane to the right-view graphics plane. The following describes the plane structures of the graphics planes that is a premise of such copy processing.

6 Internal Structure of Graphics Planes

Figure 6A:
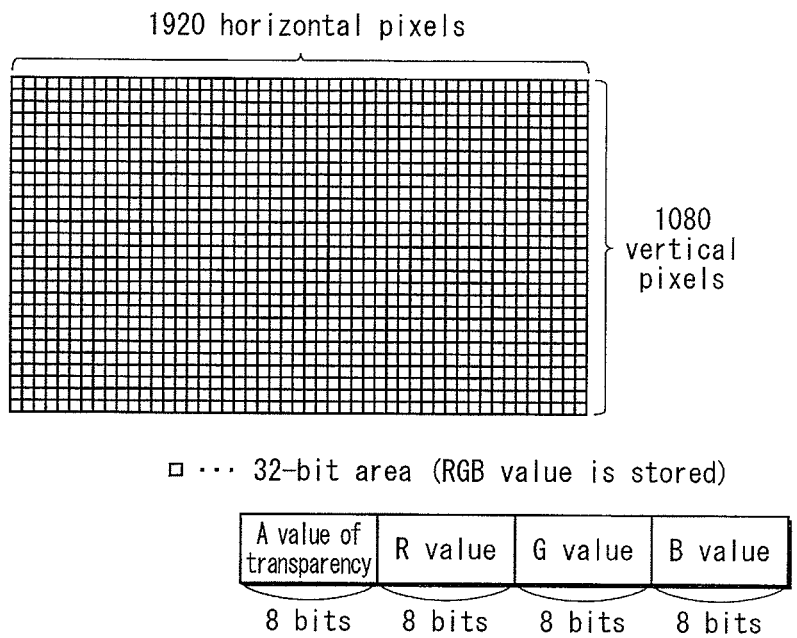
FIGS. 6A and 6B show an internal structure of graphics planes 104c and 104d.
Figure 6B:
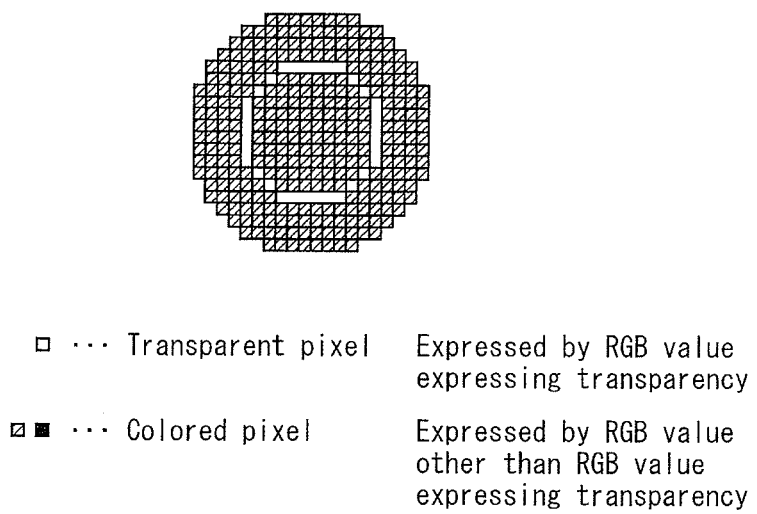

FIGS. 6A and 6B show common internal structures of the left-view graphics plane 104c and the right-view graphics plane 104d. When resolution is set to 1920×1080, each of the graphics planes 104c and 104d is composed of memory elements each having 32 bits (1920×1080). Each of the graphics planes 104c and 104d stores therein pixel data in an ARGB 8888 format at resolution of 1920×1080. In the ARGB 8888 format, each pixel is composed of 8-bit transparency A, an 8-bit R value, an 8-bit G value and an 8-bit B value.

6.1 Pixel Data

FIG. 4B shows pixel data stored on the graphics planes 104c and 104d. As shown in the figure, the graphics data stored on each of the graphics planes 104c and 104d consists of pixel data corresponding to the foreground and pixel data corresponding to the background. An A value representing a transparent color is stored in each of the storage elements corresponding to the background. When overlaid with the video plane, the subtitles and the video image on the graphics plane can be seen through the transparent background image. On the other hand, R, G and B pixel values representing colors other than a transparent color are stored in the storage elements corresponding to the foreground, and the images are rendered by these R, G and B values.

As a result of plane composition by the composition unit 105, the content stored on a different plane is seen through the part corresponding to transparent pixels. The existence of such a transparent part makes plane composition possible.

6.2 Copy Between Planes

The following describes the copy between the planes. When the graphics plane setting is switched from the one-plane setting to the two-plane setting, all the contents stored in the left-view graphics plane shown in FIG. 6A need to be copied to the right-view graphics plane. This copy processing is to copy a group of whole pixel data (i.e. pixel data (1920× 1080) stored in the left-view graphics plane in the ARGB format) to the right-view graphics plane. The following describes the reason for this. In a case where, when switching is made from the one-plane setting to the two-plane setting, the left-view graphics plane has valid pixels while the right-view graphics plane has no pixels and is in a plain state, view for the left eye and the view for the right eye become inconsistent. Therefore, when switching is made from the one-plane setting to the two-plane setting, all the whole pixel data (1920×1080) stored in the left-view graphics plane need to be copied to the right-view graphics plane, before the contents stored in the right-view graphics plane are outputted to be played back. When switching is made from the two-plane setting to the one-plane setting, on the other hand, such copy operation is no necessary. This is because it is not necessary to take a precaution against the inconsistency between the left view and the right view. Therefore, the copy processing from the left-view graphics plane to the right-view graphics plane is essential processing in order to switch the graphics plane setting from the one-plane setting to the two-plane setting.

7 Flow of Copy Between Planes

Figure 7A:
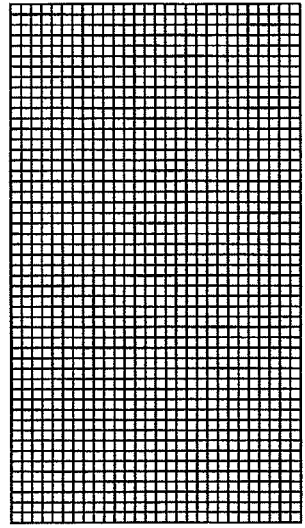
Figure 7B:
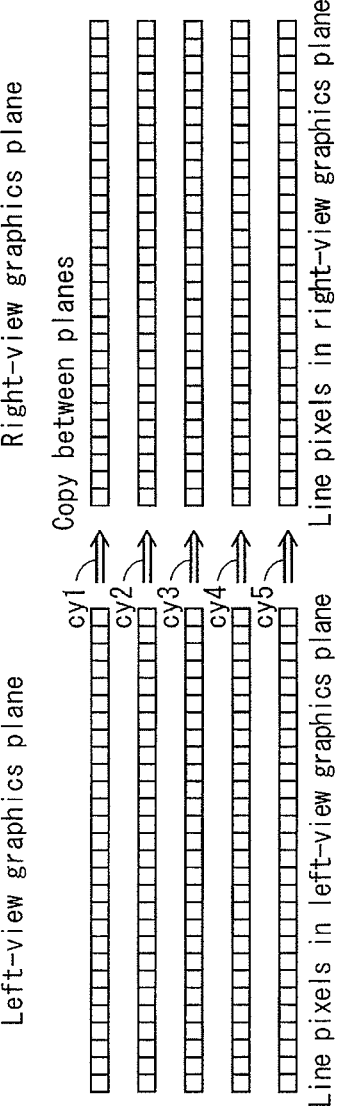

The following describes a flow of copy between the planes with use of FIGS. 7A to 7C. FIG. 7A shows contents stored in the left-view graphics plane and the right-view graphics plane, before the addition of the right-view output system. In FIG. 7A, a menu on the upper left is the same menu as the menu for the stereoscopic video images shown in FIG. 3. The pixel data composing such a menu exists in the left-view graphics plane. FIG. 7B schematically shows how the addition of the right-view output system is performed. The left-view graphics plane is a group of pixel data (1920×1080), and horizontal 1920 pixels compose line pixels. Each of arrows cy1, cy2, cy3, cy4 and cy5 shown in FIG. 7B symbolically shows copy of line pixels from the left-view graphics plane to the right-view graphics plane. Such copy of the line pixels allows the pixel data (1920×1080) in the left-view graphics plane to be copied to the right-view graphics plane as they are. FIG. 7C shows contents stored in the left-view graphics plane and the right-view graphics plane, after the addition of the right-view output system. In FIG. 7C, since each of the left-view graphics plane and the right-view graphics plane has a menu, inconsistency between left view and right view does not occur.

8 Ignorance of 2D Graphics Rendering Request

This concludes the description of the copy between the planes and the graphics planes. The following describes the ignorance of the 2D graphics rendering request in detail. The ignorance of the 2D graphics rendering request is to ignore the 2D graphics rendering request that has reached the java.awt.Graphics after switching from the one-plane setting to the two-plane setting. Such ignorance means active processing that deletes all the 2D graphics rendering requests so as to exceptionally end the 2D graphics rendering requests when the graphics plane setting is switched to the two-plane setting. The "ignorance" that accompanies the active processing eliminates the 2D graphics rendering request from the stack for the java.awt.Graphics to receive the request from the bytecode application. The processing of ignoring the 2D graphics rendering request after the switching of the graphics plane setting is also referred to as "invalidation" of the 2D graphics rendering request.

The following describes, with reference to FIGS. 8A and 8B, adverse effects that possibly arise when the 2D graphics rendering request is reached after the switching from the one-plane setting to the two-plane setting. FIGS. 8A and 8B show graphics update after switching from the one-plane setting to the two-plane setting. In each of FIGS. 8A and 8B, a left edge of each of the figures is an original point of the time axis, a right direction of the figure is a positive direction of the time axis and a left direction of the figure is the negative direction. Then, a plain surface that is orthogonal to the time axis is an X-Y plain surface of the graphics plane. During the playback of the graphics, the coordinates of the X-Y plain surface that is orthogonal to the time axis are provided as the display coordinates. In the following descriptions, the same expressions as the expressions used in FIGS. 8A and 8B are used for the time axis of the video streams and the X-Y coordinates unless otherwise indicated. The following cases shown in FIGS. 8A and 8B occur in accordance with a rendering request for graphics update being a 2D graphics rendering request or a 3D graphics rendering request.

8.2 Update by 3D Graphics Rendering Request after Switching to Two-Plane Setting The case shown in FIG. 8A is a case where the graphics update is performed in accordance with the 3D graphics rendering request, after the graphics plane setting is switched from the one-plane setting to the two-plane setting. In the case shown in FIG. 8A, the following display example is presumed. Since audio is selected from among audio, subtitles and bonus shown by the menu shown in FIG. 8A, a menu is shown that receives selection of a language of the audio (i.e. English, Chinese and Japanese). In FIG. 8A, a menu exists in the left-view graphics plane at a time point u1. At a time point u2, the copy between the planes is executed by switching the plane setting from the one-plane setting to the two-plane setting. Both of the left-view graphics plane and the right-view graphics plane have menus. At a time point u3, it is shown that contents stored in the left-view graphics plane and the right-view graphics plane are updated after the issuance of the 3D graphics rendering request in accordance with entering operation of the menu.

8.3 Update by 2D Graphics Rendering Request after Switching to Two-Plane Setting The case shown in FIG. 8B is a case where the graphics update is performed in response to the 2D graphics rendering request, after the graphics plane setting is switched from the one-plane setting to the two-plane setting. In a case shown in FIG. 8B, a menu exists in the left-view graphics plane at a time point u1. At a time point u2, the copy between the planes is executed by switching the plane setting from the one-plane setting to the two-plane setting. Both of the left-view graphics plane and the right-view graphics plane have menus. At a time point u3, it is shown that contents stored in only the left-view graphics plane are updated after the issuance of the 2D graphics rendering request in accordance with the entering operation of the menu. Although the contents stored in the left-view graphics plane are updated, the contents stored in the right-view graphics plane have not been updated yet. Therefore, inconsistency between the left view and the right view occurs.

The following describes what the 2D graphics rendering request to be ignored is like, and what the 3D graphics rendering request and the plane setting request are like.

The "2D graphics rendering request" is realized as a call code of Graphics#drawImage API in which first and second arguments are set. When first, second and third arguments are respectively x1, y1, x2, y2 and image1, a call code of API (Graphics#drawImage(x1,y1,x2,y2,image1)) is written in the bytecode application. This is how the 2D graphics rendering request is made.

The "3D graphics rendering request" is a call code of the StereoGraphics#drawImage API in which first, second, third, fourth and fifth arguments are set. When the arguments are x1, y1, x2, y2, image1, x3, y3, x4, y4 and image2, API call code (StereoGraphics#drawImage(x1, y1, x2, y2, image1, x3, y3, x4, y4 and image2) are written in the bytecode application. This is how the 3D graphics rendering request is made.

The "plane setting request" is a call code of the SetConfigurationAPI in which the first and second arguments are set. When the first and second arguments are width×height and number1 respectively, API call code (setConfiguration (width×height,number1)); is written in the bytecode application. This is how the switching between the plane settings in the graphics plane memory can be made.

The call code of the Graphics#drawImage API (2D graphics rendering request) and call code of the StereoGraphics#drawImage (3D graphics rendering request) are accumulated in the stack by threads composing the bytecode application. These code pieces are supplied to java.awt.Graphics and StereoGraphics that are the elements of the rendering unit.

When API (Graphics#drawImage API, StereoGraphics#drawImage API and setConfiguration API) are called, frames corresponding to these calls are piled on a stack corresponding to each thread. Arguments of the Graphics#drawImage API call, the StereoGraphics#drawImage API call and the setConfigurationAPI call are piled on operand stacks of frames in the above-mentioned stacks.

FIGS. 9A, 9B and 9C show the application program interfaces used for rendering the images.

9.1 java.awt.Graphics#drawImage Method

In FIG. 9A, a java.awt.Graphics#drawImage method is an API used for calling the function of writing an image specified by the second argument into a position specified by the first argument. More precisely, an additional argument specifying a rectangular region used to clip part of the specified image may be passed. Yet, description of such an argument is omitted here.

9.2 StereoGraphics#drawImage Method

A StereoGraphics#drawImage method shown in FIG. 9B is an API used for calling the function for writing an image specified by the second argument into the left-view graphics plane at a rectangle region specified by the first argument and also for writing an image specified by the fourth argument into right-view graphics plane at a rectangle region specified by the third argument.

Each rectangular region is expressed by a combination of the coordinates of the top-left pixel (x1, y1) and the coordinates of the lower-right pixel (x2, y2) of the rectangular region. In addition, an image object to be rendered may be an instance (bitmap image) created from the data structure in GIF/JPEG/PNG format or a buffered image.

As described above, the java.awt.Graphics#drawImage method is for the process of copying an image. Yet, with this method, only one rectangle region can be specified for copying. On the other hand, the StereoGraphics#drawImage method is for copying a stereo pair of left and right images at once, so that a pair of rendering positions and a pair of rendering images are specified. Here, the left-view graphics plane 104c and the right-view graphics plane 105d are always set as the target planes for the rendering caused by this method. Accordingly, arguments specifying the target graphics planes are not included in the arguments of the StereoGraphics#drawImage method.

10 Specific Example of Rendering Request

FIGS. 10A, 10B and 10C show a specific example of making rendering request that can be specified by an application program interface shown in FIGS. 8A and 8B.

10.1 Specific Example of Rendering Request from java.awt.Graphics#drawImage

The example shown in FIG. 10A corresponds to an API which is the java.awt.Graphics#drawImage method. The figure shows in tabular form the specific settings of a rectangle region in which an image is rendered as well as of an image to be rendered. With the java.awt.Graphics#drawImage method, the rendering rectangle region is expressed by two sets of X and Y coordinates in the graphics plane coordinate system. In this example, the rectangle region is expressed by (X1=50, Y1=100) and (X2=250, Y2=170) and the image to be rendered is expressed with use of an instance variable assigned to the instance of a data structure. In the example shown in the figure, the instance variable "bitmap image 1" is assigned to the instance of a data structure composed of 200×70 pixels.

10.2 Specific Example of Rendering Request from StereoGraphics#drawImage

The example shown in FIG. 10B corresponds to an API which is the StereoGraphics#drawImage method. The figure shows in tabular form the specific settings of a rectangle region in which an image is rendered as well as of an image to be rendered. With the StereoGraphics#drawImage method, the rectangular region on the left-view graphics plane is expressed by two sets of X and Y coordinates in the graphics plane coordinate system. In this example, the rectangle region on the left-view graphics plane is expressed by (X1=50, Y1=100) and (X2=250, Y2=170) and the image to be rendered is expressed by an instance variable assigned to the instance of a data structure. In the example shown in the figure, the instance variable "bitmap image 1" is assigned to the instance of a data structure composed of 200×70 pixels.

In addition, the rectangle region on the right-view graphics plane is expressed by two sets of X and Y coordinates in the graphics plane coordinate system. In this example, the rectangle region on the right-view graphics plane is expressed (X3=55, Y3=100) and (X4=255, Y4=170), and the image to be rendered is expressed with use of an instance variable assigned to the instance of a data structure. In the example shown in the figure, the instance variable "bitmap image 2" is assigned to the instance of a data structure composed of 200×70 pixels.

11.1 Writing to Graphics Plane in Accordance with 2D Graphics Rendering Request

Figure 11A:
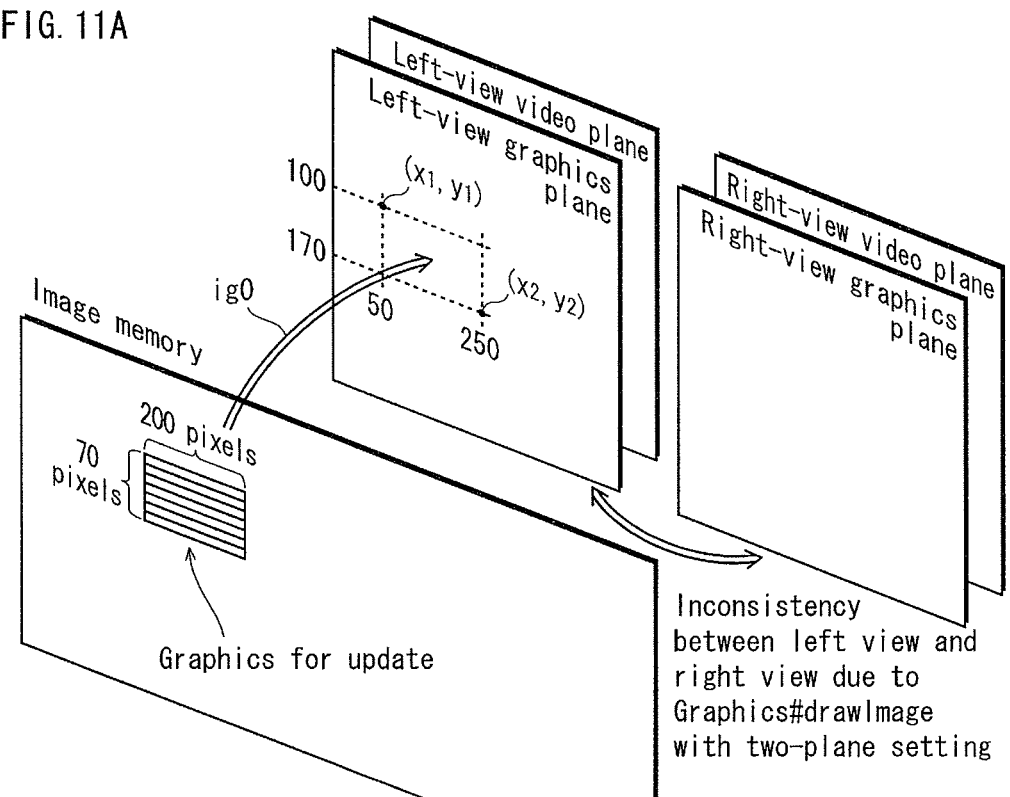
FIGS. 11A and 11B schematically show how writing is performed by calling Graphics#drawImage and StereoGraphics#drawImage, when an argument is specified as shown in FIGS. 9A, 9B and 9C.

FIG. 11A schematically shows how writing is performed by calling Graphics#drawImage, when an argument is specified as shown in FIG. 10A. In FIG. 11A, the image memory storing the rendered images is shown closer, whereas the left-view graphics plane overlaid with the left-view video plane as well as the right-view graphics plane overlaid with the right-view video plane are shown further back.

As shown in FIG. 11A, the graphics is written only in the left-view graphics plane. Although the left-view graphics is updated, graphics is not written in the right-view graphics plane. Therefore, only the left-view graphics plane is updated in response to the 2D graphics rendering request. It can be seen that the inconsistency between the left view and the right view occurs due to the 2D graphics rendering request after the switching from the one-plane setting to the two-plane setting.

11.2 Writing to Graphics Plane by StereoGraphics#drawImage

Figure 11B:
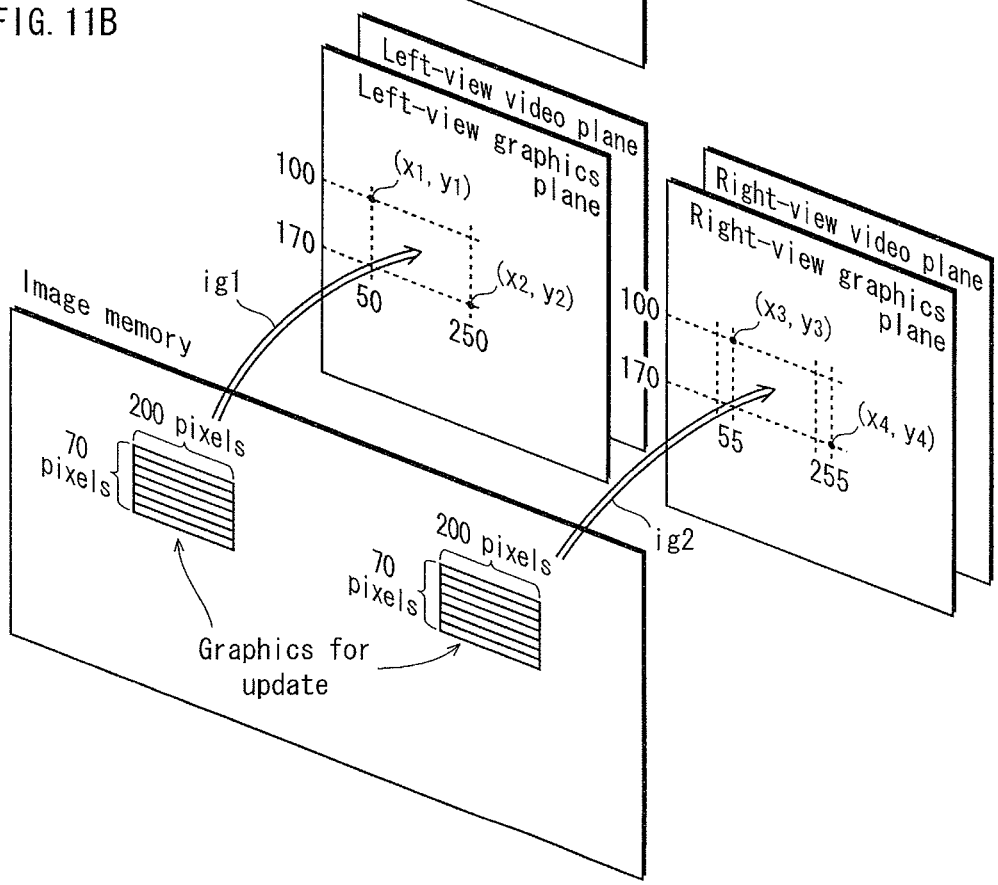

FIG. 11B schematically shows how writing is performed by calling StereoGraphics#drawImage, when an argument is specified as shown in FIG. 10B. In FIG. 11A, the image memory storing the rendered images is shown closer, whereas the left-view graphics plane overlaid with the left-view video plane as well as the right-view graphics plane overlaid with the right-view video plane are shown further back. The specific X and Y coordinates of the respective rendering rectangles defined as in FIG. 10B are plotted on the left and right-view graphics planes.

As shown in the figure, the X coordinates plotted on the respective graphics planes are slightly different from each other. Thus, the rendered images are copied to the respective graphics planes so that the positions of the images on the respective planes are slightly shifted to the right or left. In the figure, an arrow ig1 indicates coping of an image from the left image memory to the left-view graphics plane, and an arrow ig2 indicates copying of an image from the right image memory to the right-view graphics plane. In this example, the position at which the R-image is rendered is shifted to the right from the position at which the L-image is rendered, by the amount corresponding to five pixels. Consequently, the displayed image is perceived by the viewer as being further back than the screen. In this example, different bitmap images are specified as R-image and L-image to improve the stereoscopic viewing effect. Yet, the R-image and L-image may be the same bitmap image.

In order to avoid the above-mentioned inconsistency between the left view and the right view, it is necessary to ignore the 2D graphics rendering request with the two-plane setting.

Figure 12:
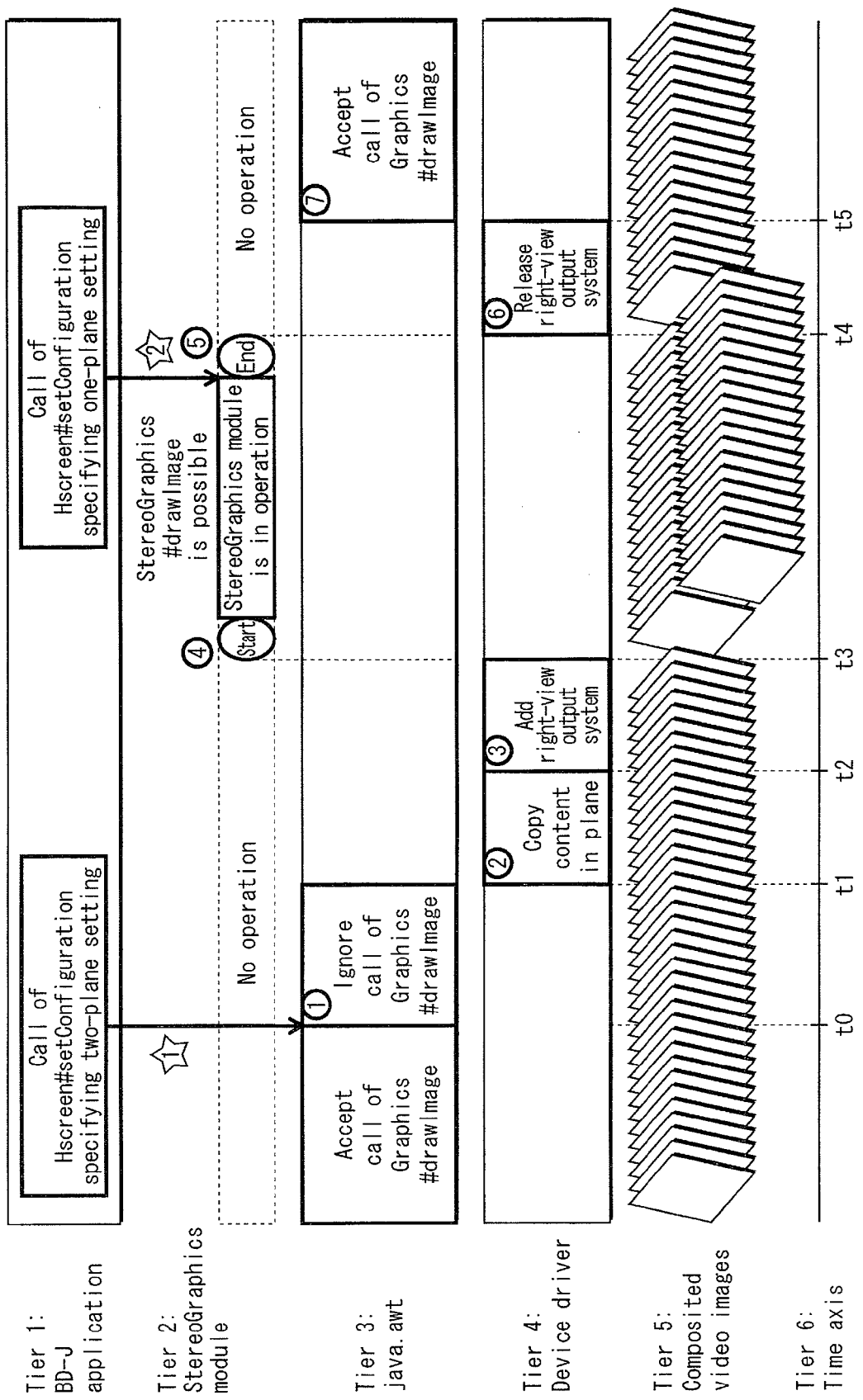
FIG. 12 is a timing chart showing, along a video stream time axis, a temporal relationship among ignorance of the 2D graphics rendering request, the copy processing between planes and addition of a right-view output system.

The temporal relationship among the ignorance of the 2D graphics rendering request when switching from the one-plane setting to the two-plane setting, the copy between the planes and the addition of the right-view output system is (1) ignorance of the 2D graphics rendering request→(2) the copy between the planes→(3) the addition of the right-view output system. After the addition of the right-view output system, 3D graphics rendering request is accepted. On the other hand, the temporal relationship regarding switching from the two-plane setting to the one-plane setting is as follows. Acceptance of the 3D graphics rendering request is prohibited. Then, the right-view output system is released. Subsequently, the 2D graphics rendering request is accepted. FIG. 12 is a timing chart showing the temporal relationship among these procedures.

12 Temporal Relationship Among Operations of Elements

FIG. 12 is a timing chart showing, along the time axis of the video stream, the temporal relationship among operations of the bytecode application, the StereoGraphics, the java.awt.Graphics and the device driver. Tier 1 shows the bytecode application, and Tier 2 shows StereoGraphics. Tier 3 shows java.awt.Graphics, and Tier 4 shows the device driver. Tier 5 shows a plurality of pictures that are successively displayed, in the time axis of the video stream, in frame periods (1/23.976 seconds or 1/59.94 seconds). Tier 6 shows the time axis of the video stream.

12.1 Switching from One-Plane Setting to Two-Plane Setting

An arrow to which a star symbol is given in FIG. 12 symbolically shows a call of setConfiguration in which the second argument is "two planes". Circle symbols 1, 2, 3 and 4 show in what order invalidation of the java.awt.Graphics, copy by the device driver and the acceptance of the 3D graphics rendering request by the StereoGraphics are executed, after the call of the setConfiguration in which the argument indicates two planes. As shown by the circle symbols, the Graphics#drawImage is invalidated by the java.awt.Graphics at first. Secondly, the copy is executed by the device driver. Thirdly, the output of the right-view output system is executed by the device driver. After this processing is completed, it can be seen that the StereoGraphics starts fourthly, and the acceptance of the StereoGraphics#drawImage starts.

A time point t0 at which the invalidation starts in Tier 2 is right after a time point at which the setConfiguration API is called. A time point t1 at which the copy between the plane memories starts is right after a time point at which the invalidation of the 2D graphics rendering request is completed. If the content of the left-view graphics plane is rewritten by the java.awt.Graphics during the copy, inconsistency between the contents stored in the left-view graphics plane and the contents stored in the right-view graphics plane occurs. This causes the inconsistency between the left and right views. However, as shown in FIG. 12, since the copy between the graphics planes is performed after the java.awt.Graphics ignores all the requests for rendering the 2D graphics, the inconsistency between the contents stored in the left-view graphics plane and the contents stored in the right-view graphics plane does not occur.

As described in the above, one characteristic of the processing by the device driver is that the above-stated copy is performed after completion of the ignorance of the 2D graphics rendering request. That is, if the content of the left-view graphics plane is rewritten by the java.awt.Graphics during the copy, inconsistency between the contents stored in the left-view graphics plane and the contents stored in the right-view graphics plane occurs. This causes the inconsistency between the left and right views. On the other hand, if the device driver performs the copy between the graphics planes after the java.awt.Graphics eliminates all the 2D graphics rendering requests from the stack, inconsistency between the stored contents does not occur.

An additional time point t2 of the right-view output system is right after completion of the copy between the planes. It can be seen from Tier 5 that a mode for outputting the video images is switched from a stereoscopic mode to a monoscopic mode right after the switching of the output system.

A time point t3 at which the StereoGraphics starts is right after the addition of the right-view output system. Because the StereoGraphics has started, the stereoscopic graphics can be updated at the time point t3 onwards. It is clear from the above-described timing chart that the rendering according to the StereoGraphics#drawImage in response to the 3D graphics rendering request cannot always be performed right after the call of the setConfiguration. Execution of a series of processing (such as the ignorance of the 2D graphics rendering request, the copy between the graphics planes and the switching of the output systems) causes time lag.

12.2 Switching from Two-Plane Setting to One-Plane Setting

An arrow to which a star symbol 2 is given in FIG. 12 symbolically shows a call of setConfiguration in which the second argument indicates "one plane". Circle symbols 5, 6 and 7 show in what order invalidation of the java.awt.Graphics, copy by the device driver and the acceptance of the 3D graphics rendering request by the StereoGraphics are executed, after the call of the setConfiguration in which the argument indicates one plane. As shown by a number in a circle symbol, the operation of the StereoGraphics ends at first. Secondly, switching is made such that only the left-view output system. Thirdly, the java.awt.Graphics starts to accept the call of the Graphics#drawImage.

A time point t4 at which StereoGraphics ends the operation in Tier 2 is right after the call of the setConfiguration. The StereoGraphics that performs the 3D graphics rendering in accordance with the StereoGraphics#drawImage starts the operation only when switching from the one-plane setting to the two-plane setting is instructed by the call of the setConfiguration. When switching from the two-plane setting to the one-plane setting is made in accordance with the call of the setConfiguration, the StereoGraphics#drawImage ends the operation immediately. Therefore, a time period in which the operation is performed is extremely limited. Therefore, a problem does not arise that the StereoGraphics is executed in the 2D playback mode.

The time point t4 at which the right-view output system is released in Tier 4 is right after the operation of the StereoGraphics ends. It can be seen from Tier 5 that a mode for outputting the video images is switched from a stereoscopic mode to a monoscopic mode right after the switching of the output systems.

A time point t5 at which the Graphics#drawImage is accepted in Tier 3 is right after the switching from the two-plane setting to the one-plane setting is completed. Since the java.awt.Graphics accepts the request for rendering the 2D graphics, the 2D graphics can be updated after this time point.

During the execution of the copy or the switching of the output systems, the contents stored in the graphics plane are not outputted. Therefore, it is possible to ensure that the contents outputted by the playback device are right contents. This concludes the description of the temporal relationship among the java.awt.Graphics, the device driver and the StereoGraphics.

13 Comparative Explanation

Figure 13B:
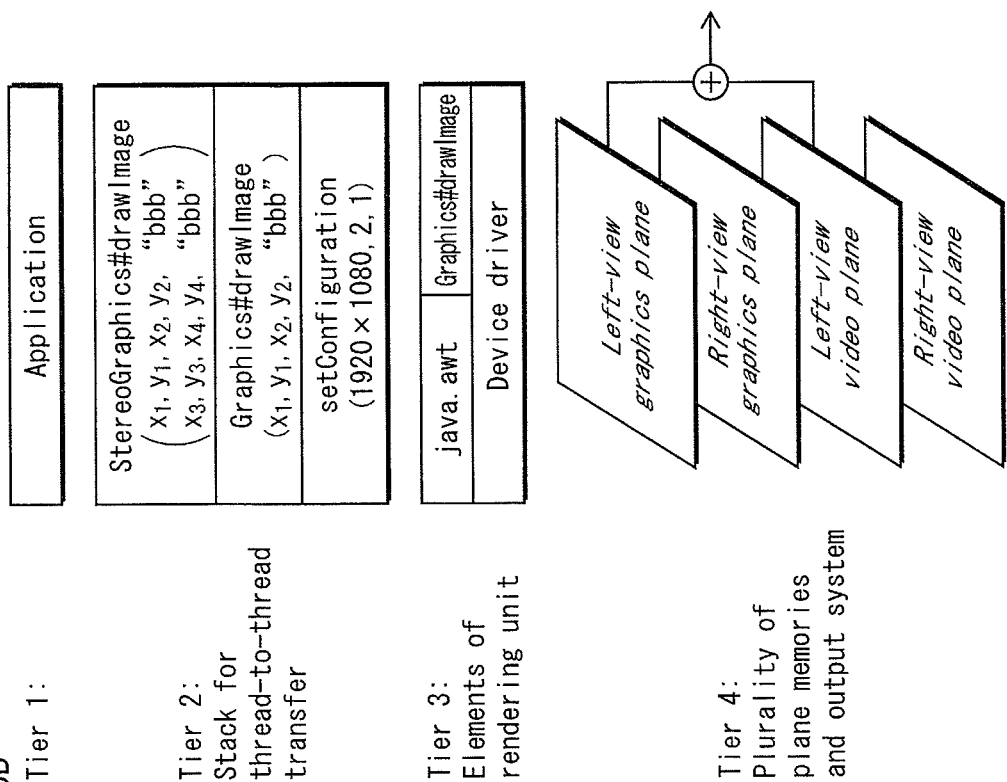
FIGS. 13A and 13B explain difference in stereoscopic video images played back by the playback device between a case where Graphics#drawImage is invalidated and a case where Graphics#drawImage is not invalidated.

The most distinguishing feature of the processing of the playback device is the invalidation of the 2D graphics rendering request. The following compares a case where such invalidation is performed and a case where such invalidation is not performed, so as to describe the difference between these cases as to how the stereoscopic video images are played back by the playback device. A case shown in FIGS. 13A and 13B is selected for the comparative explanation.

13.1 Assumed Case

Figure 13A:
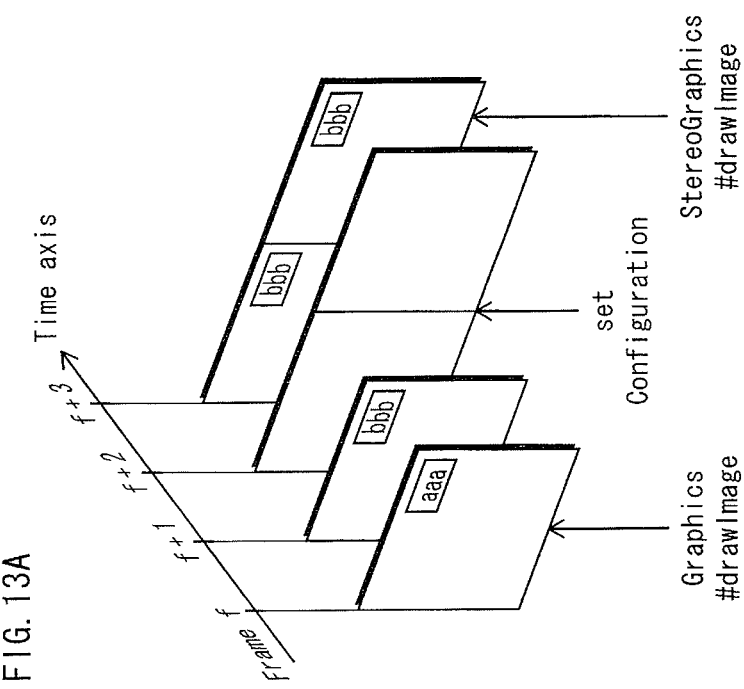

FIG. 13A shows steps that are for updating the graphics and considered to be ideal by the content creator. "aaa" in FIG. 13A is an abbreviation for the menu that receives the selection of audio, subtitles and bonus shown in FIG. 3. "bbb" is an abbreviation for the menu that receives the selections of English, Chinese and Japanese. The following describes the update steps. In a first step, "aaa" is written in response to the call of the Graphics#drawImage API, at a frame f from among four frames (f, f+1, f+2 and f+3). In a second step, "bbb" is written in response to the call of the Graphics#drawImage API, at a frame f+1. In a third step, the graphics plane setting is switched to the two-plane setting at a frame f+2. In a fourth step, "bbb" is written in each of the two planes, at a frame f+3. In order to realize the graphics update, the Graphics#drawImage is issued at frames f and f+1, the setConfiguration is issued at the time frame f+2 and the StereoGraphics#drawImage is issued at the time frame f+3.

In the bytecode application, the call code of the Graphics#drawImage, the call code of the setConfiguration and the call code of the StereoGraphics#drawImage are ordered as follows: the 2D graphics rendering request→setConfiguration→StereoGraphics#drawImage.

However, the bytecode corresponding to the call code of the Graphics#drawImage, the bytecode corresponding to the call code of the setConfiguration and the bytecode corresponding to the call code of the StereoGraphics#drawImage are executed in parallel by three threads in the multi-thread mode. Therefore, it is assumed that these code pieces are issued in order as follows: setConfiguration→Graphics#drawImage→StereoGraphics#drawImage.

FIG. 13B shows three call code pieces issued by the bytecode application for updating the graphics update shown in FIG. 13A. Tier 2 in FIG. 13B shows a stack for communication between threads. There are three code pieces (setConfiguration, Graphics#drawImage and StereoGraphics#drawImage) that are arranged in this order. Tier 1 shows the bytecode application, and Tier 4 shows plane memories. Tier 3 shows elements of the rendering unit, which are the java.awt.Graphics, the StereoGraphics and the device driver.

14.1 Case 1 (Case where Switching of Plane Setting is Executed without Invalidation)

Firstly, the following describes a case where switching of the plane setting is executed without the invalidation.

FIGS. 14A, 14B, 14C and 14D show, in a continuous photographic manner, how a plurality of code pieces in the stack are processed, when the mode switching is performed without invalidation. Processing of code pieces in the stack includes four stages. FIG. 14A, FIG. 14B, FIG. 14C and FIG. 14D show first, second, third and fourth stages, respectively. FIGS. 14A, 14B, 14C and 14D show the stack, the java.awt.Graphics, the StereoGraphics, the device driver and the plane memories in the same expression manner as the previous figure.

An arrow with a circle symbol 2 in FIG. 14A symbolically shows the copy to the plane memory. An arrow with a circle symbol 3 shown in FIG. 14B symbolically shows the switching of the output systems. An arrow with a circle symbol 8 shown in FIG. 14C symbolically shows writing of bbb by the Graphics#drawImage. An arrow with a circle symbol 9 shown in FIG. 14D symbolically shows writing of bbb by the StereoGraphics#drawImage.

15 Stereoscopic Video Images to be Played Back in Case 1

Figure 15:
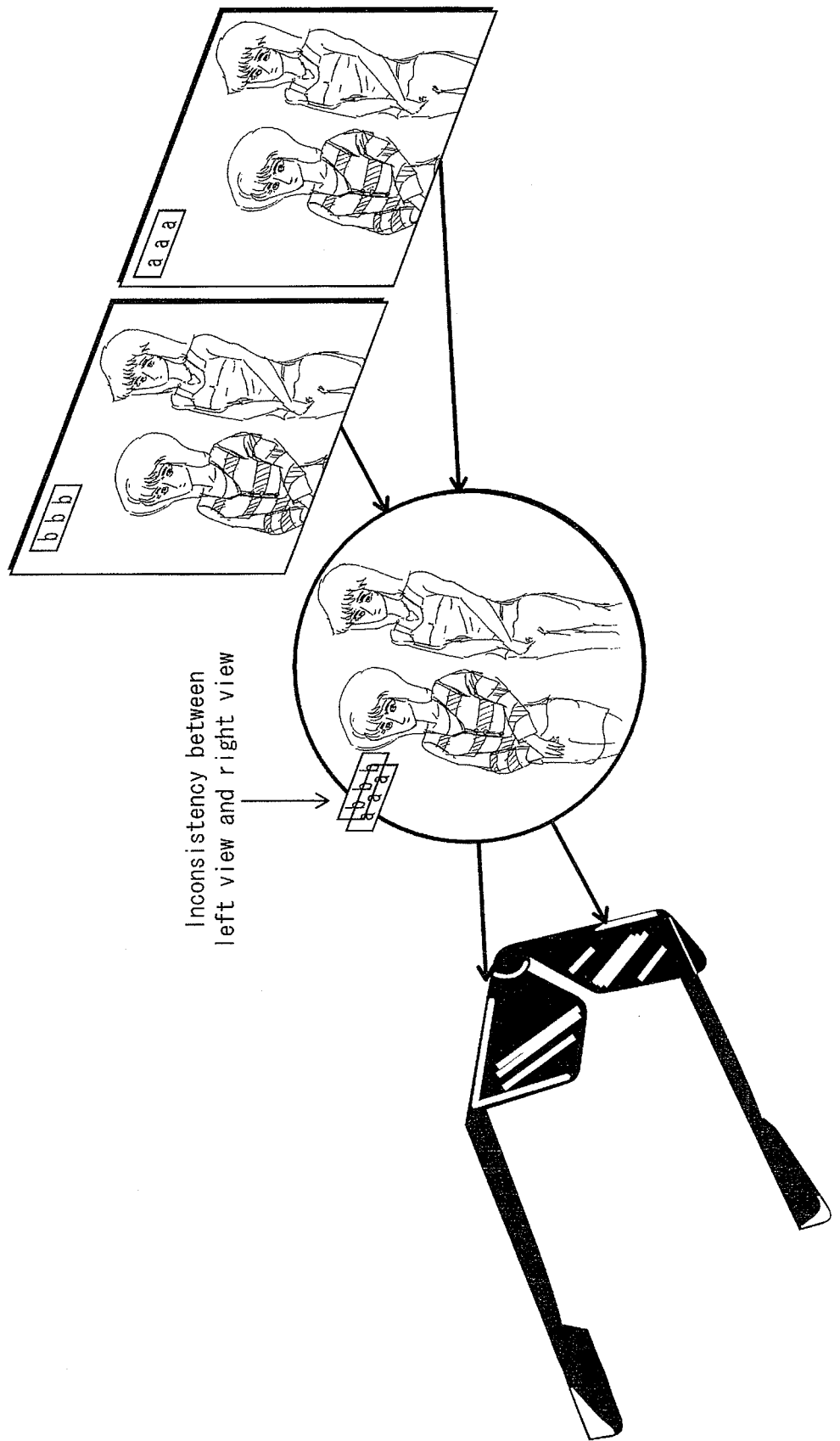
FIG. 15 shows stereoscopic video images to be played back by writing shown in FIG. 14C.

FIG. 15 shows stereoscopic video images to be played back by writing shown in FIG. 14C. In FIG. 14C, the contents stored in the right-view graphics plane and the contents stored in the left-view graphics plane are different, inconsistency between the right view and the left view occurs. The inconsistency between the right view and the left view remains until the StereoGraphics updates the left-view graphics plane and the right-view graphics plane. Therefore, such inconsistency makes the user very uncomfortable.

16 Case 2 (Case where Mode Switching is Performed after Invalidation)

FIGS. 16A, 16B, 16C and 16D show, in a continuous photographic manner, how a plurality of API call code pieces in the stack are processed, when the mode switching is performed after invalidation. As with FIGS. 14A, 14B, 14C and 14D, the procedure for processing the code in the stack includes four stages. FIGS. 16A, 16B, 16C and 16D show first, second, third and fourth stages, respectively. FIGS. 16A, 16B, 16C and 16D show the stack, the java.awt.Graphics, the StereoGraphics, the device driver and the plane memories in the same expression manner as FIG. 13B.

In FIG. 16A, an arrow with a circle symbol 1 shows an elimination of the call code of API of the 2D graphics rendering request, by the invalidation. A sign "x" in FIG. 16A schematically shows that when the call code of the Graphics#drawImage that writes "bbb" is eliminated from among the three call code pieces stored in the stack, the order of the call code of the setConfiguration that immediately succeeds the Graphics#drawImage is carried by one.

An arrow with a circle symbol 2 in FIG. 16B symbolically shows the copy to the plane memory. Since the copy to the graphics plane shown in FIG. 16B is performed after all the 2D graphics rendering requests are eliminated from the stack by the java.awt.Graphics as shown in FIG. 16A, inconsistency between the left view and the right view does not occur. An arrow with a circle symbol 3 shown in FIG. 16C symbolically shows the addition of the right-view output system. An arrow with a circle symbol 9 shown in FIG. 16D symbolically shows writing of bbb by the StereoGraphics#drawImage.

17 Stereoscopic Video Images to be Played Back in Case 2

Figure 17:
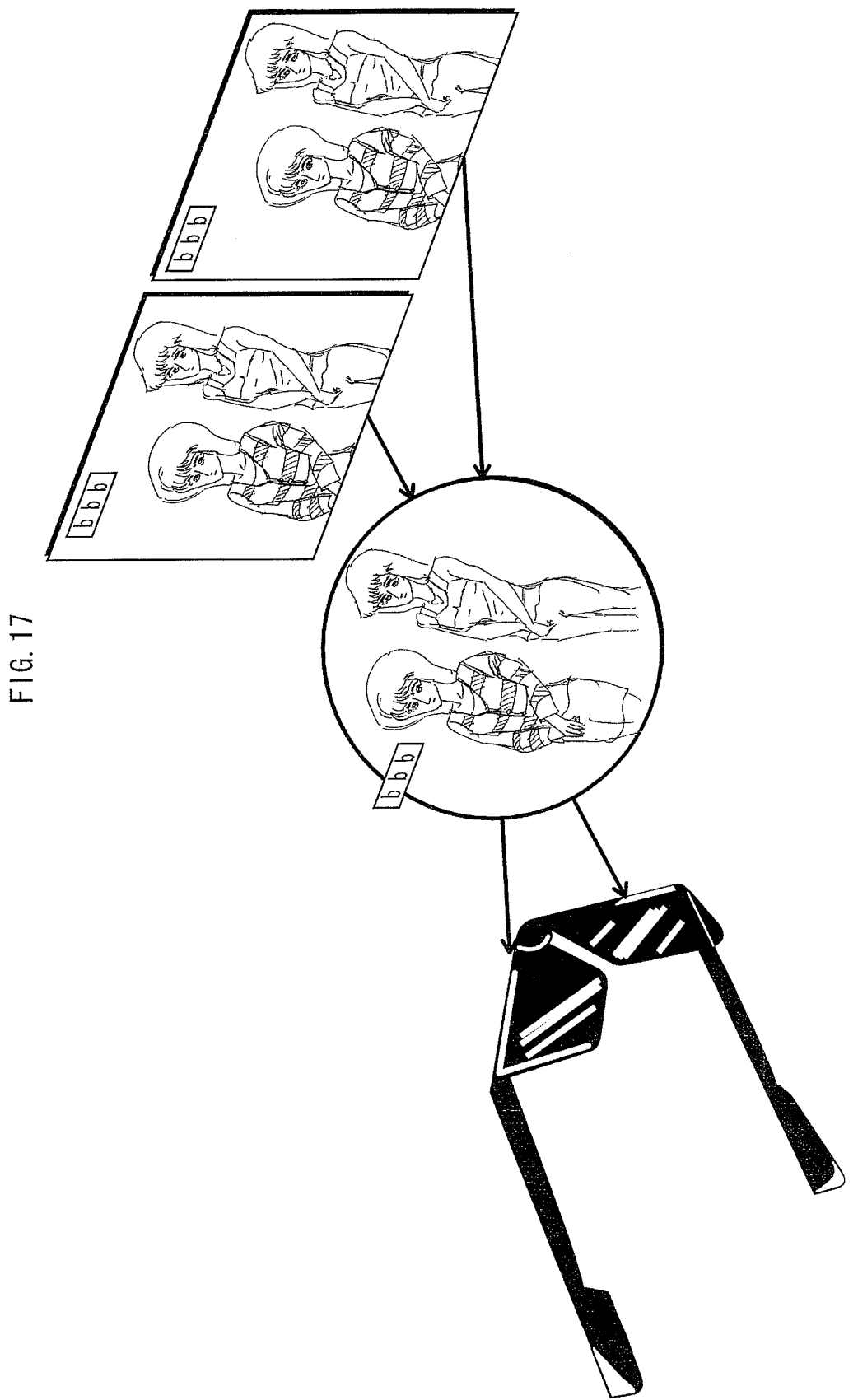
FIG. 17 shows stereoscopic video images to be played back by writing shown in FIG. 16D.

FIG. 17 shows stereoscopic video images to be played back by writing shown in FIG. 16D. Since the content stored in the right-view graphics plane and the content stored in the left-view graphics are different, the inconsistency does not occur.

As described in the above, according to the present embodiment, the 2D graphics rendering request is invalidated prior to the copy between the graphics planes. Therefore, new graphics is not written in the left-view graphics plane after the copy of the pixel data from the left-view graphics plane to the right-view graphics plane. Even when the 2D graphics rendering request arrives at the java.awt.Graphics with delay, the graphics will not be displayed in accordance with the 2D graphics rendering request. Therefore, inconsistency between the right view and the left view does not occur.

Second Embodiment

In the first embodiment, the 2D graphics rendering request is invalidated by eliminating the call code of the API of the 2D graphics rendering request stored in the stack. However, the ignorance of the 2D graphics rendering request includes processing of causing a 2D graphics rendering receiving side to perform no processing in response to the 2D graphics rendering request only while the plane setting is the two-plane setting after the plane setting switching (i.e. "temporal invalidation" of the 2D graphics rendering request when the plane setting is switched).

Therefore, in the present embodiment, a 2D graphics rendering prohibition flag is used in order to ignore the 2D graphics rendering request by performing no processing in response to the 2D graphics rendering request only while the plane setting is the two-plane setting.

The 2D graphics rendering prohibition flag is for instructing the Graphics#drawImage to determine whether to ignore or accept the 2D graphics rendering request. Improvement to the Graphics#drawImage that results from addition of this 2D graphics rendering prohibition flag is to include, as processing to be initially performed by the processing unit, processing of referring to the 2D graphics rendering prohibition flag. This referring processing is to immediately respond to the 2D graphics rendering request by performing exceptional processing (typically no processing) without the processing of the Graphics#drawImage, when the 2D graphics rendering prohibition flag is ON. When the 2D graphics rendering prohibition flag is OFF, on the other hand, the processing of the Graphics#drawImage is executed.

The improvement to the setConfiguration is, on the other hand, to switch the 2D graphics rendering prohibition flag from OFF to ON, when the switching from the one-plane setting to the two-plane setting is instructed after the setConfiguration is called. Thus, while the plane setting is the two-plane setting, the Graphics#drawImage exceptionally ends the processing without processing the 2D graphics rendering request in the stack in responding to an application that has made the 2D graphics rendering request.

The setConfiguration switches, on the other hand, the 2D graphics rendering prohibition flag from ON to OFF, when the switching from the two-plane setting to the one-plane setting is instructed after the setConfiguration is called. Thus, while the plane setting is the one-plane setting, the Graphics#drawImage accepts the 2D graphics rendering request in the stack, and renders the 2D graphics.

According to the above-described present embodiment, the ignorance of the 2D graphics rendering request is realized with a structure in which the 2D graphics rendering receiving side is caused to perform no processing in response to the 2D graphics rendering request only while the plane setting is the two-plane setting. Therefore, the ignorance of the 2D graphics rendering request can be realized with simple processing. Such simple processing facilitates the execution of the ignorance of the 2D graphics rendering request.

Third Embodiment

A third embodiment has substantially the same contents as the embodiment described in the Description attached to the priority documents (base application) of the present application.

The present embodiment is described on the precondition that stereoscopic playback of video images stored on the BD-ROM recording medium is executed for viewing. According to the BD-ROM standard, playback of data stored on a local storage or on a removable medium in compliance with the BD-ROM standard is also possible. In view of the above, the following describes the embodiment in which the playback device 200 displays stereoscopic images stored on the above-mentioned medium and storage.

18 Internal Structure of BD-ROM

Figure 18:
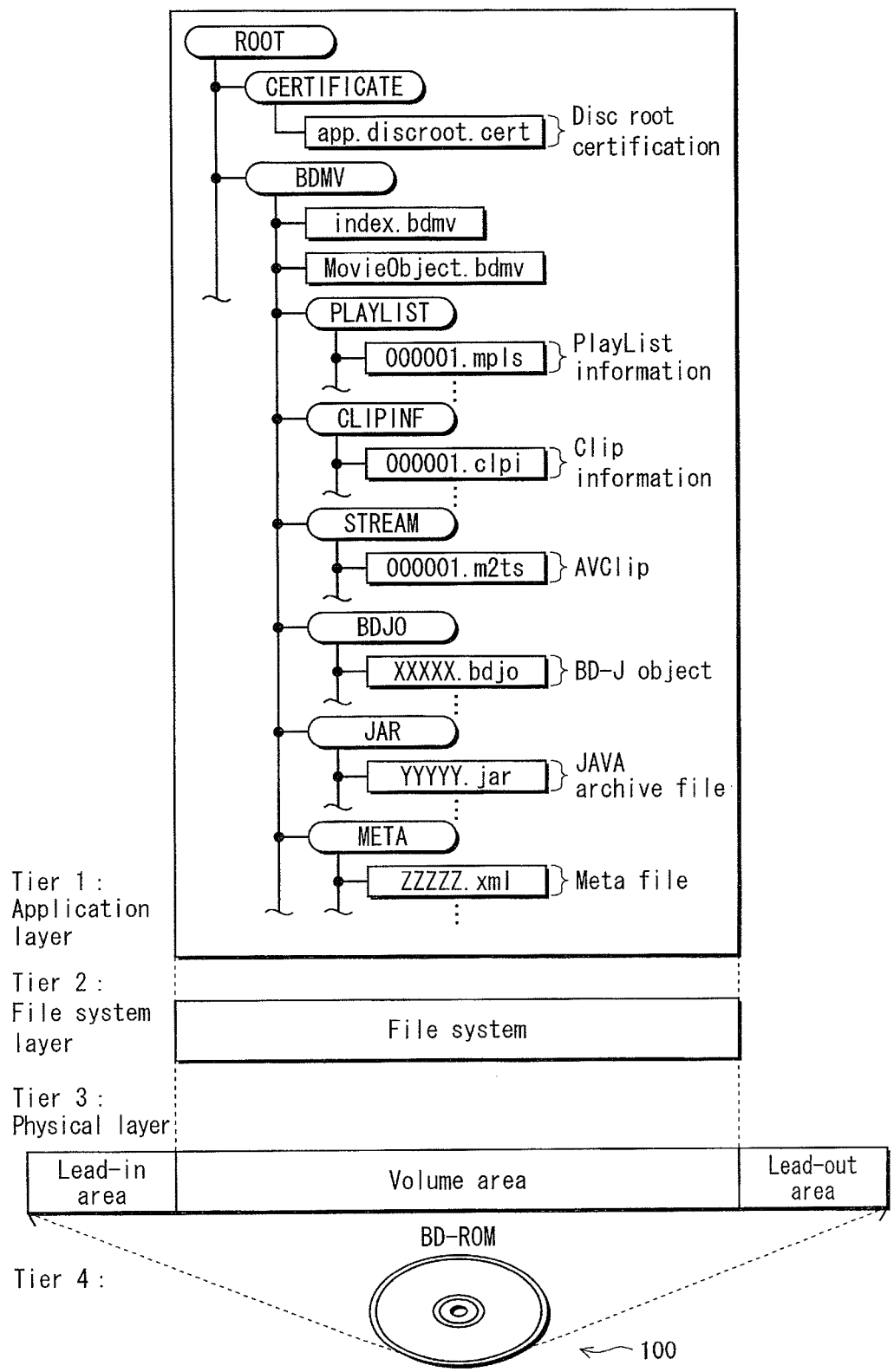
FIG. 18 shows an internal structure of a BD-ROM 100.

The following describes the internal structure of the BD-ROM 100 to be played back by the playback device 200. FIG. 18 shows an internal structure of a BD-ROM 100.

Tier 4 of FIG. 18 shows the BD-ROM, and Tier 3 shows a track on the BD-ROM. Although the track spirals outwards from the inner circumference of the BD-ROM, it is extended horizontally in the depiction in FIG. 18. The track consists of a lead-in area, a volume area and a lead-out area. In addition, a special area called a BCA (Burst Cutting Area) exists in the lead-in area. The BCA is readable only by a limited entity and therefore often used for copyright protection technology or the like.

The volume area in FIG. 18 has a layer model having a physical layer, a file system layer and an application layer. The volume area stores application data such as image data starting with file system information. The file system is UDF, ISO9660, or the like. In the same manner as a normal PC, logic data stored in the volume area is readable with use of a directory or a file structure. A file name or a directory name consisting of 255 characters can be read.

Tier 1 of FIG. 18 shows the application layer format (application format) of the BD-ROM expressed using a directory structure. As shown in Tier 1, the BD-ROM has a CERTIFICATE directory and a BDMV directory below a Root directory.

The BDMV directory is a directory in which data such as AV content and management information used in the BD- ROM are recorded. The BDMV directory has six sub-directories called a PLAYLIST directory, a CLIPINF directory, a STREAM directory, a BDJO directory, a JAR directory, and a META directory. The BDMV directory stores two types of files, i.e. INDEX.BDMV and MovieObject.bdmv.

The STREAM directory is a directory for storing a file that is the body of a transport stream. A file having the extension "m2ts" (e.g., 00001.m2ts) exists in the STREAM directory.

The PLAYLIST directory is a directory for storing files each having the extension "mpls" (e.g., 00001.mpls).

The CLIPINF directory is a directory for storing file each having the extension "clpi" (e.g., 00001.clpi).

The BDJO directory is a directory for storing files each having the extension "bdjo" (e.g., XXXXX.bdjo).

The JAR directory is a directory for storing files each having the extension "jar" (e.g., YYYYY.jar).

The META directory is a directory for storing XML files (e.g., ZZZZZ.xml).

The following describes these files.

18.1 AV Clip

First, a file having the extension "m2ts" is described. A file to which the extension "m2ts" is given is a file of a digital AV stream in a MPEG-TS (TransportStream) format, and is acquired by multiplexing various streams including a video stream, one or more audio streams, a dialogic stream and a graphics subtitle stream. The video stream represents the moving pictures of a movie, and the audio streams represent the audio of the movie. Some stream files are exclusively for 2D playback, and some stream files are for both 2D playback and 3D playback. Stream files for the 2D playback are in a general transport stream format, and stream files for both the 2D and 3D playback are in a file format for stereoscopic interleaved streams files.

In the file format for the stereoscopic interleaved stream files, extents of a main transport stream (main TS) including a base-view video stream and extents of a sub transport stream including a dependent-view video stream are interleaved.

18.2 PlayList Information

A file having the extension "mpls" is a playlist information file storing therein playlist (also expressed as "PL") information. A "playlist" defines playback sections along the time axis of the transport stream (TS) and is a playback path defined by logically specifying the playback order of playback sections. More specifically, the playlist has the function of defining which part of the TS is played and in what order scenes unfold. The playlist information defines the "type" of the playlist. The playback path defined by the playlist information is a so-called "multi-path" that is a group of a playback path (main-path) defined for the main TS and a playback path (sub-path) defined for a sub TS. By defining a playback path for a base-view video as the main-path, and a playback path for a dependent-view video stream as the sub-path, a multi-path that is suitable for stereoscopic playback of video streams is defined.

When an application based on an object-oriented programming language instructs generation of a framework player instance for playing back such playlist information, the AV playback by the multi-path starts. The framework player instance is actual data that is generated on the heap memory of the virtual machine based on a media framework player class. Also, when a command-based program issues a playback command that specifies such playlist information by an argument, the playback by the multi-path starts.

18.3 Clip Information

A file having the extension "clpi" is a stream information file that is in correspondence with each of stream files. The stream information files ensure random access to any source packets included in the transport stream of the stream files, and seamless playback with other transport streams. The stream files are managed as the "AV Clip" through the stream information files. The stream information files have basic entry maps showing presentation time stamps in each frame period in one-to-one correspondence with information (such as a coding format, a frame rate, a bit rate and resolution) and a source packet number of a start position of a GOP, regarding the stream in the AV Clip. Therefore, when the stream information files are loaded in the memory prior to the access to the stream files, it is possible to obtain information as to what the transport stream (included in the stream files) to be accessed are like. Therefore, the execution of the random access can be ensured. There are two types of stream information files (i.e. 2D stream information files and 3D stream information files). The 3D stream information files each include clip information for the base-view (clip-base information) and clip information for dependent-view (clip-dependent information).

The clip-base information includes extent start point information for the base-view. The clip-dependent information includes extent start point information for the dependent-view. The extent start point information for the base-view is composed of a plurality of source packet numbers. Each of the source packet numbers shows at which packet a division position of each extent in the main TS exists. The extent start point information for the dependent-view is also composed of a plurality of source packet numbers. Each of the source packet numbers shows at which packet a divisional position of each extent in the sub TS exists. With use of these extent start point information pieces, the stereoscopic interleaved stream files are divided into the main TS and the sub TS. The above Clip information and PL information are categorized into a "static scenario".

18.4 BD-J Object

A description is now given of a file having the extension "BDJO".

According to the BD-ROM standards, an application program may be executed during video playback to handle any given computing during video playback. For example, dynamic playback control, interactivity with the user during playback, and so on are realized. The BD-ROM adopts Java™ as the application platform standard and the Java™ platform adopted according to the BD-ROM standards is referred to as BD-Java or BD-J and an execution application is referred to as a BD-Java application or a BD-J application.

A file to which the extension "BDJO" is given stores a BD-J object. A BD-J object includes various pieces of information used for-execution of a BD-Java application. The various pieces of information include association with a playback title, association with a JAR file described later, reference values of PlayList information, and an application management table.

The application management table stores, for each BD-J application to be executed, detailed information on the BD-J application, such as a character string showing the name of the BD-J application, and an icon locator showing the location of an icon associated with the BD-J application.

18.5 JAR File

The JAR file is program information of the BD-J application that is archived. The BD-J application is composed of one or more class files that are each an execution form of a Java™ program, and various types of data to be used during execution of the program. The JAR file is a file form including the above information.

18.6 Meta File

A metafile (ZZZZZ.xml) stored in the META directory contains various information related to a movie stored on the disc. Examples of the information contained in the metafile include the name of the disc, an image of the disc, the name of the creator of the disc, and the name of each title.

This concludes the description of the BDMV directory.

The CERTIFICATE directory stores a file of the disc root certificate (app.discroot.cert).

This file contains information about a digital certificate that is used in a process (hereinafter, "signature verification") to confirm that the BD-J application has not been tampered with and to authenticate the identity of the BD-J application.

This concludes the description of the BD-ROM 100. According to the BD-ROM standards, some of the above-described files (e.g., the metafile) are not necessarily essential. Playback of the BD-ROM 100 as a video recording medium is duly possible according to the BD-ROM standards, even without one or more of the above-described files.

19 Internal Structure of BD-ROM Playback Device

The following describes a playback device 200 in the present embodiment.

Figure 19:
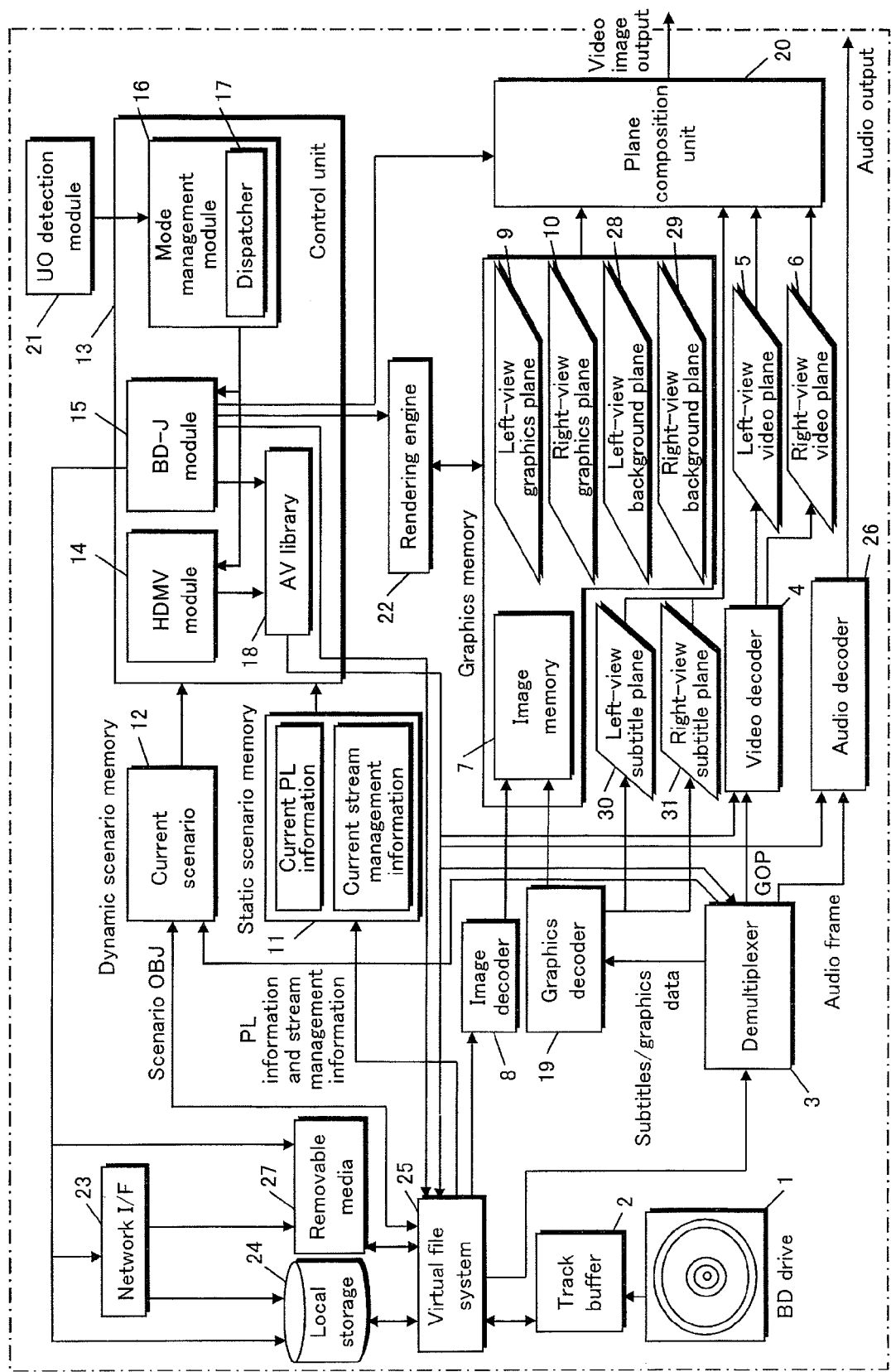
FIG. 19 is a block diagram that shows an internal structure of the playback device.

FIG. 19 is a block diagram that shows an internal structure of the playback device. As shown in FIG. 19, the playback device 200 includes a BD-drive 1, a track buffer 2, a demultiplexer 3, a video decoder 4, a left-view video plane 5, a right-view video plane 6, an image memory 7, an image decoder 8, a left-view graphics plane 9, a right-view graphics plane 10, a static scenario memory 11, a dynamic scenario memory 12, a control unit 13, a HDMV module 14, a BD-J module 15, a mode management module 16, a dispatcher 17, an AV playback library 18, a graphics decoder 19, a plane composition unit 20, a UO search module 21, a rendering engine 22, a network interface 23, a local storage 24, a virtual file system 25, an audio decoder 26, a removable medium 27, a left-view background plane 28, a right-view background plane 29, a left-view subtitle plane 30 and a right-view subtitle plane 31. A simple model (in which the graphics planes and the video planes are used) is adopted as the layer model of the plane memories in the first embodiment. In a third embodiment, however, a model in which the graphics planes, the subtitle planes, the video planes, the background planes and the graphics planes are used is adopted as the internal structure of the playback device.

19.1 BD Drive 1

The BD drive 1 loads and injects the BD-ROM, and makes access to the BD-ROM.

19.2 Track Buffer 2

The track buffer 2 is an FIFO memory, and stores therein access units read from the BD-ROM in the first-in first-out.

19.3 Demultiplexer 3

The demultiplexer 3 demultiplexes, through the virtual file system 25, transport streams stored in the BD-ROM loaded in the BD-drive 1, the local storage 24 or the removable medium 27. The demultiplex by the demultiplexer 3 includes conversion processing that converts TS packets into PES packets. As a result of the demultiplex, it is possible to obtain video frames composing GOPs, audio frames, a graphics stream and a subtitle stream. The video frames composing the GOPs are outputted to the video decoder 4, and the audio frames multiplexed with the GOPs are outputted to the audio decoder 26. Other graphics streams that can be obtained by the demultiplex are outputted to the graphics decoder 19.

19.4 Video Decoder 4

The video decoder 4 decodes the video frames output from the demultiplexer 3, and writes uncompressed images into the left-view video plane 5 and the right-view video plane 6.

19.5-6 Left-View Video Plane 5 and Right-View Video Plane 6

Each of the left-view video plane 5 and the right-view video plane 6 is memory for storing the uncompressed images. The left-view video plane 5 stores video images for the left eye, whereas the right-view video plane 6 stores video images for the right eye. These correspond to the HVideoDevices in the HAVi device. Playback of a stereoscopic video stream can be realized by the video decoder 4 continuously rewriting images into the left-view video plane 5 and the right-view video plane 6 upon issuance of a video playback request instruction by the BD-J application.

19.7 Image Memory 7

The image memory 7 is a buffer for storing picture images that have been read via the virtual file system 25 and decoded by the image decoder. Other than storing such decoded picture images, the image memory 7 may also serve as a general-purpose image buffer used by the BD-J application.

19.8 Image Decoder 8

The image decoder 8 reads out compressed picture images via the virtual file system, and writes the compressed picture images into the image memory in a manner that allows the rendering engine 22 to perform copy processing and a operation processing at high speed. For example, the image decoder 8 may perform the writing in an ARGB8888 format.

19.9 to 10 Left-View Graphics Plane 9 and Right-View Graphics Plane 10

The left-view graphics plane 9 and the right-view graphics plane 10 are memories for storing therein images to be overlaid on the video plane(s) and the subtitle plane(s). These graphics planes correspond to the HGraphicsDevices in the HAVi device. These graphics planes realizes menu display, for example.

19.11 Static Scenario Memory 11

The static scenario memory 11 is used to store a current PL and current stream management information. The current PL refers to one of the PLs that can be read via the virtual file system 25 and that is currently processed. The current stream management information refers to a piece of stream management information that is currently processed, out of a plurality of pieces of stream management information that are readable via the virtual file system 25.

19.12 Dynamic Scenario Memory 12

The dynamic scenario memory 12 is used to store a current dynamic scenario and used for processing by the HDMV module 14 and the BD-J module 15. The current dynamic scenario refers to a dynamic scenario that is currently processed, out of a plurality of dynamic scenarios that are readable via the virtual file system 25.

19.13 Control Unit 13

The control unit 13 is a microcomputer system composed of ROM, RAM, and a CPU. The ROM stores a program controlling the playback device. The program in the ROM is read into the CPU, and by cooperating with the hardware resources, the program implements the functions of the HDMV module 14, the BD-J module 15, the mode management module 16, the dispatcher 17 and the AV playback library 18.

19.14 HDMV Module 14

The HDMV module 14 is a virtual player for DVD videos. The term HDMV (High Definition Movie Mode) is an operational mode in which the player operates in a command interpreter format that is compatible with DVD playback.

19.15 BD-J Module 15

The BD-J module 15 is a middleware platform including a Java™ virtual machine, and executes a BD-J application. A BD-J application is recorded on the BD-ROM 100 in association with video to be played back. When the video is played back, the BD-J application is read by the dynamic scenario memory 12, and then executed by the BD-J module 15. The Java™ virtual machine interprets the BD-J application and causes the CPU to execute the BD-J application. Part of the BD-J module 15 may be realized by hardware or software.

19.16 Mode Management Module 16

The mode management module 16 holds a mode management table read via the virtual file system 25 and performs mode management and branch control. In the mode management performed by the mode management module 16, module allocation is performed to decide which one of the HDMV module 14 and the BD-J module 15 is to execute a dynamic scenario.

19.17 Dispatcher 17

The dispatcher 17 selects one or more user operations (hereinafter may be referred to as "UOs") appropriate in the current mode of the playback device, from among UOs received from the UO detection module 21, and passes the selected UOs to the module assigned to execute in the mode. For example, when UOs for up, down, right, and left movements and for activation are received in the HDMV mode, the dispatcher 17 outputs the UOs to the HDMV mode module.

19.18 AV Playback Library 18

The AV playback library 18 is used to execute the AV playback function and the playback function of the playlist in accordance with the call by the HDMV module 14 or the BD-J module 15. With this library, the control unit functions as the playback control engine. AV playback functions are a function group that is defined in the BD-ROM and inherited from DVD players and CD players. The AV playback functions are processing such as starting and stopping playback, pause, un-pause, cancel still picture function, fast forward at an indicated playback rate, rewind at an indicated playback rate, audio switching, sub-video switching, angle switching, etc. Playlist playback functions refer to starting or pausing playback in accordance with the playlist information. The playlist playback function starts and stops playback, from among the above AV playback functions, in accordance with the playlist information.

19.19 Graphics Decoder 19

The graphics decoder 19 performs decoding processing of subtitle data, and writes the decoded left-view subtitle images and the decoded right-view subtitle image in the left-view subtitle plane 30 and the right-view subtitle plane 31, respectively.

19.20 Plane Composition Unit 20

The plane composition unit 20 performs left-view and right-view composition processing for four types of planes (i.e. the background planes, the video planes, the subtitle planes and the graphics planes), based on the after-mentioned composition mode. Then, the plane composition unit 20 outputs the results as video images.

19.21 UO detection Module 21

The UO detection module 21 accepts user operations (UOs) that the viewer made on the playback device. Such UOs may be made remotely via the remote controller or the like, or directly on the playback device via an interface such as a button provided on the playback device.

19.22 Rendering Engine 22

The rendering engine 22 performs the process of rendering images on the image memory 7, the left-view graphics plane 9, the right-view graphics plane 10, the left-view background plane 28 and the right-view background plane 29 (hereinafter, these are collectively referred to as a "graphics memory"). The BD-J module 15 is provided with a library of rendering processes to be performed by the rendering engine 22 on the left-view graphics plane 9 and the right-view graphics plane 10. The rendering processes include the rendering of lines or an object such as a rectangle with a specified color, filling of a specified region, and copy and paste of a specified image. By continuously issuing requests for the rendering processes, the BD-J application realizes rendering of various graphics.

19.23 Network Interface 23

The network interface 23 is used for downloading BD-ROM supplemental contents publicly available on the Internet. Supplemental BD-ROM contents are contents not on the original BD-ROM, such as supplemental sub-audio, subtitles, bonus video, applications, etc. The BD-J module 15 controls the network interface 23, so that a supplemental content released on the Internet is downloaded to the local storage 24 or the removable medium 27.

19.24 Local Storage 24

The local storage 24 is a magnetic recording device, such as a hard disk, built into the playback device and stores various data used for the transport stream and playback in the file format of the BD-ROM 100 or in a compatible file format.

19.25 Virtual File System 25

The virtual file system 25 is a file system that provides the functionality of reading and writing files stored on the BD-ROM 100, the local storage 24, and the removable medium 27.

Usually, the playback device is required to access files on the BD-ROM 100 for executing playback of the BD-ROM. Yet, the virtual file system 25 provides the functionality of virtually converting file addresses so that files on the local storage 24 and the removable medium 27 are accessed as if they are stored on the BD-ROM 100. That is, the virtual file system 25 provides the functionality for implementing the abstraction of the physical recording medium.

19.26 Video Decoder 26

The audio decoder 26 decodes audio frames output from the demultiplexer 3 into uncompressed audio data and outputs the uncompressed audio data.

19.27 Removable Medium 27

The removable medium 27 is a storage medium that is inserted into an external slot attached to the playback device.

19.28-29 Background Planes 28 and 29

The left-view background plane 28 and the right-view background plane are used to store background images, and correspond to the HBackgroundDevices in the HAVi device. The video planes are overlaid on the background planes. Accordingly, when the video is displayed all over the display screen, the background planes are hidden behind the video and therefore invisible to the viewer. On the other hand, when the video is displayed while being scaled down (i.e., reduced in size), each background image is displayed as a background of the video. It is preferable that while a variety of colors are available in the graphics planes, a number of colors available in the background planes is limited. In such a case, it is preferable that images that can be transferred to the background planes and images that can be transferred to the graphics planes are distinguished as different types of bitmap images. This structure reduces the number of colors used for the background planes, and therefore provides the effect of decreasing a memory size required for the background planes.

19.30-31 Left-View Subtitle Plane 30 and Right-View Subtitle Plane 31

The left-view subtitle plane 30 and the right-view subtitle plane 31 are used to store therein subtitle images overlaid on the video.

19.20.1 Composition Modes in Plane Composition Unit 20

The following describes composition modes for the plane composition unit 20.

The basic functions of the plane composition unit 20 are as follows. The plane composition unit 20 composites together a set of the left-view background plane, video plane, subtitle plane and graphics plane in this order, and composites together a set of the right-view background plane, video plane, subtitle plane and graphics plane in this order, with each background plane at the bottom. Then, the plane composition unit 20 outputs the composition results as video images. Accordingly, the output left-view and right-view video images are different from each other. Thus presenting different images to the left eye and the right eye provides the effect of enabling the viewer to see stereoscopic video.

However, even when it is intended to perform a stereoscopic presentation, there is no need to store different images in every pair of left-view and right-view planes. For example, only the left-view and right-view video planes may store different images; the left-view and right-view background planes that are displayed from behind the video planes, as well as the left-view and right-view graphics planes (i.e., menus) that are displayed overlaid on the video planes, may store the same image. Although this structure makes the background planes and the graphics planes look monoscopic to the viewer, it also makes it easy to create BD-ROM contents, which can be an advantage in terms of cost.

In order to achieve both reduction in the cost of creating BD-ROM contents and a highly-functional stereoscopic presentation, the plane composition unit 20 of the playback device 200 supports a plurality of composition modes, and the BD-J application dynamically switches between different composition modes when necessary.

For example, when a monoscopic menu screen is being displayed, the same image is stored in each of the left-view and right-view graphics planes. When this menu is switched to a bonus game function, the left-view and right-view graphics planes need to provide stereoscopic effects; in this case, the current composition mode of the left-view and right-view graphics planes should be switched to another composition mode that causes the left-view and right-view graphics planes to present different graphics. Similarly, when the left-view and right-view background planes are used to show a background of video that is displayed while being scaled down, the same image may be stored in each of the left-view and right-view background planes. On the other hand, when the left-view and right-view background planes are used to show a background of the game function, the current composition mode of the left-view and right-view background planes should be switched to another composition mode that causes the left-view and right-view background planes to present different images.

By thus configuring the plane composition unit 20 to have a plurality of composition modes, the content authoring staff can make a wide variety of choices in, for example, creating a simple, easy-to-make menu or designing an elaborate stereoscopic menu. This gives greater flexibility to creators of BD-ROM contents.

The following describes the composition in the plane composition unit 20.

20 Internal Structure of Plane Composition Unit 20

FIG. 20A shows a layer structure of the plane memory and the structural elements of the composition unit 20. The composition unit includes, as elements, adders 51, 52 and 53 that are provided in the left-view output system of the layer structure of the plane memory, adders 61, 62 and 63 and switches 64 and 65 that are provided in the right-view output system of the layer structure of the plane memory.

The adder 51 composites content stored in the left-view video plane and content stored in the left-view background plane.

The adder 52 composites content stored in the left-view subtitle plane and content resulting from the composition by the adder 51.

The adder 53 composites content stored in the left-view graphics plane and content resulting from the composition by the adder 52.

The adder 61 composites the content stored in the right-view video plane and content stored in the left-view background plane or the right-view background plane.

The adder 62 composites content stored in the right-view subtitle plane and content resulting from the composition by the adder 61.

The adder 63 composites content stored in the left-view graphics plane or the right-view graphics plane and content resulting from the composition by the adder 62.

The switch 64 switches the source of supply of the pixel data to the adder 61 to the left-view background plane or the right-view background plane. When the source of supply of the pixel data to the adder 61 is the left-view background plane, the current plane setting is the one-plane setting. When the source of supply of the pixel data to the adder 61 is the right-view background plane, the current plane setting is the two-plane setting.

The switch 65 switches a source of supply of the pixel data to the adder 63 between the left-view graphics plane and the right-view graphics plane. When the source of supply of the pixel data to the adder 61 is the left-view graphics plane, the current plane setting is the one-plane setting. When the source of supply of the pixel data to the adder 61 is the right-view graphics plane, the current plane setting is the two-plane setting.

Since there are the right-view subtitle plane and the left-view subtitle plane, a subtitle plane setting includes the one-plane setting and the two-plane setting. However, the description of a case where the subtitle plane setting is the one-plane setting is complicated. Therefore, the description is given under the assumption that the subtitle plane setting is always the two-plane setting.

21 Variations of Composition Modes

The output system in the 2D playback mode is fixed as shown in FIG. 20B. In the 3D playback mode, on the other hand, there are the right-view output system and the left-view output system. In the left-view output system, there are four kinds of variations as shown in FIGS. 21A to 21D, in accordance with whether the source of supply of the data to the adder is the right-view plane memory or the left-view plane memory. That is, there is no variation of the output system in the 2D playback mode. There are four composition modes (composition modes 1, 2, 3 and 4) for the plane composition unit 20 that are realized by switching between the output systems in four ways in the 3D playback mode. The following describes the above-mentioned modes with use of FIGS. 21A to 21D.

21.1 Composition Mode 1

FIG. 21A shows a composition mode 1 in the output system in which a ratio among the number of graphics planes, the number of subtitle planes, the number of video planes and the number of background planes is 2:2:2:2. Since the number of graphics planes, the number of subtitle planes, the number of background planes and the number of graphics planes are each two, the source of supply to the adder 63 is the right-view graphics plane, and the source of supply to the adder 61 is the right-view background plane. In the composition mode 1, the left-view and right-view graphics planes are used. The left-view and right-view background planes are used, too. As an output of the left-view video image, the left-view background plane, the left-view video plane, the left-view subtitle plane and the left-view graphics plane are composited in this order with the left-view background plane being at the bottom. Similarly, as an output of the right-view video image, the right-view background plane, the right-view video plane, the right-view subtitle plane and the right-view graphics plane are composited in this order with the right-view background plane being at the bottom. In the composition mode 1, both the graphics planes and the background planes can provide stereoscopic view.

21.2 Composition Mode 2

FIG. 21B shows a composition mode 2 in the output system in which a ratio among the number of graphics planes, the number of subtitle planes, the number of video planes and the number of background planes is 1:2:2:2. Since the number of graphics planes is "one", the source of supply to the adder 63 is the left-view graphics plane, and the source of supply to the adder 61 is the right-view background plane. In the composition mode 2, only the left-view graphics plane is used. The left-view graphics plane is referred to for the output of the left-view video image and the output of the right-view video image. As a result, left-view and right-view video images outputted from the graphics planes are the same. Therefore, the user perceives the outputted images monoscopically. Both the left-view and right-view background planes are used in the composition mode 2 as with the composition mode 1. In the composition mode 2, as an output of the left-view video image, the left-view background plane, the left-view video plane, the left-view subtitle plane and the left-view graphics plane are composited in this order with the left-view background plane being at the bottom. Similarly, as an output of the right-view video image, the right-view background plane, the right-view video plane, the right-view subtitle plane and the right-view graphics plane are composited in this order with the right-view background plane being at the bottom. Therefore, although the background planes can be shown stereoscopically, the graphics planes are shown monoscopically.

21.3 Composition Mode 3

FIG. 21C shows a composition mode 3 in the output system in which a ratio among the number of graphics planes, the number of subtitle planes, the number of video planes and the number of background planes is 2:2:2:1. Since the number of background planes is one, the source of supply to the adder 61 is the left-view background plane. In the composition mode 3, the left-view and right-view graphics planes are used, and only the left-view background plane is used. The left-view graphics plane is referred to for the output of the left-view video image and the output of the right-view video image. As a result, left-view and right-view video images outputted from the background plane are the same. Therefore, the user perceives the outputted images monoscopically. In the composition mode 3, as an output of the left-view video image, the left-view background plane, the left-view video plane, the left-view subtitle plane and the left-view graphics plane are composited in this order with the left-view background plane being at the bottom. Similarly, as an output of the right-view video image, the right-view background plane, the right-view video plane, the right-view subtitle plane and the right-view graphics plane are composited in this order with the right-view background plane being at the bottom. Therefore, although the graphics planes can be shown stereoscopically, the background planes are shown monoscopically.

21.4 Composition Mode 4

FIG. 21D shows a composition mode 4 in the output system in which a ratio among the number of graphics planes, the number of subtitle planes, the number of video planes and the number of background planes is 1:2:2:1. Since the number of graphics planes is one and the number of background planes is one, the source of supply to the adder 63 is the left-view graphics plane, and the source of supply to the adder 61 is the left-view background plane. In the composition mode 4, only the left-view graphics plane and the left-view background plane are used. That is, as an output of the left-view video image, the left-view background plane, the left-view video plane, the left-view subtitle plane and the left-view graphics plane are composited in this order with the left-view background plane being at the bottom. Similarly, as an output of the right-view video image, the right-view background plane, the right-view video plane, the right-view subtitle plane and the right-view graphics plane are composited in this order with the right-view background plane being at the bottom. Therefore, in the composition mode 4, the graphics planes and the background planes are shown monoscopically.

22. API of Graphics Rendering Functions

The following describes the graphics function of the BD-J module 15. FIGS. 22A, 22B, 22C, 22D and 22E each show an example of API of the graphics rendering function supported by the BD-J module 15. FIGS. 23A, 23B, 23C, 23D and 23E each show an example of call code of API of the graphics rendering function. The BD-J module 15 executes the actual rendering processing by using the rendering engine 22. This execution is triggered by the BD-J application calling the above APIs (i.e., issuing rendering requests).

22.1 Image Rendering Request 801

An image rendering request 801 is a request for copying a single bitmap image to the left-view graphics plane 9, in the playback device having the internal structure of the third embodiment. The image rendering request 801 corresponds to the Graphics#drawImage in the first embodiment. After a copy source image and a rendering position in a copy target are input, the image rendering request 801 copies the copy source image to the specified rendering position in the left-view graphics plane 9. The copy source image is stored in the image memory, and transferred therefrom to the left-view graphics plane 9 at high speed.

22.2 Left/Right Images Rendering Request 802

A left/right images rendering request 802 is a request for simultaneously copying two bitmap images respectively to the left-view graphics plane 9 and the right-view graphics plane 10, in the playback device having the internal structure of the third embodiment. The left/right images rendering request 802 corresponds to the StereoGraphics#drawImage in the first embodiment. After two copy source images and two rendering positions are input, the left/right images rendering request 802 renders one of the copy source images into the left-view graphics plane 9, and the other one into the right-view graphics plane 10. The copy source images are stored in the image memories. The rendering engine 22 transfers the copy source images from the image memory to the left-view graphics plane 9 and the right-view graphics plane 10 at high speed, respectively.

22.3 Composition Mode Switch Request 803

A composition mode switch request 803 is an API for switching between the composition modes of the plane composition unit 20, in the playback device having the internal structure of the third embodiment. The third embodiment is different from the first embodiment in that resolution, a graphics plane setting and a background plane setting are input, in the third embodiment. Although the resolution is necessary when the playback device 200 supports a plurality of resolutions, the present embodiment is described under the assumption that the resolution is always 1920×1080.

In the third embodiment, the background planes exist as the plane memories. Therefore, in making a composition mode switch request, selection between the one-plane setting and the two-plane setting is available as the graphics plane setting and the background plane setting. The one-plane setting shows a mode in which the same video images are outputted as the left-view and right-view video images, and corresponds to the above-mentioned 1plane+Offset mode. The two-plane setting shows a mode in which the different video images are outputted as the left-view and right-view video images, and corresponds to the above-mentioned 3D-LR mode. When the two-plane setting is requested as each of the graphics plane setting and the background plane setting, the plane composition unit 20 need to switch the composition mode to the after-described composition mode 1. Similarly, the composition mode is uniquely determined for the plane composition unit 20 based on the graphics plane setting and the background plane setting.

22.4 Background Rendering Request 804

A background rendering request 804 is an API for copying a single bitmap image to the left-view background plane 28. After a copy source image is input, the background rendering request 804 copies the copy source image to left-view background plane 28 as a whole.

22.5 Background Rendering Request 805

A background rendering request 805 is an API for copying two bitmap images to each of the left-view background plane 28 and the right-view background plane 29. After two copy source images are input, one of the images is copied to the left-view background plane 28, and the other image is copied to the right-view graphics plane 29. The copy source images are stored in the image memories, the rendering engine 22 transfers the copy source images from the image memories to the left-view background plane 28 to the left-view background plane 28 and the right-view background plane 29 as a whole at high speed, respectively.

According to the background rendering request, setting may be made such that the copy source images are copied to the background planes as a whole, or the rendering position may be specified as with the graphics planes.

24 Processing Flow for Making Composition Mode Switch Request

Figure 24:
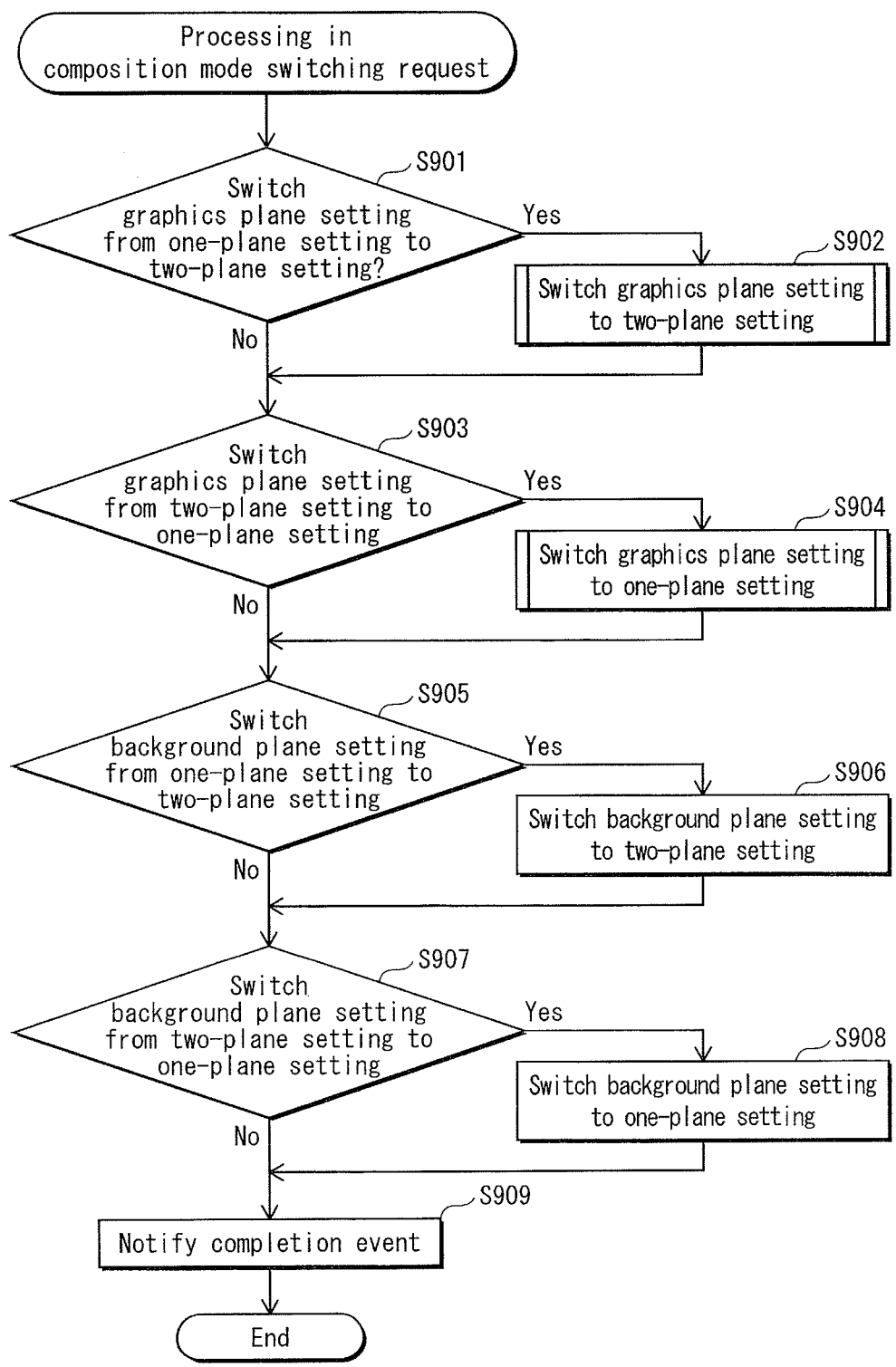
FIG. 24 shows a processing flow when a composition mode switching request 803 is called.

A description is now given of a processing flow to be followed when the composition mode switch request 803 is called, with reference to FIG. 24. The processing of the composition mode switch request 803 is to compare the current composition mode of the plane composition unit 20 with a composition mode that has been requested, and then to switch from the former to the latter.

First, the playback device 200 checks whether the following conditions are both met: (i) the requested graphics plane setting indicates the two-plane setting, which uses two graphics planes; and (ii) the current graphics plane setting indicates the one-plane setting, which uses one graphics plane (the composition mode 2 or the composition mode 4) (S901). When these conditions are both met, the playback device 200 switches to the requested graphics plane setting to use two graphics planes (S902). The specifics of this processing are described later.

Next, the playback device 200 checks whether the following conditions are both met: (i) the requested graphics plane setting indicates the one-plane setting; and (ii) the current graphics plane setting indicates the two-plane setting (the composition mode 1 or the composition mode 3) (S903). When these conditions are both met, the playback device 200 switches to the requested graphics plane setting to use one graphics plane (S904). The specifics of this processing are also described later.

Next, the playback device 200 checks whether the following conditions are both met: (i) the requested background plane setting indicates the two-plane setting, which uses two background planes; and (ii) the current background plane setting indicates the one-plane setting, which uses one background plane (the composition mode 3 or the composition mode 4) (S905). When these conditions are both met, the playback device 200 switches to the requested background plane setting to use two background planes (S906).

Next, the playback device 200 checks whether the following conditions are both met: (i) the requested background plane setting indicates the one-plane setting; and (ii) the current background plane setting indicates the two-plane setting (the composition mode 1 or the composition mode 2) (S907). When these conditions are both met, the playback device 200 switches to the requested background plane setting to use one background plane (S908). Finally, the playback device 200 notifies the BD-J application that the switch processing has been completed (S909). This notification may be performed as asynchronous event processing.

Note, when the processing shown in the flow of FIG. 24 is implemented as a synchronous API, the composition mode switch request 803 is returned to the BD-J application after the processing of S909 is completed, so that the control over the composition mode switch request 803 is given back to the BD-J application. As the BD-J system supports multithreading, other threads of the BD-J application are independently operating while the composition mode switch request 803 is being processed. However, when the composition mode switch request 803 is implemented as a synchronized method, the thread that has called the composition mode switch request 803 will be blocked until the mode switch processing is completed.

25.1 Switch from One-Plane Setting to Two-Plane Setting

Figure 25A:
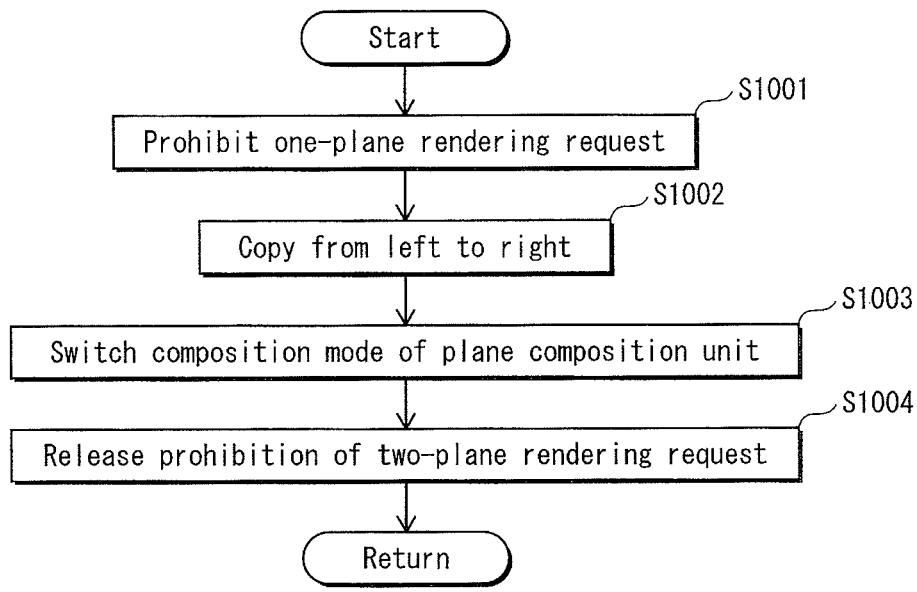
FIGS. 25A and 25B respectively show a flowchart for switching from the one-plane setting to the two-plane setting and a flowchart for switching from the two-plane setting to the one-plane setting.

With reference to FIG. 25A, the following describes a more detailed processing flow of the processing of S902, i.e., the processing of switching the graphics plane setting from the one plane structure to the two plane structure.

First, the playback device 200 prohibits the image rendering request 801, which is a request for rendering an image into one graphics plane (S1001). If the image rendering request 801 is called while this prohibition is in effect, then this call is ignored or causes exceptional operations, as described above. In a default state where one graphics plane is used, calling of the image rendering request 801 is permitted, but calling of the left/right images rendering request 802 is prohibited, as described above. In such a default state, the processing of S1001 prohibits both of the calling of the image rendering request 801 and the calling of the left/right images rendering request 802.

Next, the playback device 200 copies the entire content of the left-view graphics plane 9 to the right-view graphics plane 10 (S1002). Prior to the composition mode switch processing of S902, only the images of the left-view graphics plane 9 are output as video images; it is indefinite what kind of images are stored in the right-view graphics plane 10 (e.g., images of the right-view graphics plane 10 are entirely black). If the playback device 200 switches to use of two graphics planes in the above state, then the entirely black image of the right-view graphics plane 10 will be output as a video image. Calling of the composition mode switch request 803 by the BD-J application naturally implies that the BD-J application is subsequently expected to render a correct image into the right-view graphics plane 10 as well; however, if there is any time lag between the call and the rendering, then the entirely black image will be output and presented to the right eye for a split second. This creates inconsistency between the left-view image and the right-view image. To avoid such inconsistency, the content of the left-view graphics plane 9 is mandatorily copied to the right-view graphics plane 10 in S1002. As a result, the consistency between the output left-view and right-view images is maintained.

Next, the playback device 200 switches from the current composition mode of the plane composition unit 20 to the composition mode 1 or the composition mode 3 (S1003). Specifically, the playback device 200 switches (i) to the composition mode 1 if the current background plane setting indicates the two-plane setting, and (ii) to the composition mode 3 if the current background plane setting indicates the one-plane setting.

Finally, the playback device 200 removes the prohibition on the left/right images rendering request 802, which is a request for rendering different images into the two graphics planes (S1004). When the left/right images rendering request 802 is called after the prohibition on the left/right images rendering request 802 is removed, copy processing is performed. The processing of S1004 prohibits calling of the image rendering request 801, but permits calling of the left/right images rendering request 802.

As set forth above, by performing the processing of S1002 and S1003 after prohibiting the request for rendering an image into one graphics plane, inconsistency between left-view and right-view images can be prevented. Even when the image rendering request 801 is called while the composition mode switch request 803 is being processed due to a problem in the implementation of the BD-J application, the above structure can prevent such inconsistency between the left-view and right-view images.

25.2.2 Switching from One-Plane Setting to Two-Plane Setting

Figure 25B:
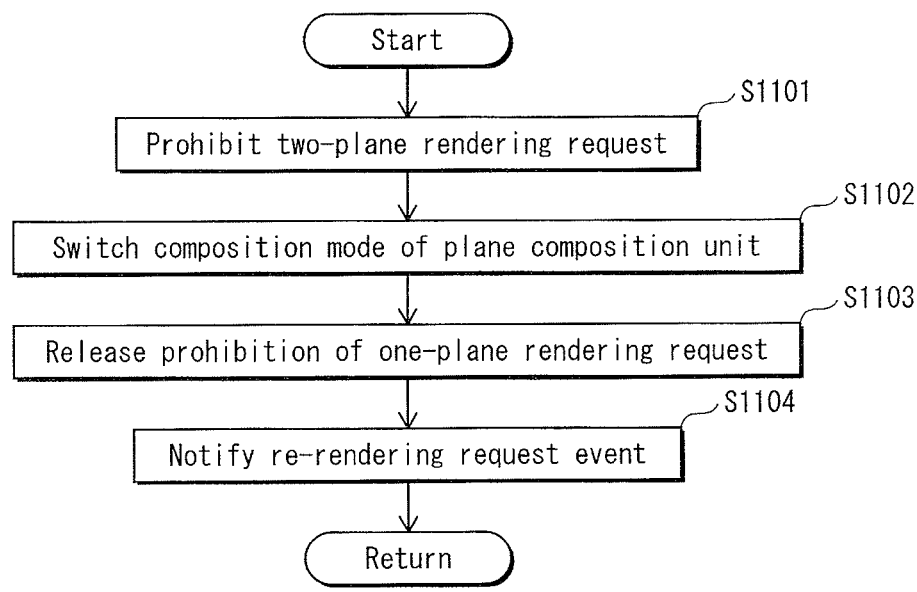

With reference to FIG. 25B, the following describes a more detailed processing flow of the processing of S904, i.e., the processing of switching the graphics plane setting from the one-plane setting to the two-plane setting.

First, the playback device 200 prohibits the left/right images rendering request 802, which is a request for rendering images into two graphics planes (S1101). If the image rendering request 802 is called while this prohibition is in effect, then this call is ignored or causes exceptional operations, as described above. In a default state where one graphics plane is used, calling of the image rendering request 801 is prohibited, but calling of the left/right images rendering request 802 is permitted, as described above. In such a default state, the processing of S1001 prohibits both of the calling of the image rendering request 801 and the calling of the left/right images rendering request 802.

Next, the playback device 200 switches from the current composition mode of the plane composition unit 20 to the composition mode 2 or the composition mode 4 (S1102). Specifically, the playback device 200 switches (i) to the composition mode 2 if the current background plane setting indicates the two-plane setting, and (ii) to the composition mode 4 if the current background plane setting indicates the one-plane setting.

Next, the playback device 100 removes the prohibition on the left/right images rendering request 801, which is a request for rendering different images into the one graphics plane (S1103). When the image rendering request 801 is called after the prohibition on the left/right images rendering request 802 is removed, copy processing is performed. The processing of S1103 permits calling of the image rendering request 801, but prohibits calling of the left/right images rendering request 802.

Finally, a re-rendering request event is notified to the BD-J application (S1104). In some cases it is necessary to perform a re-rendering immediately after switching between different compositions modes. However, after switching to a composition mode where one graphics plane is used, it is possible to perform the graphics processing that is the same as the one pertaining to the conventional BD-J specification. Therefore, the re-rendering request event is notified in S1104 to conform to the conventional BD-J specification.

As set forth above, by performing the processing of S1103 after the composition mode switch processing is completed, inconsistency between left-view and right-view images can be prevented.

According to the plane setting request by the bytecode application, setting is made such that the background plane setting is the two-plane setting or the one-plane setting. When such switching between the plane settings is made, the situation described in the first embodiment occurs. That is, after a request is made for switching the background plane setting from the one-plane setting to the two-plane setting, the request (Graphics#drawImage) to the background plane reaches the java.awt.Graphics. When switching is made from the one-plane setting to the two-plane setting after the plane setting request for the background planes is received, the following steps are executed. The steps are: invalidation of the 2D graphics rendering request for the background plane; copy from the left-view background plane to the right-view background plane; switching of the right-view output system; and acceptance of the 3D graphics rendering request. When switching is made from the two-plane setting to the one-plane setting, the following steps are executed. The steps are: prohibition of the request by the StereoGraphics#drawImage to the background planes; switching of the right-view output system; and acceptance of the Graphics#drawImage to the background planes. Thus, the inconsistency between the left view and the right view can be resolved. Here, such inconsistency is caused when the 2D graphics rendering request reaches the java.awt.Graphics after switching is made from the one-plane setting to the two-plane setting. Therefore, processing shown in FIGS. 25A and 25B are executed after the plane setting request to the background plane is made.

Therefore, in the third embodiment, S906 in which switching of the background plane setting to the two-plane setting is made and S908 in which switching of the background plane setting to the one-plane setting is made are executed by the same processing flows shown in FIGS. 25A and 25B, respectively.

As described in the above, in the present embodiment, the 2D graphics rendering request is invalidated prior to both the copy between the graphics planes and the copy between the background planes. Therefore, the new graphics will not be written in the left-view background plane after the copy of the pixel data from the left-view background plane to the right-view background plane is executed. Even when the 2D graphics rendering request arrives at the java.awt.Graphics with delay, contents stored in the background planes will not be displayed in response to the 2D graphics rendering request. Therefore, the inconsistency between the right view and the left view does not occur.

Fourth Embodiment

The present embodiment relates to how to execute, in the playback device, prohibition of the one plane rendering request and removal of the prohibition, and prohibition of the two plane rendering request and removal of the prohibition in the layer model described in the first embodiment.

25 Improvement to org.havi.ui

In order to execute the processing shown in FIGS. 25A and 25B, it is necessary to causes the org.havi.ui to perform additional processing (i.e. processing when the second argument is specification of the two-plane setting and processing when the third argument is specification of the two-plane setting, when the setConfiguration is called). Such improvement is to add, to the org.havi.ui, processing steps in the flowchart shown in FIG. 26.

26 Processing Flow of org.havi.ui When setConfiguration is Called

Figure 26:
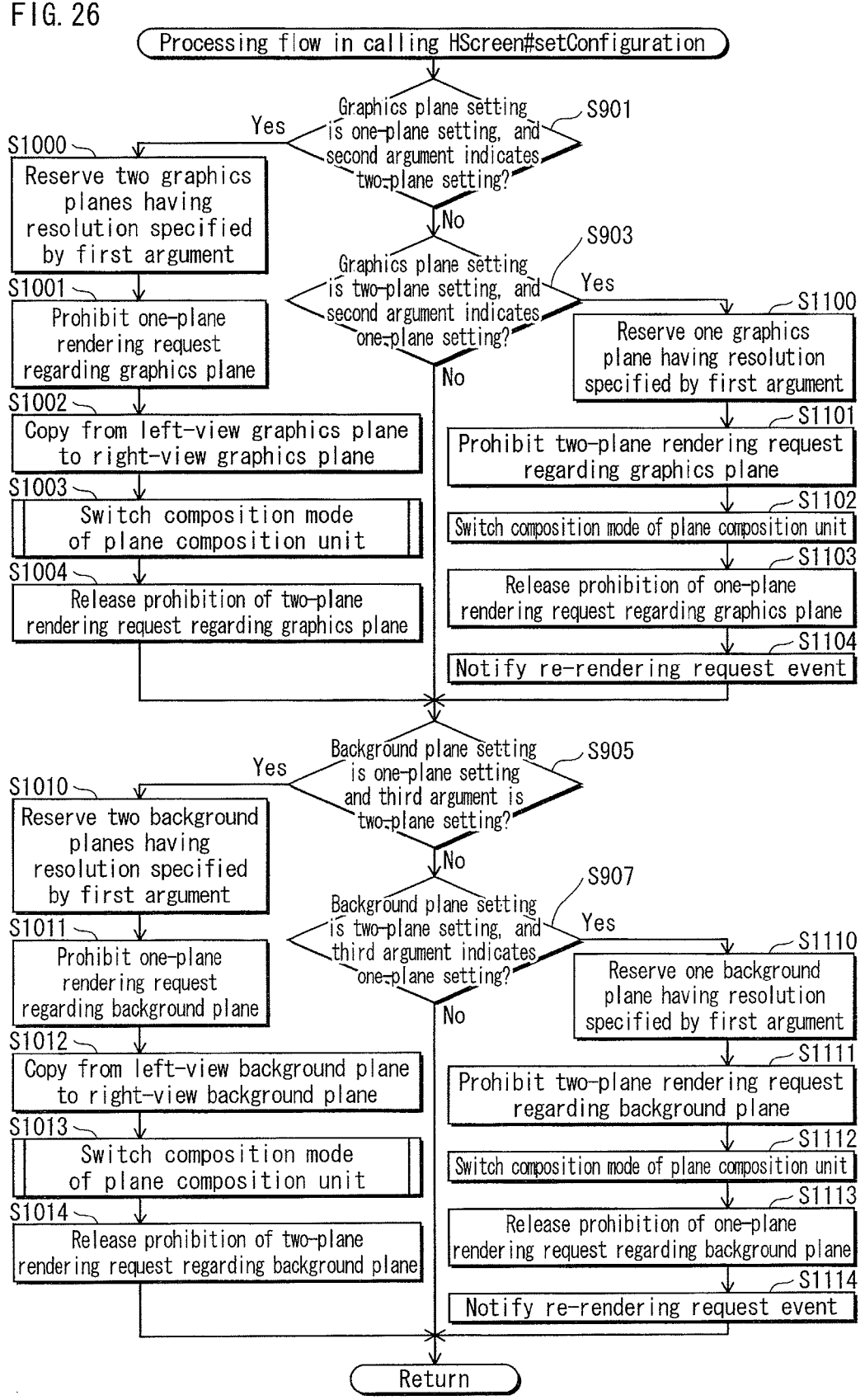
FIG. 26 shows a flowchart showing a processing flow of org.havi.ui when setConfigurationAPI is called.

FIG. 26 shows a flowchart showing processing flow of org.havi.ui when setConfigurationAPI is called. This flowchart corresponds to highest order switching processing between the plane settings (i.e. main routine). Flowcharts shown in FIG. 27 to FIG. 30 are lower order flowcharts of the present flowchart. The following describes processing flow in the main routine.

Step S901 is a step of judging if the current graphics plane setting is the one-plane setting, and the second argument when the setConfiguration is called (i.e. the number of graphics planes) indicates the specification of the two-plane setting. This judgment is a detail of Step S901 shown in FIG. 24. If such step S901 results in Yes, steps S1001 to S1004 are executed after the two graphics planes each having resolution specified by the first argument are reserved in Step S1000.

Steps S1001 to S1004 are steps for switching to the two-plane setting by the call of the setConfiguration, and are the same as the steps shown in FIG. 25A in the previous embodiment. Therefore, the same reference numerals as the reference numerals shown in FIG. 25A are given. Specifically, a one graphics plane rendering request is prohibited (Step S1001), the pixel data is copied from the left-view graphics plane to the right-view graphics plane (Step S1002), the composition mode of the plane composition unit is switched (Step S1003), and the prohibition of the two graphics planes rendering request is removed (Step S1004).

When the Step S901 results in No, the judgment of the Step S903 is executed. In Step S903, judgment is made as to whether the current graphics plane setting is the two-plane setting, and the second argument when the setConfiguration is called (i.e. the number of graphics planes) indicates the specification of the one-plane setting. This judgment is a detail of Step S903 shown in FIG. 24. If such step S903 results in Yes, steps S1101 to S1104 are executed after the one graphics plane having resolution specified by the first argument are reserved in Step S1100.

Steps S1101 to S1104 are steps for switching to the one-plane setting by the call of the setConfiguration, and are the same as the steps shown in FIG. 25B in the previous embodiment. Therefore, the same reference numerals as the reference numerals shown in FIG. 25B are given. Specifically, the two graphics planes rendering request is prohibited (Step S1101), the composition mode of the plane composition unit is switched (Step S1102), the prohibition of the one graphics plane rendering request is removed (Step S1103) and the re-rendering request event is notified (Step S1104).

This concludes the processing flow of the setConfiguration for the graphics planes. The following describes in detail the processing for the background planes.

In Step S905, judgment is made as to whether the current background plane setting is the one-plane setting, and the second argument when the setConfiguration is called (i.e. the number of background planes) indicates the specification of the two-plane setting. This judgment is a detail of Step S905 shown in FIG. 24. If such step S905 results in Yes, Steps S1011 to S1014 are executed after the two background planes each having resolution specified by the first argument are reserved in Step S1010. Steps S1011 to S1014 are steps for switching to the two-plane setting by call of the setConfiguration. The steps shown in FIG. 25A in the previous embodiment are applied to the background planes as these steps. Specifically, the one background plane rendering request is prohibited (Step S1011), the pixel data is copied from the left-view background plane to the right-view background plane (Step S1012), the composition mode of the plane composition unit is switched (Step S1013) and the prohibition of the two background planes rendering request is removed (Step S1004).

When the Step S905 results in No, the judgment of the Step S907 is executed. In Step S907, judgment is made as to whether the current background plane setting is the one-plane setting, and the second argument when the setConfiguration is called (i.e. the number of background planes) indicates the specification of the two-plane setting. This judgment is a detail of Step S907 shown in FIG. 24. If such step S907 results in Yes, steps S1111 to S1114 are executed after the two background planes each having resolution specified by the first argument are reserved in Step S1110. Steps S1111 to S1114 are steps for switching to the one-plane setting by call of the setConfiguration. The steps shown in FIG. 25A in the previous embodiment are applied to the background planes as these steps. Specifically, the two background planes rendering request is prohibited (Step S1111), the composition mode of the plane composition unit is switched (Step S1112), the prohibition of the one background plane rendering request is removed (Step S1113) and the re-rendering request event is notified (Step S1114).

27 Improvement to java.awt.Graphics

In order to execute processing shown in FIGS. 25A and 25B in the third embodiment, it is necessary to add the following improvement to the java.awt.Graphics. The Graphics#drawImage is not executed at all after the one plane rendering request is prohibited in the Step S1001 in FIG. 26 and before the prohibition of the one plane rendering request is removed in Step S1103 in FIG. 26. Also, the call of the Graphics#drawImage is invalidated. Such improvements should be made by adding processing flow in the flowchart shown in FIG. 27 to the java.awt. Graphics.

Figure 27:
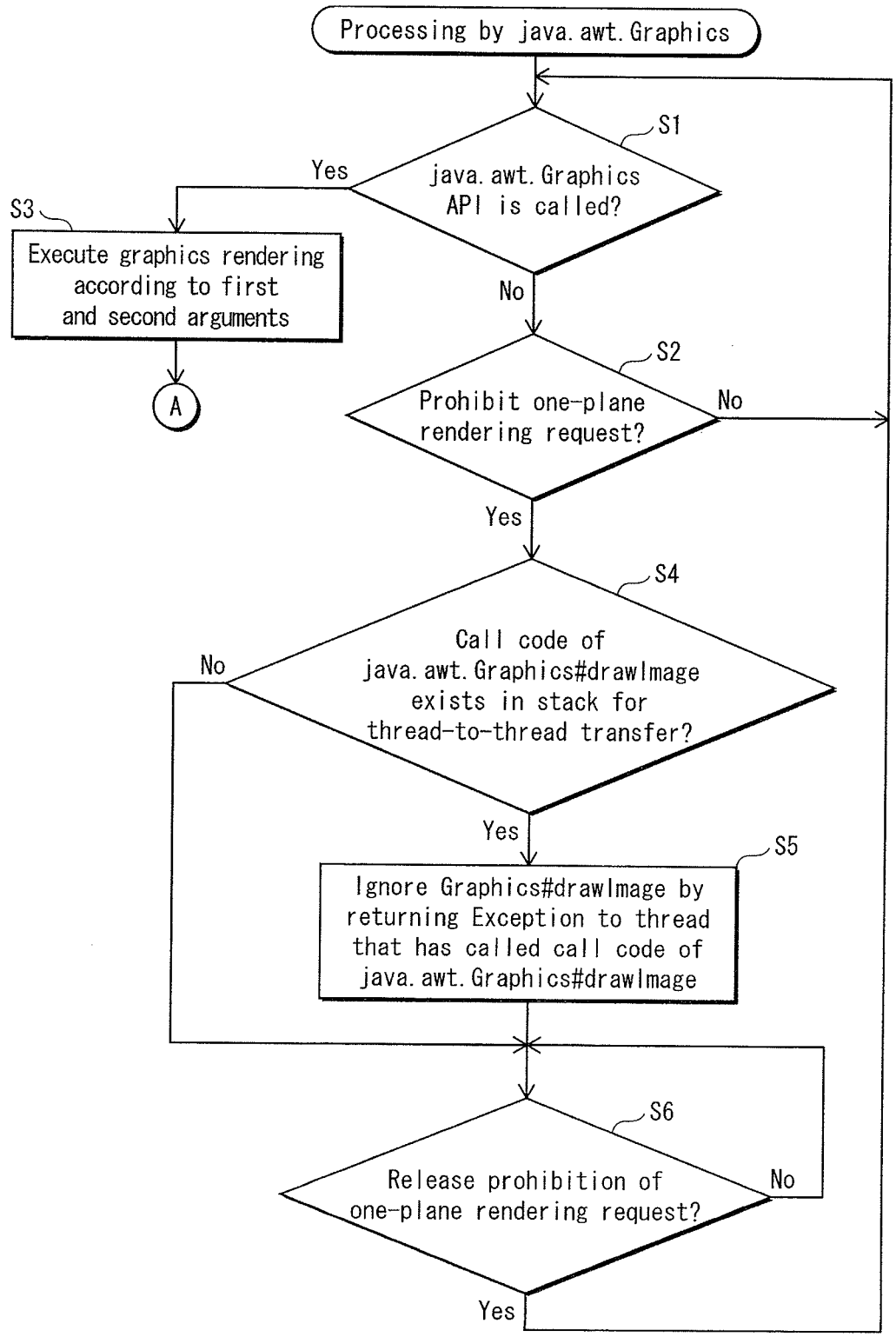
FIG. 27 is a flowchart showing a processing flow of java.awt.Graphics.

FIG. 27 is a flowchart showing a processing flow of java.awt.Graphics. A loop composed of Steps S1 to S2 is executed. In Step S1, judgment is made as to whether or not the java.awt.Graphics is called. When the java.awt.Graphics is called, rendering of graphics is executed in accordance with the first and second arguments in Step S3. In Step S2, judgment is made as to whether or not the one plane rendering request is prohibited. If the one plane request is prohibited, processing proceeds from Step S2 to Step S4. In Step S4, judgment is made as to whether or not the call code of the Graphics#drawImage exists in the stack. If the Graphics#drawImage exists, the Graphics#drawImage is ignored by returning the Exception to a thread that has transferred a call code of the Graphics#drawImage. In Step S6, processing is held until the judgment is made as to whether or not the one plane rendering request has been removed. If the prohibition of the one plane rendering request has been removed, processing returns to the loop composed of Steps S1 and S2. When the java.awt.Graphics performs the above-described processing, the java.awt.Graphics does not execute the Graphics#drawImage at all after the one plane rendering request is prohibited in Step S1001 shown in FIG. 25A and before the prohibition of the one plane rendering request is removed in Step S1103 shown in FIG. 25B.

28 Improvement to Application Manager

The following describes the improvements to be made to the application manager for realizing switching between the plane settings shown in FIGS. 25A and 25B. The StereoGraphics processes only StereoGraphics#drawImage. Since the StereoGraphics is a graphics rendering package exclusively for the StereoGraphics, the StereoGraphics starts when processing proceeds to Step S1004 shown in FIG. 26. It is necessary to control the state of the StereoGraphics so as to end the operation of the StereoGraphics when processing proceeds to Step S1101 shown in FIG. 26. In order to realize such control of the state for the StereoGraphics, it is necessary to execute a state control unique to the StereoGraphics by causing the application manager to execute processing flow shown in FIG. 28.

Figure 28:
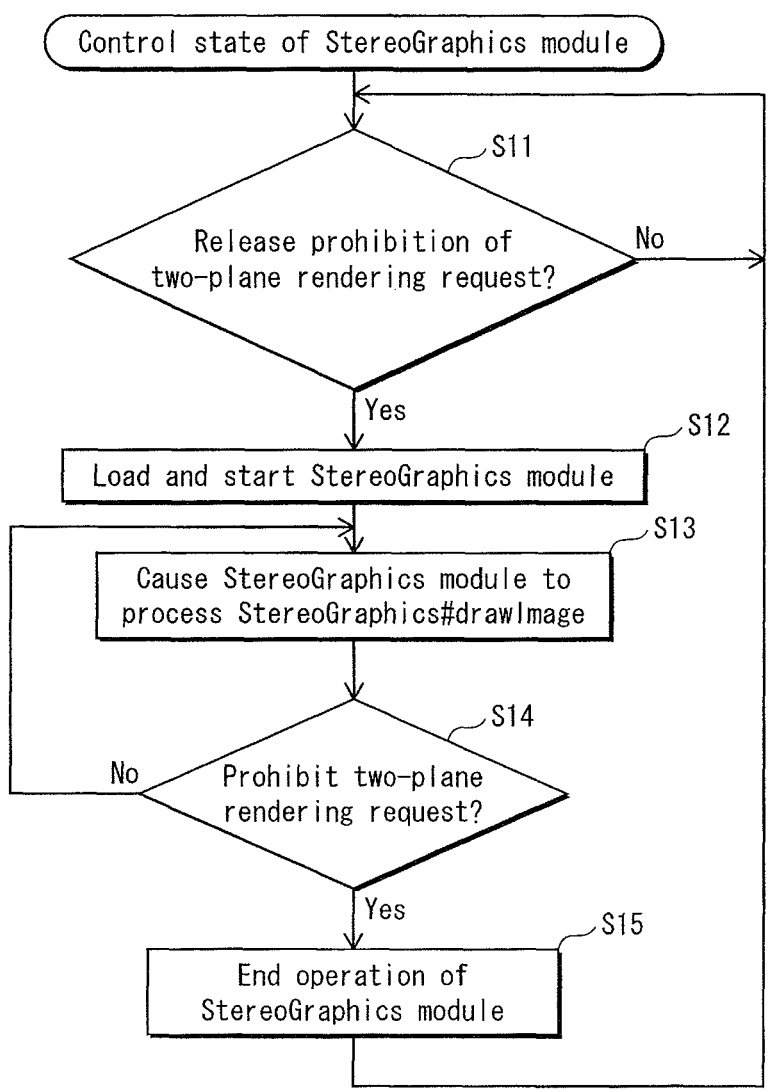
FIG. 28 is a flowchart showing a procedure of controlling the state of StereoGraphics by an application manager.

FIG. 28 is a flowchart showing a processing flow of controlling the state of StereoGraphics by an application manager. In Step S11, processing is held until judgment is made as to whether the prohibition of the two plane rendering request is removed. If the prohibition is removed; processing proceeds to Step S12, and the StereoGraphics is loaded and activated. Then, processing proceeds to Steps S13 to S14. In Step S13, the StereoGraphics is caused to process the 3D graphics, and to write the graphics in the left-view graphics plane and the right-view graphics plane in accordance with the call of the 3D graphics as long as the call of the 3D graphics is made. In Step S14, judgment is made as to whether or not the two plane rendering request is prohibited. Unless the two plane rendering request is prohibited, a loop composed of Steps S13 to S14 is repeated. If the two plane rendering request is prohibited, the operation of the StereoGraphics is ended in Step S15, processing proceeds to Step S11, and processing is held until the prohibition is removed.

This concludes the description of the state control of the StereoGraphics by the application manager. The StereoGraphics operates in a limited way by controlling the state of the StereoGraphics externally as shown in the above.

29 Improvements to Device Driver

In order to execute the processing shown in FIGS. 25A and 25B, it is necessary to cause the device driver to remove and add the right-view output system and switch a source of supply of data to the right-view adder, when the composition mode switching is requested in Step S1003 shown in FIG. 26 and Step S1102 shown in FIG. 26. Such improvements may be made by adding, to the device driver, processing procedures of flowcharts shown in FIGS. 29A and 29B.

Figure 29A:
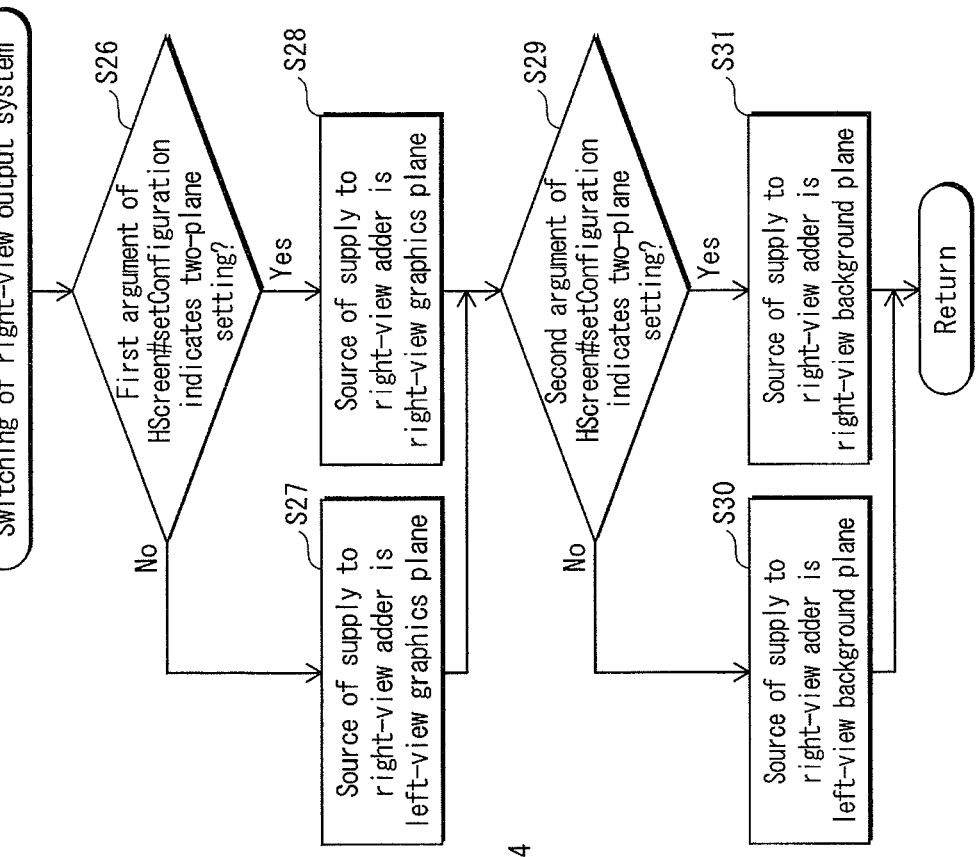
FIGS. 29A and 29B are flowcharts respectively showing the composition mode switching by the plane composition unit and the switching in the right-view output system.

FIG. 29A is a flowchart showing steps that correspond to main routine of procedure for switching the composition mode in the plane composition unit. In Step S21, judgment is made as to whether the playback mode is the 3D playback mode or the 2D playback mode. If the playback mode is the 2D playback mode, the right-view output system is released in Step S22. If the playback mode is the 3D playback mode, it is judged whether or not the right-view output system is valid in Step S23. If the right-view output system is valid, the right-view output system is switched in Step S25. If the right-view output system is not valid, the right-view output system is added in Step S24 and then the right-view output system is switched in Step S25.

Figure 29B:
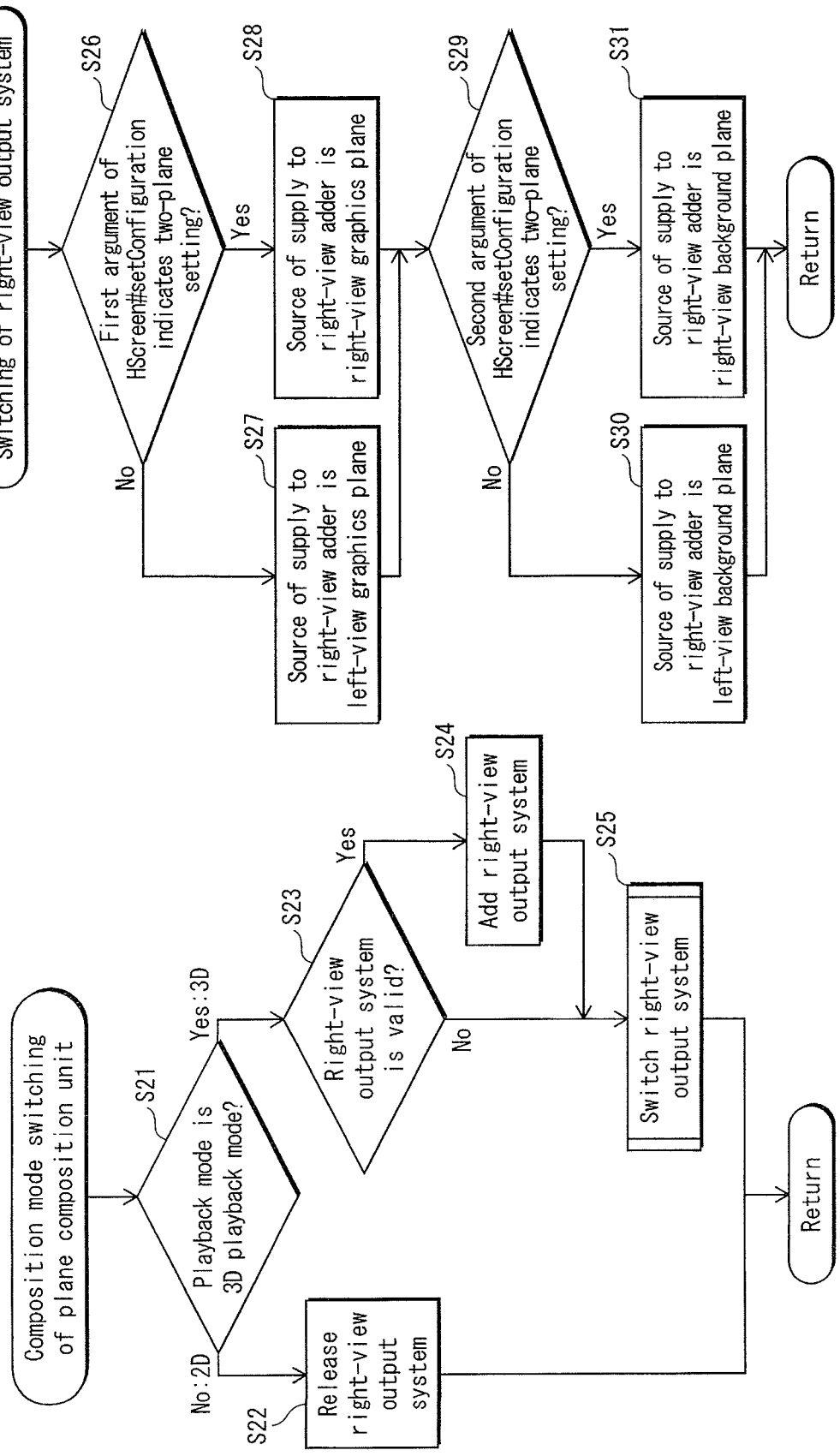

A description is given in detail of switching of the right-view output system in Step S25, with use of a sub-routine shown in FIG. 29B.

FIG. 29B is a flowchart showing a processing flow of switching the right-view output system. In Step S26, judgment is made as to whether or not the first argument of the setConfiguration indicates the two-plane setting. If judgment in Step S26 results in No, the source of supply to the right-view adder is set to the left-view graphics plane in Step S27. If judgment in Step S26 results in Yes, the source of supply to the right-view adder is set to the right-view graphics plane in Step S28. In Step S29, judgment is made as to whether or not the second argument of the setConfiguration indicates the two-plane setting. If the judgment in Step S29 results in No, the source of supply to the right-view adder is the left-view background plane in Step S30. If the judgment in Step S29 results in Yes, the source of supply to the right-view adder is the left-view background plane in Step S31.

30 Processing Flow to Embody StereoGraphics

Figure 30:
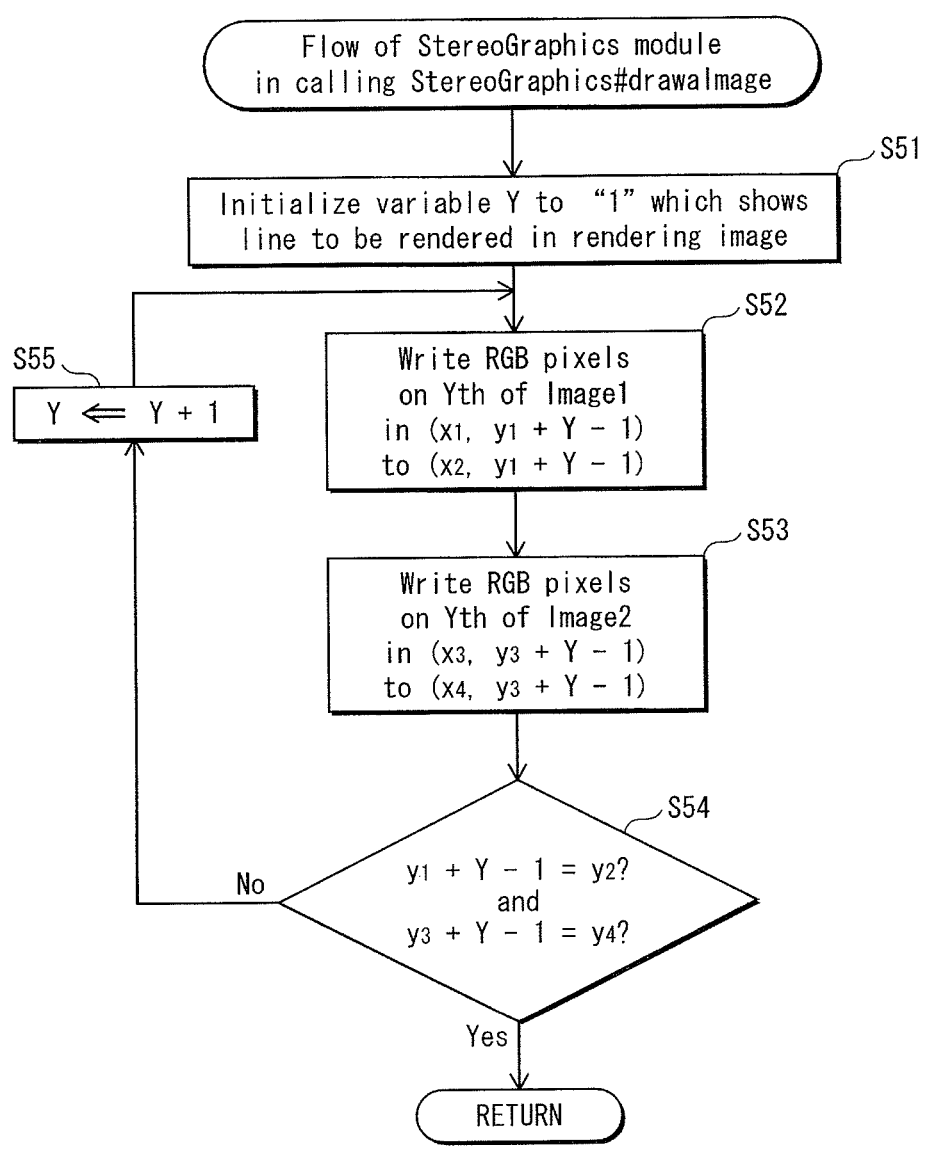
FIG. 30 is a flowchart showing a line rendering procedure when the StereoGraphics#drawImage method is called.

The entity of the StereoGraphics is a resident-type bytecode application that causes the MPU to render lines in accordance with the call of the StereoGraphics#drawImage. FIG. 30 is a flowchart showing line rendering steps when the StereoGraphics#drawImage method is called.

A variable Y is a control variable for the loop in this flowchart. The variable Y is initialized in Step S51, and is used for judging whether or not condition for ending the flowchart is satisfied in Step S54.

The variable Y is initialized to "one" (Step S51), and processing proceeds to a loop of Steps S52 to S54. Here, the variable Y shows a line to be rendered from among lines of the rendering image. In this loop, the RGB values on a $Y^{th}$ line each indicated as the second argument are written in (x1,y1+Y−1) to (x2,y1+Y−1) in the left-view graphics plane (Step S52), and the RGB values on a $Y^{th}$ line each indicated as the fourth argument are written in (x3,y3+Y−1) to (x4,y3+Y−1) in the right-view graphics plane (Step S53). Steps S52 and 53 are repeated until the judgment of Step S54 is made positively (Yes). In Step S54, judgment is made as to whether condition is satisfied that y1+Y−1 is y2 and y3+Y−1 is y4. When this condition is not satisfied, the variable Y is incremented in Step S55, and processing proceeds back to Step S52. By repeating this loop, line pixels composing Image1 is written in a range in a rectangle region in which rendering in the left-view graphics plane is to be performed. Also, the line pixels composing Image2 is written in a rectangle region in which rendering in the right-view graphics plane is to be performed.

This concludes a description of the copy flow by the StereoGraphics. The following describes a specific example of the bytecode application that performs the GUI rendering with use of the StereoGraphics#drawImage. The specific example of the GUI rendering with use of the StereoGraphics#drawImage is to write the rendering images in the left-view graphics plane and the right-view graphics plane over a plurality of frames. The following describes a descriptive example of the bytecode application with use of the StereoGraphics#drawImage.

31 Specific Example of Menu Display by Bytecode Application

Figure 31:
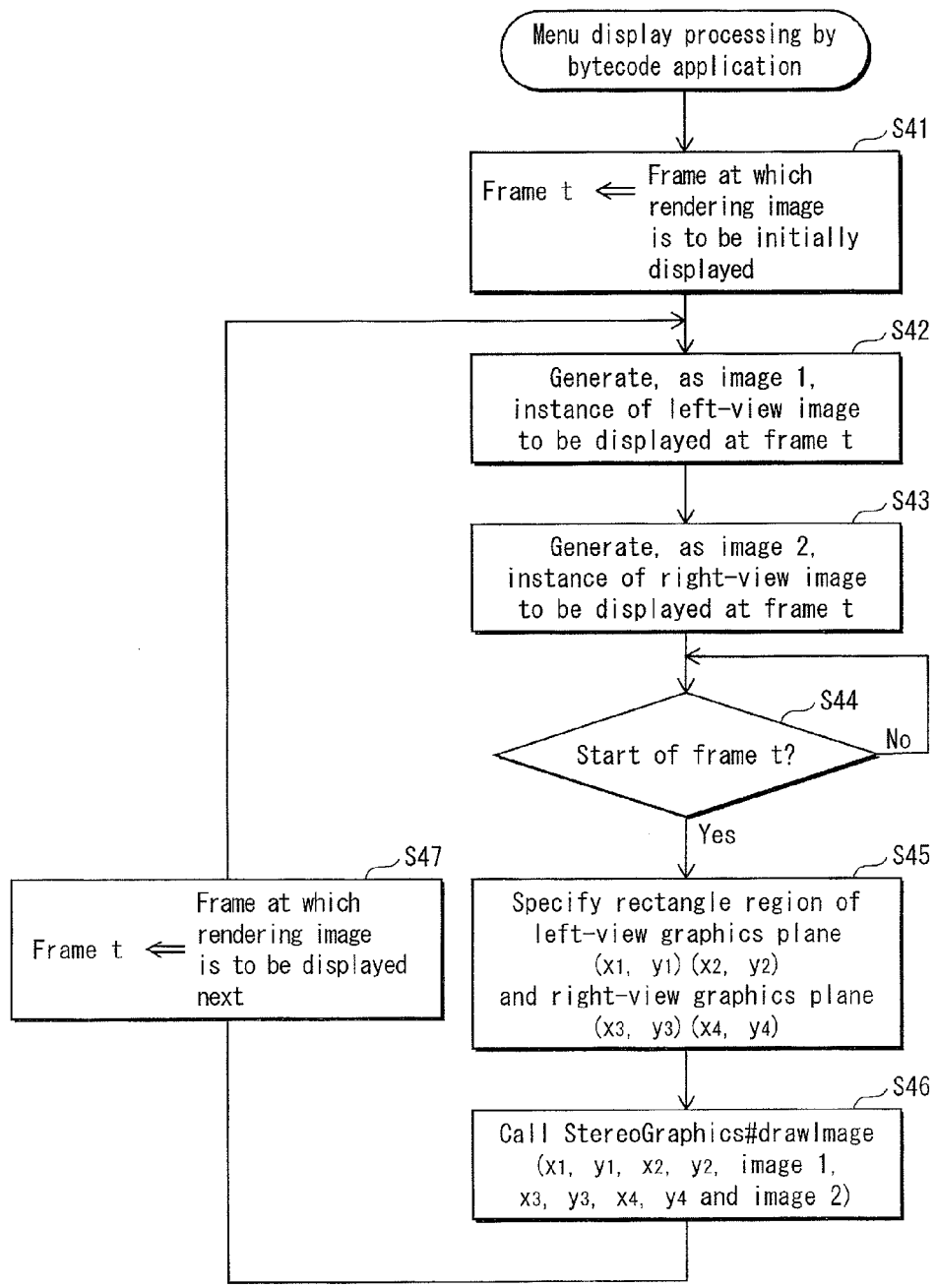
FIG. 31 is a flowchart for menu display by the bytecode application.

FIG. 31 is a flowchart for menu display by the bytecode application. In Step S41, a frame at which the rendering image is to be initially displayed is a "frame t", and processing proceeds to the loop including Step S42 to Step S47. The following describes Steps S42 to S47. An instance of the left-view image to be displayed at the frame t is generated as an image 1 (Step S42). An instance of the right-view image to be displayed in the frame t is generated as an image 2 (Step S43). Processing is held until the frame t has started (Step S44). When the frame t starts, the rectangle region on which graphics stored in the left-view graphics plane is to be rendered and the rectangle region on which graphics stored in the right-view graphics plane is to be rendered are specified (Step S45). Then, after these rectangle regions are specified by the arguments, the call of the StereoGraphics#drawImage method is made (Step S46). Next, processing of setting, to the frame 1, a frame at which the image is to be displayed (Step S47) is repeated.

According to the present embodiment described in the above, by making improvements to the elements in the player model of the BD-J terminal and the layer model, it is possible to cause the playback device to execute distinguishing processing as described in the above embodiments. Therefore, the distinguishing processing unique to the present application can be added to the playback device without drastically changing the basic structure of the playback device. Thus, the number of steps to develop the playback device can be drastically reduced, which facilitates output of products (playback devices).

Fifth Embodiment

In the present embodiment, the playback mode in the playback device is determined by mode selection procedures that are executed when the title is selected. An essential elements of the title of the present Description is at least one operation mode object. The operation mode object is an operation management table that defines details of acts of the playback device when a title is played back in a certain mode. Such title can be categorized into a HDMV title or a BD-J title.

32.1 HDMV Title

The "HDMV title" is a title to be played back in the HDMV mode described in the third embodiment. The HDMV is composed of a movie object and playlist to be played back according to a playback command included in the movie object (playlist information, clip information and stream information).

The "movie object" is an operation mode object that is in correspondence with a title number of the HDMV title in the index table. The movie object is formed by associating a batch program composed of navigation command lines with a resume flag showing whether or not to permit the resume, a flag showing whether or not the menu call is to be masked and a flag showing whether or not a title search is to be masked.

32.2 BD-J Title

The "BD-J title" is a title to be played back in the BD-J mode described in the third embodiment. The BD-J title is composed of a class archive file and a BD-J object.

The "class archive file" is a file obtained by putting, into one, a file of a class structure of the bytecode application (class file), a digital certificate manifesto file, a disc signature file, a disc signature encryption key file and a permission request file, and archiving these files. The application is loaded with these class archive files into one. At the time of class load, the application can be verified with use of a digital certificate, a disc signature and a disc signature encryption key. Also, since the permission request file exists, the operation of the application can be limited to an operation to which certain authorization is given.

The bytecode application archived by the class archive file is referred to as the BD-J application.

32.2.1 BD-J Application

The BD-J application is used for state control by the application manager by implementing an Xlet interface. This Xlet interface includes: public void initXlet( ){ }, public void startXlet( ){ }, public void pauseXlet( ){ } and public void destroyXlet( ){ } that are interfaces that define the acts of the BD-J application in an initial state, a start state, a pause state and a destroy state, respectively. The acts in these states (initial, start, pause and destroy states) are written in an object-oriented programming language. Also, by implementing the public void KeyListener( ){ } interface, the acts of the BD-J application in accordance with a specific key event are written.

By implementing the public void ControllerListner( ){ } interface, the acts of the BD-J application are defined in accordance with change in a state of the controller of the JMF player. Here, from among acts of the BD-J application, the acts in which exceptional processing is assumed to occur can be written with use of a try sentence. Also, from among the acts of the BD-J application, acts in which exceptional processing has occurred can be written in a catch sentence.

The APIs that can be used for realizing the stereoscopic playback in the BD-J application includes Java2 Micro_Edition (J2ME) Personal Basis Profile (PBP 1.0) and Globally Executable MHP specification (GEM1.0.2) for package media targets. With these APIs, it is possible to write the BD-J title in which the 3D playback is possible, by structural programming using a method, a constructor, an interface and an event that belong to a class such as java.net for network processing, java.awt for GUI processing, java.lang for language processing, java.io for I/O processing for the recording medium, java.util which is a utility, javax.media for the media framework and org.havi.ui for the HAVi device.

Also, with use of extension API (also referred to as the BD-J extension) for the BD-J mode, control is performed with use of the data structures for realizing the stereoscopic playback described in the above embodiments and units of playback in stereoscopic playback. This BD-J extension includes an inherit method in the methods in java.net, java.awt, java.lang, java.io, java.util and javax.media classes. The interfaces in these classes are embedded interfaces and super interfaces. Therefore, the BD-J title on the premises of the stereoscopic playback can be created on an extension of programming technique with use of the java.net, java.awt, java.lang, java.io, java.util and javax.media classes.

For example, the extension API for the BD-J mode includes a setting acquisition class that instructs to set the state of the playback device and acquire the state of the playback device. This setting acquisition class is composed of a constant field showing a hold value of the player state register (PSR), an acquisition method instructing to acquire the hold value of the PSR and the setting method instructing to set the hold value of the PSR.

The method in the setting acquisition class includes the inherit method in the methods in the java.lang.Object class. Also, when the argument is invalid at the time of a method call, the java.lang.IlleghalArgumentException event which is an event in the java.lang class is thrown. Since this class succeeds the method and the event of the java.lang.Object, the programmer can create a program using the hold value in the register set on an extension of the java.lang.Object. This concludes the description of the class archive file.

32.2.2 Details of BD-J Object

The following describes the details of the BD-J object which is the operation mode object in the BD-J mode.

The "BD-J object" defines the details of the acts of the playback device in the BD-J mode. The details of the acts are as follows: (1) class load of the application when a corresponding title becomes a current title, (2) application signaling when the corresponding title becomes the current title, (3) HAVi device configuration when the application started by the application signaling executes GUI processing, (4) playlist access in the current title, (5) cache-in and cache-out of the class archive file when the corresponding title becomes the current title and (6) event allocation that allocates, to a key, an event that triggers the started application.

The "class load" is processing of generating an instance of the class file archived in the class archive file, in a heap area of the platform. The "application signaling" is control for defining whether or not the application (instance of the class file) is to be automatically started, or whether or not a lifecycle of the application is to be a title boundary or the disc boundary. The title boundary is management to eliminate a thread which is the application from the heap area simultaneously to ending the title. The disc boundary is management to eliminate a thread which is the application from the heap area simultaneously to disc inject. The "disc unboundary" is, on the other hand, control that does not eliminate the thread from the heap area even if a disc is injected. The "HAVi device configuration" defines the resolution of the graphics planes and fonts used for displaying characters, for example, when the application executes GUI processing.

The "playlist access" is specification of playlist to be automatically played back at the time of selection of the playlist and title that can be played back in accordance with a playback instruction by the started application.

The "cache-in of the class archive file" is processing of reading, in advance, the class archive file which is a class load target, in the cache. The "cache-out of the class archive file" is processing of deleting the class archive file from the cache. The "event allocation for the application operation" is to allocate, to the key that can be operated by the user, the event registered in the event listener of the application.

From among the bytecode applications, a bytecode application in which the application signaling is performed in the application management table in the BD-J object is the "BD-J application". The following compares the HDMV title with the BD-J title. In the above-described HDMV title, main elements of the software operation are modules such as an command interpreter for executing the navigation command, and a playback control engine for reading and playing back the playlist.

In the BD-J title, on the other hand, the main elements of the software operation are a group of software such as a class loader for the class load, an application manager for the application signaling, a HAVi device, a playback control engine for playing back the playlist by the Java media framework, a cache manager for the cache-in and cache-out management and an event manager for the event processing. That is, these main elements of the software operation are a group of software that is very similar to software in the multimedia platform terminals in the digital broadcasting. Therefore, the software structure in the playback device does not drastically change regarding switching from the BD-J title to the HDMV title and switching from the HDMV title to the BD-J title.

In order to realize two processing (i.e. checking whether or not the playback mode is an optimal playback mode for the main elements of the software operation after the switching, and selecting the optimal playback mode for the operation mode after the switching), procedures for selecting the optimal playback mode is executed in selecting the current title.

32.2.3 Internal Structure of BD-J Object

Figure 32:
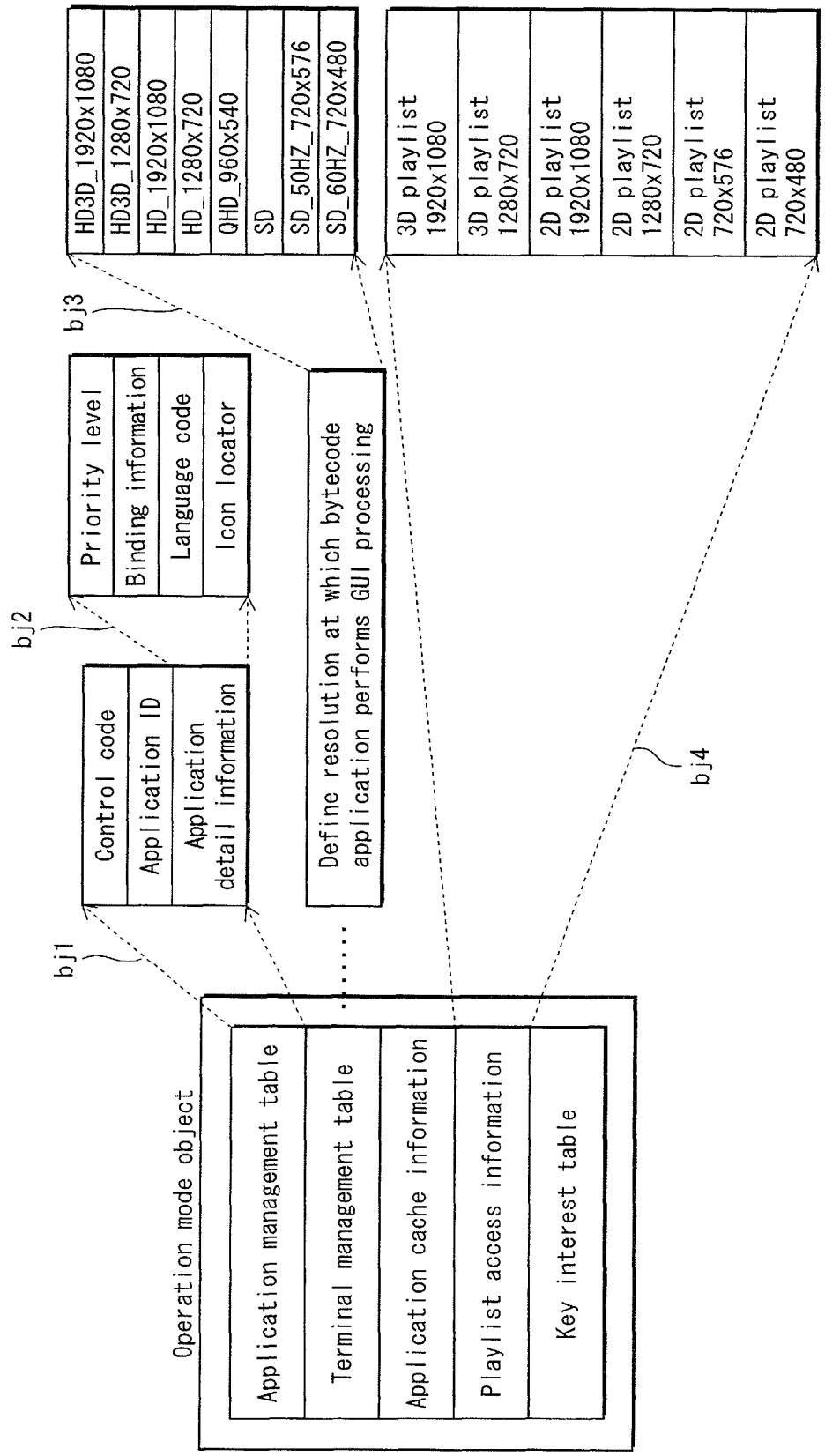
FIG. 32 shows an example of an internal structure of the operation mode object.

The following describes the BD-J object. FIG. 32 shows an example of an internal structure of the BD-J object. As shown in FIG. 32, the BD-J object is composed of the "application management table", the "terminal management table", the "application cache information", the "playlist access information" and the "key interest table".

The "application management table" is a control table for indicating, to the application manager and the class loader, the application signaling where the title is a boundary. The "terminal management table" is a management table for indicating, to the multimedia home platform (MHP), whether or not there are the HAVI device configuration for executing the GUI, a font used for the GUI and a mask for the user operation. The "application cache information" is a control table for instructing the cache manager to cache in and out the archive file when the title is selected. The "playlist access information" is a control table for instructing the playback control engine (PCE) to specify automatic playback of the playlist when the title is selected. The "key interest table" is a control table for instructing the event manager tot associate the key with the event.

A leader line bj1 indicates that the application management table is shown in close-up. As the leader line indicates, each entry of the application management table includes a "control code", an "application ID", and "application details" of a corresponding application. The "control code" indicates the startup method for the application in a title, i.e. whether the application is to be started automatically (AutoStart) or whether it should be held from starting until it is called by another application (Present). The "application ID" indicates the targeted application using a set of five-digit numbers, which is used as the file name for the archive file obtained by archiving the BD-J application to be started. A leader line bj2 indicates that the internal structure of the "application details" are shown in close-up. As the leader line indicates, the "application details" includes the following information items for each application: the "priority level" of the application when the application is loaded; "binding information" indicating whether the application is title unbound or not and whether it is disc unbound or not; a string of characters indicating the name of the application; a "language code" indicating to which language the application belongs; an "icon locator" indicating the location of an icon associated with the application; and an "application profile value". In the application supporting the 3D playback mode, the application profile value is set to 5. In order for a stereoscopic content existence flag of BDMV application information to be one in the index table, the application profile value needs to be set to 5.

A leader line bj3 indicates that the configuration information in the terminal management table is shown in close-up. The configuration information is information for instructing the playback device to reserve the graphics planes. As shown by this leader line bj3, the terminal management table can be set to one of HD3D_1920×1080, HD3D_1280×720, HD_1920×1080, HD_1280×720, QHD_960×540, SD, SD_50HZ_720×576 and SD_60HZ_720×480.

A leader line bj4 indicates that the internal structure of information specifying auto-playback playlists in playlist access information is shown in close-up. As the leader line bj4 indicates, the specification of an auto-playback playlist may specify the following playlists: 3D playlist 1920×1080, 3D playlist 1280×720, 2D playlist 1920×1080, 2D playlist 1280×720, 2D playlist 720×576, and 2D playlist 720×480.

In response to a selection of one of the titles, the playback device starts playback of a playlist specified by the playlist access information of the selected current title, regardless of whether a playback instruction is made from the application. If execution of the bytecode application ends before playback of the playlist ends, the playback device continues the playback of the playlist.

By virtue of the advanced start of playback, playback images presented by playlist playback are output until an interactive screen is displayed, if the display of an interactive screen is delayed due to the delayed image rendering caused as a result of the time taken for the class loading by the application. That is, even if the delay of application activation is relatively long, playback images by the playlist playback is presented to the user for viewing for the time being. Since images are presented even during the time the application is brought into the state of readiness, user's anxiety is avoided.

33.1 Graphics Plane Setting when Title is Switched

Figure 33:
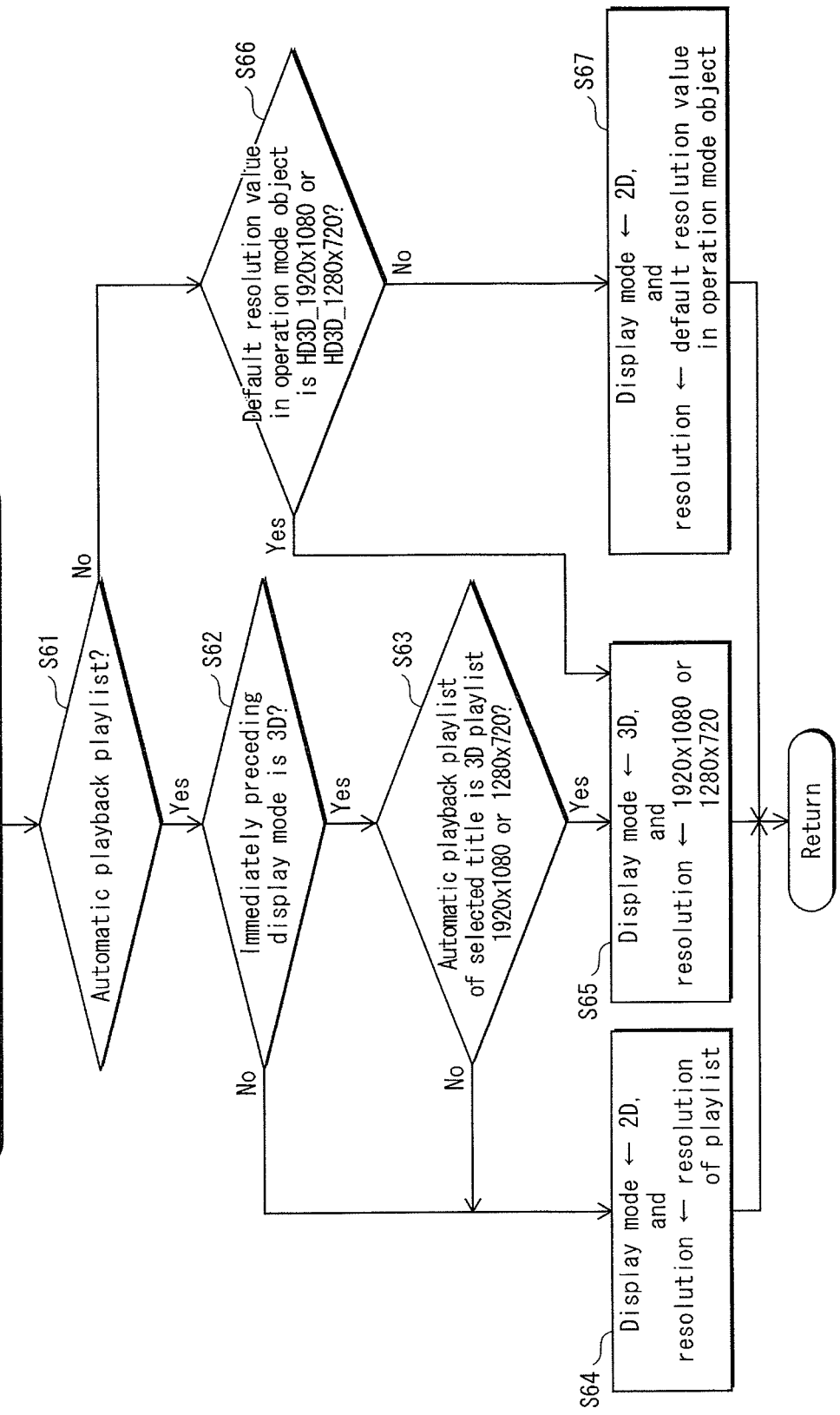
FIG. 33 is a flowchart showing a processing flow when a resolution is set in selecting a title.

FIG. 33 is a flowchart showing one example of processing flows for setting the plane memory resolutions at the time of title switching. As shown in the flowchart, Steps S64, S65 and S67 are selectively executed in accordance with the judgment results of Steps S61, S62, S63 and S66.

In Step S61, it is judged whether any auto-playback playlist exists or not. In Step S62, it is judged whether the immediately preceding display mode is a 3D display mode. In Step S63, it is judged whether or not the auto-playback playlist of the selected title is a 3D playlist with a resolution of 1920×1080 or a 3D playlist with a resolution of 1280×720.

When no auto-playback playlist exists, it is judged in Step S66 whether the default resolution of the operation mode object is set to either HD3D_1920×1080 or HD3D_1280×720. If the judgment of Step S66 results in Yes, the display mode is set to the 3D display mode and the resolution is set to the corresponding default resolution of 1920×1080 or 1280×720 in Step S65. If the judgment of Step S66 results in No, then Step S67 is performed to set the display mode to 2D and the resolution to the default resolution of the operation mode object.

If no auto-playback playlist exists, Step S62 is performed to judge whether the immediately previous display mode is 2D and/or Step S63 is performed to judge whether the playlist is a 3D playlist at a resolution of either 1920×1080 or 1280×720. If the judgment in either of Steps S62 and S63 results in No, Step S64 is performed to set the display mode to 2D and the resolution to the default resolution of the auto-playback playlist.

If the judgments in Steps S62 and S63 both result in Yes, Step S65 is performed to set the display mode to 3D and the resolution to either of 1920×1080 and 1280×720 depending on the resolution of the auto-playback playlist.

33.2 Relationship Between Playback Mode and Graphics Plane Setting

When the 3D playlist for the stereoscopic playback is selected as playback target, the mode of the playback device is switched from the 2D playback mode to the 3D playback mode. However, even when the playback mode changes to the 3D playback mode, the one-plane setting is maintained as the graphics plane setting. That is, unless the graphics plane setting is switched from the one-plane setting to the two-plane setting in response to the call of the API of the setConfiguration, the one-plane setting is maintained as the graphics plane setting.

Similarly, in response to a selection of the 3D playlist for the stereoscopic playback as an automatic playback playlist at a time of selection of the current title, the mode of the playback device is switched from the 2D playback mode to the 3D playback mode. However, even when the 3D playlist for the stereoscopic playback is selected as the automatic playlist and the playback mode changes to the 3D playback mode, the one-plane setting is maintained as the graphics plane setting.

However, when the current title is selected and the HAVi device configuration of the BD-J object corresponding to the current title indicates the two-plane setting, the graphics plane setting automatically switches from the one-plane setting to the two-plane setting. That is, the following (i) or (ii) in selecting the current title is necessary for switching from the one-plane setting to the two-plane setting. (i) The HAVi device configuration of the BD-J object corresponding to the current title indicates the two-plane setting. (ii) The API of the setConfiguration API requesting the two-plane setting is requested.

33.3 Necessity of Ignorance of Graphics Rendering Request

In the HAVi device configuration of the BD-J object, setting is made as to whether or not the graphics plane setting is the two-plane setting or the one-plane setting. Therefore, at the time of selection of the current title, switching from the one-plane setting to the two-plane setting and switching from the one-plane setting to the two-plane setting is executed. When such switching between the plane settings is executed, the situation described in the first embodiment occurs. That is, the 2D graphics rendering request reaches the java.awt.Graphics after the plane setting is switched from the one-plane setting to the two-plane setting. When the plane setting is switched from the one-plane setting to the two-plane setting at the time of selecting the current title, the following is executed: invalidation of the 2D graphics rendering request; the copy between the graphics planes; the switching of the right-view output system; and acceptance of the 3D graphics rendering request. When the plane setting is switched from the two-plane setting to the one-plane setting, the following is executed: the prohibition of the 3D graphics rendering request, the switching of the right-view output system, and the acceptance of the 2D graphics rendering request. Thus, the inconsistency between the left view and the right view can be resolved. Here, such inconsistency is caused when the 2D graphics rendering request reaches the java.awt.Graphics after switching is made from the one-plane setting to the two-plane setting.

As described in the above, according to the present embodiment, the stereoscopic playback can be realized with use of resolution defined by the HAVi device configuration based on the BD-J object, at the time of selection of the current title.

Sixth Embodiment

The present embodiment describes the principle as to how video images pop out in the 1plane+Offset mode which is the one-plane setting. In the 1plane+Offset mode, the rendering position of the rendering image in the left-view period is shifted to the right, and the rendering position of the rendering image in the right-view period is shifted to the left. In such a way, the stereoscopic video image appears to be closer to the user than the display screen.

34 Principles as to how Video Images Pop Out in 1plane+Offset Mode

Figure 34A:
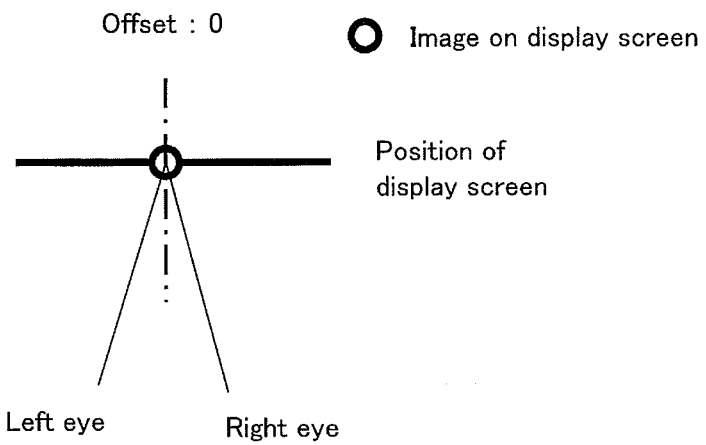
FIGS. 34A, 34B and 34C explain principles in which stereoscopic video images appear closer to the user than a display screen.
Figure 34B:
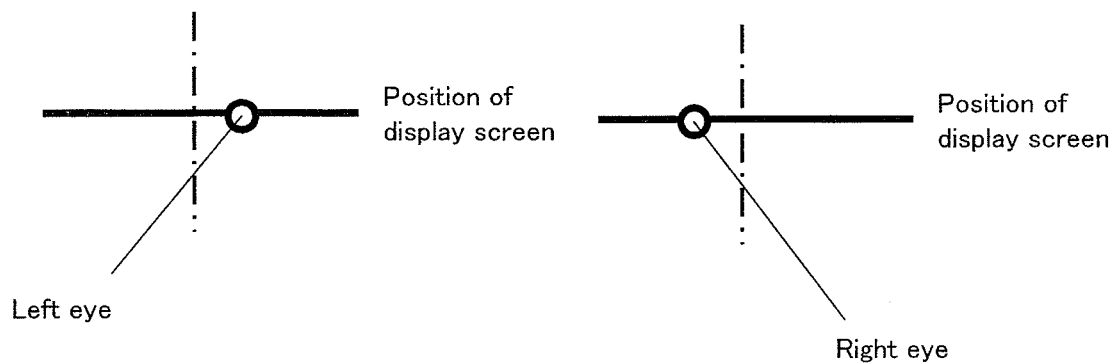
Figure 34C:
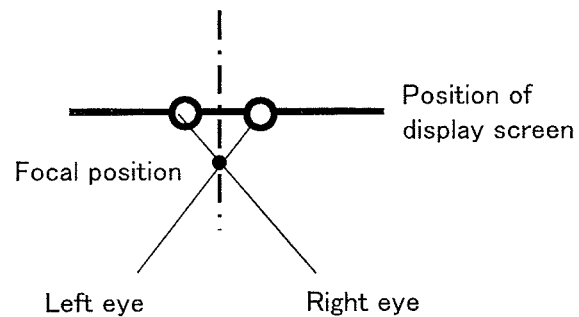

FIGS. 34A, 34B and 34C explain principles as to how video images appear to be closer to the user than a display screen, when the code of the plane offset is positive.

In FIGS. 34A, 24B and 34C, circles indicate the video images displayed on the display screen. Firstly, when the playback mode is the 2D playback mode, the video image viewed by the right eye and the video image viewed by the left eye are on the same position. Therefore, a focal position of the these images when viewed by both of the eyes is on the display screen (FIG. 34A). The resultant image is displayed on the display screen.

In the left-view period, the image to be viewed by the left eye is shifted and displayed so as to appear closer to the right side compared to the case whether the plane offset is 0. In this case, the right eye is blocked by the shutter glasses 500 from seeing anything. The video image to be viewed by the right eye is shifted and displayed closer to the left side compared to a case where the plane offset is 0. In this case, the left eye is blocked by the shutter glasses 500 from seeing anything (FIG. 34B).

People focus their vision using both eyes and perceive an image as being located at the position of focus. Accordingly, by alternately switching over a short time interval, via the liquid crystal shutter glasses 500, between a state in which an image is visible only to the left eye and a state in which an image is visible only to the right eye, a person's eyes focus on a position closer than the display screen. As a result, the person perceives an image as being located at the position of focus, i.e. closer than the display screen (FIG. 34C).

Figure 35A:
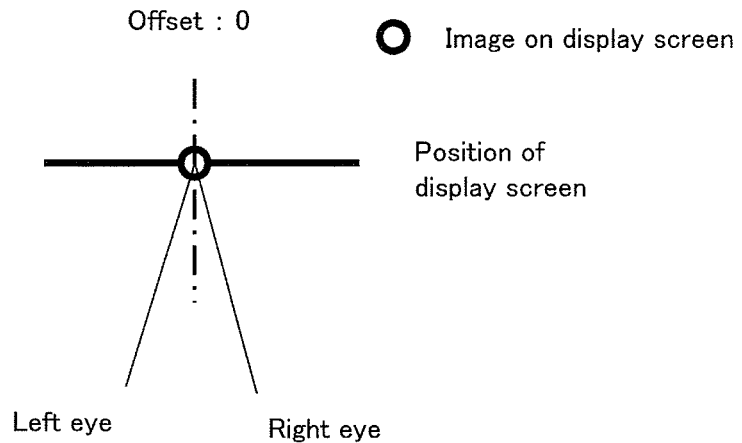
FIGS. 35A, 35B and 35C explain principles in which an image appears further back than the display screen.
Figure 35B:
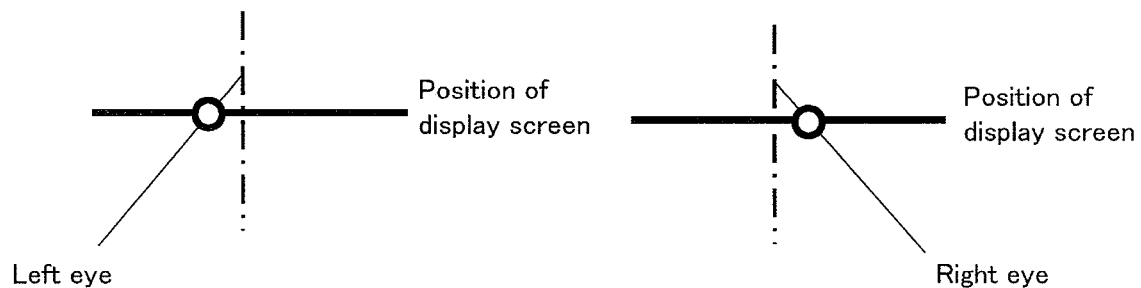
Figure 35C:
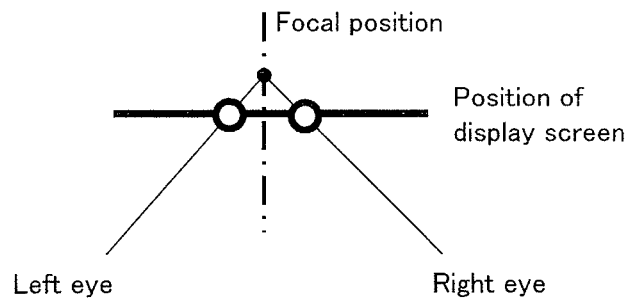

53 Principles in which Video Images Appear Further Back than Display Screen in 1plane+Offset Mode FIGS. 35A, 35B and 35C are views for explaining the principles in which an image appears further back than the display screen. In each of 35A, a circle indicates an image displayed on the display screen. First, in the 2D mode, the image seen by the right eye and by the left eye is in the same position. Therefore, when the image is viewed by both eyes, the position of focus is located on the display screen (FIG. 35A). The resultant image is displayed on the display screen.

On the other hand, in the left-view period of the 3D mode, the image seen by the left eye is seen at a position shifted to the left of the zero-offset position. In this case, the right eye is blocked by the shutter glasses 500 from seeing anything. Conversely, the image seen by the right eye is seen at a position shifted to the right of the zero-offset position. At this time, the liquid crystal shutter glasses 500 block the left eye from seeing anything (FIG. 35B).

Accordingly, by alternately switching over a short time interval, via the liquid crystal shutter glasses 500, between a state in which an image is visible only to the left eye and a state in which an image is visible only to the right eye, a person's eyes focus on a position closer than the display screen. As a result, the person perceives an image as being located at the position of focus, i.e. closer than the display screen (FIG. 35C).

Figure 36A:
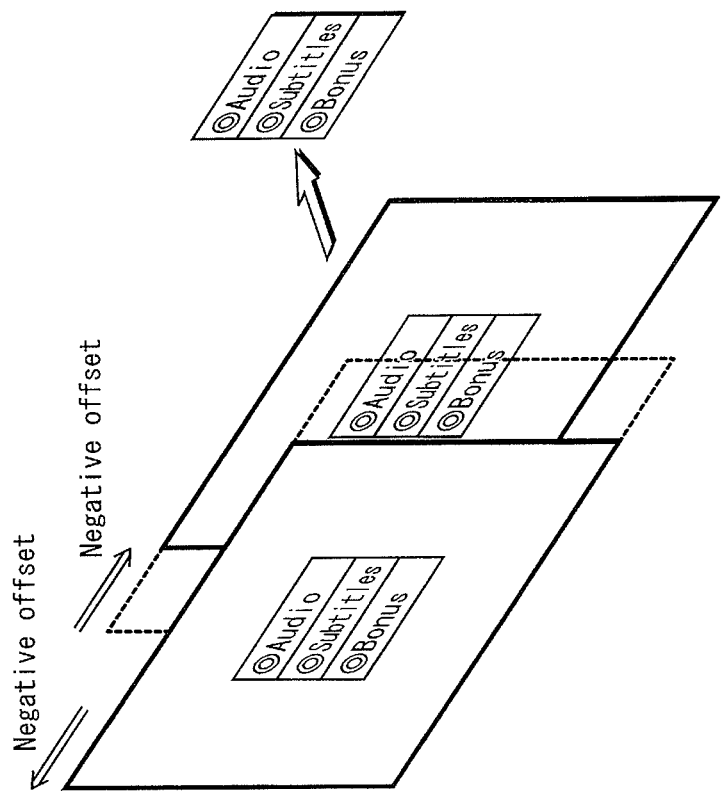
FIGS. 36A and 36B show an example of how the appearance of the planes differs depending on whether the offset is positive or negative.
Figure 36B:
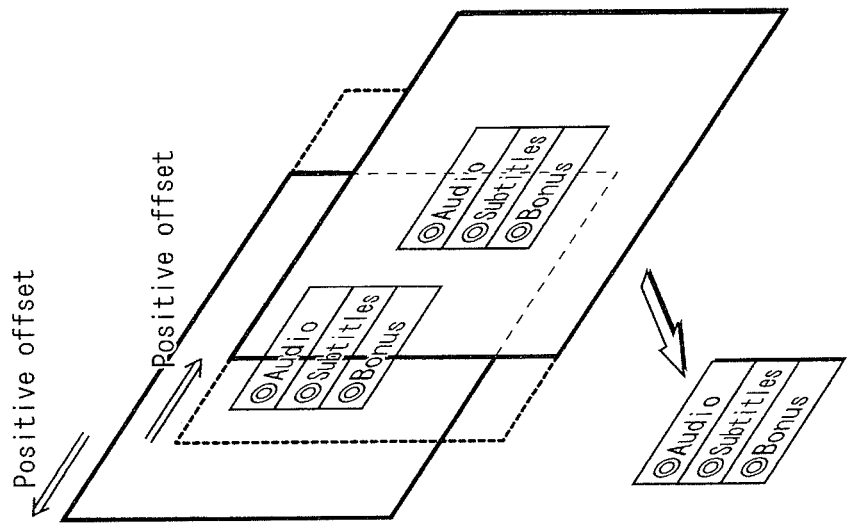

36 Difference Depending on Whether Offset Mode is Positive or Negative in 1plane+Offset Mode FIGS. 36A and 36B show an example of how the appearance of the planes differ depending on whether the offset is positive or negative.

FIG. 36A shows the example in which the rendered image is shifted to the right in the left-view period, and the rendered image is shifted to the left in the right-view period. As a result, the graphics during left-view output appear to the right of the graphics during right-view output, as shown in FIGS. 34A-34C. In other words, the point of convergence (position of focus) is closer than the screen, and thus the graphics also appear closer.

FIG. 36B shows the example in which the rendered image is shifted to the left in the left-view period, and the rendered image is shifted to the right in the right-view period. As a result, the graphics during left-view output appear to the left of the graphics during right-view output, as shown in FIGS. 35A-34C. In other words, the point of convergence (position of focus) is further back than the screen, and thus the graphics also appear further back. This concludes the description of how the stereoscopic video images appear when the current plane setting is the one-plane setting.

36.1 Realizing 1plane+Offset Mode in Graphics Planes

Each of the graphics planes is composed of a plurality of line memories. Pixel data pieces (in the ARBG method) that compose the graphics each are stored in a memory element. The memory elements each have a double-word (32-bit) length, and compose the line memories of each of the graphics planes. The coordinates of the pixel data pieces composing the graphics on the screen correspond to a combination of row addresses indicating line memories of the pixel data pieces in the graphics plane and the column addresses indicating the memory elements in the line memories.

In the 1plane+Offset mode, stereoscopic viewing is realized by providing a horizontal offset to X coordinates of the pixel data pieces in the graphics planes. As described in the above, the coordinates of the pixel data pieces that compose the OSD on the screen correspond to a combination of row addresses indicating the line memories of the pixel data pieces in the graphics plane and column addresses indicating the memory elements in the line memories. Therefore, the coordinates of the pixel data pieces can be shifted to the left or right by increasing and decreasing, by a number of addresses corresponding to the horizontal offset, the number of column addresses indicated by the memory elements of the pixel data pieces of the graphics in the graphics plane. The shifting of addresses of the pixel data pieces can be realized by the copy processing of the pixel data pieces that involves the address adjustment. Here, when it is desired that the X coordinates of the pixel data pieces are shifted by the number of pixels X specified by the horizontal offset, adjustment is made such that the column addresses indicating the memory pixels to which the pixel data pieces are to be copied are shifted back and forth, when the pixel data pieces are copied. When copy is performed on the premises of such adjustment, the coordinates of the pixel data pieces are shifted to the left or right. When the plane composition unit composites layers, the above-described copy is performed between the line memories composing the graphics plane and the line memories in the plane composition unit. When the above-described address adjustment is performed when such copy is performed, the shifting of the graphics plane to the left or right is possible.

Used as an amount by which the graphics planes are shifted to the left or right (shift amount) is the offset in the offset sequence embedded in the access unit of the video streams. In the offset sequence, the horizontal offset is defined for each of the frames in the GOPs. Therefore, how much the pixels pop out in the 1plane+Offset mode is precisely synchronizes with the video streams.

According to the present embodiment described in the above, stereoscopic playback can be easily realized with the one-plane setting. Therefore, the graphics rendering processing by the bytecode application can be facilitated.

Supplemental Remarks

Up to this point, the best mode known to the applicant at the time of filing of the present application has been described. It is naturally appreciated, however, that further improvements or modifications may be made regarding the technological issues shown below. The decision to implement the present invention precisely according to the embodiments or by applying these improvements or modifications is arbitrary; consideration is thus made for the subjectivity of the person implementing the invention.

(Types of Removable Media)

A typical type of the recording medium is a flash medium such as an SD card. However, the type of recording medium may be a USB memory, a removable hard disk and any other types of recording media.

(Error Handling when Rendering Request Cannot be Used)

In the second embodiment, some rendering requests can be used and some cannot be used depending on the selected composition mode. The following processing is desirable as error processing when the rendering request cannot be used.

Firstly, the image rendering request 801 is an API for rendering an image only into the left-view graphics plane 9. Therefore, if the image rendering request 801 is called and executed in the composition mode 1 and the composition mode 3, the composition results will show that only a left-view video image has been updated and a right-view video image has not been updated (i.e., has been left unchanged). In this case, the left-view video image and the right-view video image are different from each other. As such a difference might make the viewer feel uncomfortable, the image rendering request 801 should be prohibited under certain circumstances. To address this issue, the image rendering request 801 is structured to (i) perform the processing of copying an image to the left-view graphics plane 9 only when it is called in the composition mode 2 and the composition mode 4, and (ii) be ignored when it is called in the composition mode 1 and the composition mode 3. Considering that the conventional BD-J specification defines a function equivalent to the image rendering request 801 as an API that does not cause any exceptional operations, the above structure can reliably prevent inconsistency between left-view and right-view video images without conflicting with the conventional BD-J specification.

Alternatively, instead of being ignored, the image rendering request 801 may be structured to cause exceptional operations when it is called in the composition mode 1 and the composition mode 3 (although this structure is different in behavior than that of the conventional BD-J specification).

(Rendering Processing to be Prohibited in Composition Modes 1 and 3)

In the third embodiment, "copying of an image" is the only example described as a rendering request for performing the rendering into the left-view graphics plane. Needless to say, however, other rendering processing of the conventional BD-J specification, such as "filling a square graphic" and "rendering a character string", should also be prohibited during the composition mode 1 and the composition mode 3.

(Handling when Left/Right Images Rendering Request 802 is Made in Composition Modes 1 and 3)

The left/right images rendering request 802 is a function of simultaneously rendering images into the left-view graphics plane 9 and the right-view graphics plane 10, respectively. When called in the composition mode 1 and the composition mode 3, the left/right images rendering request 802 serves its purpose. However, when called in the composition mode 2 and the composition mode 4, the left/right images rendering request 802 only renders a left-view video image; in this case, it is highly likely that calling of the left/right images rendering request 802 is an error made by the BD-J application. To address this issue, the left/right images rendering request 802 is structured to (i) perform the processing of rendering images into both of the left-view and right-view graphics planes only when it is called in the composition mode 1 and the composition mode 3, and (ii) cause exceptional operations when it is called in the composition mode 2 and the composition mode 4.

The left/right images rendering request 802 is an API that should be newly defined since it is not a part of the conventional BD-J specification. Because the left/right images rendering request 802 would not conflict with the conventional BD-J specification even if it causes exceptional operations, it is preferable that the left/right images rendering request 802 be structured to cause exceptional operations in order to certainly notify an error to its developers. Alternatively, the left/right images rendering request 802 may be structured to be ignored, as with the image rendering request 801.

(Handling when Left/Right Images Rendering Request 804 is Made in Composition Modes 3 and 4)

Similarly, the background rendering request 804 serves its purpose only when it is called and executed in the composition mode 3 and the composition mode 4. If the background rendering request 804 were called and executed in the composition mode 1 and the composition mode 2, the composition result would show left-view and right-view images that are different from each other. Thus, calling of the background rendering request 804 should be prohibited in the composition mode 1 and the composition mode 2. To address this issue, the background rendering request 804 is structured to either cause exceptional operations or be ignored when called in the composition mode 1 and the composition mode 2, as with the left/right images rendering request 802.

Similarly, the background rendering request 805 serves its purpose only when it is called in the composition mode 1 and the composition mode 2. It is highly likely that calling of the background rendering request 805 in the composition mode 3 and the composition mode 4 is an error made by the BD-J application. To address this issue, the background rendering request 804 is structured to either cause exceptional operations or be ignored when called in the composition mode 1 and the composition mode 2, as with the left/right images rendering request 802.

As set forth above, the present embodiment limits the composition modes in which rendering requests (especially, the image rendering request 801 and the background rendering request 804) can be accepted. This way, even when the BD-J application attempts to perform rendering processing in an inappropriate composition mode, it is possible to prevent the problem of inconsistency between left-view and right-view video images that could occur on a stereoscopic BD-ROM playback device.

(Avoiding Inconsistency after Rendering Request is Received)

It has been described in the present embodiment that when a prohibited rendering request is issued, the prohibited rendering request is ignored or causes exceptional operations. Alternatively, when a prohibited rendering request is issued, the playback device 200 may accept and process the prohibited rendering request so as not to cause inconsistency between left-view and right-view video images. As one example, when the image rendering request 801 is called in the composition mode 1 or the composition mode 3, the playback device 200 may simultaneously perform the same rendering processing on the left-view graphics plane 9 and the right-view graphics plane 10, instead of performing the rendering processing only on the left-view graphics plane 9. This method can also prevent inconsistency between left-view and right-view video images. As another example, when the left/right images rendering request 802 is called in the composition mode 2 or the composition mode 4, the playback device 200 may extract and execute only a part of the left/right images rendering request 802 that corresponds to the rendering processing to be performed on the left-view graphics plane 9. With this method, the left/right images rendering request 802 can be processed even when only one graphics plane is used. As yet another example, when the image rendering request 801 and the left/right images rendering request 802 are called during a time period in which these requests are both prohibited (such a time period exists during the mode switch processing), the playback device 200 may temporarily suspend these requests, and thereafter resumes the processing for these requests upon completion of the mode switch processing.

(Number Times Switching Between Composition Modes is Performed)

The playback device 200 may switch between the graphics plane settings and between the background plane settings at the same time, by performing single composition mode switch processing for the plane composition unit 20 only once. For example, in a case where it takes time to perform composition mode switch processing, it is preferable to perform such processing all at once. By way of example, assume a case where the playback device 200 has to perform the following operations at the same time: (i) switching the graphics plane setting from the one-plane setting to the two-plane setting; and (ii) switching the background plane setting from the one-plane setting to the two-plane setting (i.e., switching from the composition mode 4 to the composition mode 1). First, the processing of S1001, which is to prohibit a request for rendering an image into one plane, is performed for both of the graphics planes and the background planes. Put another way, both of the image rendering request 801 and the background rendering request 804 are prohibited. Next, the copy processing of S1002 is performed in such a manner that the images of the left-view graphics plane and the left-view background plane are copied to the right-view graphics plane and the right-view background plane, respectively. Subsequently, as the composition mode switch processing of S1003, the composition mode 4 of the plane composition unit 20 is directly switched to the composition mode 1. Finally, the processing of S1004, which is to remove the prohibition on the request for rendering images into two planes, is performed for both of the graphics planes and the background planes. Put another way, the prohibition on both of the left/right images rendering request 802 and the background rendering request 805 is removed.

(Composition Modes in 2D Playback Mode)

It has been described in the third embodiment that, whenever the current composition mode is a one-plane composition mode, the playback device 200 uses left-view planes only. Alternatively, it is possible to select whether to use the left-view planes only, or to use the right-view planes only, even when the current composition mode is the one-plane composition mode. For example, assume a case where a video stream contains information showing which one of the left-view video and the right-view video serves as the main video. In this case, when one graphics plane and one background plane are supposed to be used, the playback device 200 should determine whether it should refer only to the left-view planes or to the right-view planes in compliance with the video stream. Here, the current state showing which one of the left-view video and the right-view video of the video stream serves as the main video is stored in the playback device 200. This way, based on the current state, the playback device 200 can select (i) one of the left-view and right-view graphics planes to refer to in the composition mode 2 and the composition mode 4, and (ii) one of the left-view and right-view background planes to refer to in the composition mode 3 and the composition mode 4. For example, in a case where the right-view video of the video stream serves as the main video, if the playback device 200 switches from a composition mode that uses two graphics planes to a composition mode that uses one graphics plane, then the playback device 200 having the above structure will continuously refer to the content that was rendered in the right-view graphics plane 10 prior to the composition mode switch processing, even after the composition mode switch processing has been performed. That is to say, the playback device 200 having the above structure performs composition mode switch processing that achieves better consistency with the video stream.

(Timing at which Copy is Performed from Right-View Plane to Left-View Plane)

Alternatively, even in each of the composition modes 2 to 4 of the third embodiment (i.e., only the left-view graphics plane and/or the left-view background plane are referred to anytime), a similar effect can be obtained by taking the following procedure: when switching from a composition mode that uses two graphics planes or two background planes to a composition mode that uses one graphics plane or one background plane, the content of the right-view graphics plane or the right-view background plane is copied to the left-view graphics plane or the left-view background plane, only if the right-view video of the video stream serves as the main video.

(Discrimination Between Left-View Video Images and Right-View Video Images)

Although it has been described above that the video stream contains the information showing which one of the left-view video and the right-view video of the video stream should serve as the main video in the third embodiment, such information may be specified by the BD-J application instead.

(Description of 3D Playlist Playback Flow in Object-Oriented Programming Language)

In the each of the above embodiments, 3D playlist playback flow can be written as follows in the object-oriented programming language.

The description when a playlist file 00001.mpls (3D playlist) is about to be played back is as follows.

i) An instance of a BDLocator class whose argument is a file path (bd://1.PLAYLIST:00001) of the playlist file of the 3D playlist is generated. When the instance variable of the BDLocator class is "loc", BDLocator loc=newBDlocator (bd://1.PLAYLIST:00001 is written.

ii) An instance of a MediaLocator class whose argument is a variable name of the instance variable of the BDLocator class is generated. When the variable name of the instance variable of the BDLocator class is "loc", and the variable name of the instance variable in the MediaLocator class is m1, MediaLocator m1=new MediaLocator(loc) is written.

iii) An instance of a javax.media.Manager.createPlayer class whose argument is a variable name of the instance variable of the MediaLocator (i.e. player instance) is generated. When the variable name of the instance variable of the MediaLocator class is m1, and the variable name of the instance variable of the player instance is Player, Player=Manager.createPlayer(m1); is written.

iv) Finally, playback of a playlist starts by calling start( ) which is a member function of the JMF player instance. When the variable name of the instance variable of the player instance is Player, Player.start( ) is written.

(Writing for Stereoscopic Interactive Screen)

When the stereoscopic interactive screen is created that has two button members, writing may be performed as shown in the following (h-1) to (h-9) in the bytecode application.

(h-1) An instance of a full-screen scene of the graphics device is generated with use of the instance of the graphics device as an argument. Specifically, an instance of the HsceneFactory.getinstance( ).getFullScreenScene is generated with use of the instance of Hscreen.getDefaultHscreen ( ).getDefaultHGraphicsDevice as an argument. When the variable name of an instance of HsceneFactory.getinstance ( ).getFullScreenScene is "hs", Hscene hs=HsceneFactory.getinstance( ).getFullScreenScene(Hscreen.get DefaultHscreen( ).getDefaultHGraphicsDevice( ) is written.

(h-2) A setLayout method of Hscene is called with use of the instance of Flowlayout( ) of java.awt as an argument.

When the variable name of an instance of the Hscene class is "hs", hs.setLayout(new FlowLayout( )); is written.

(h-3) An instance of MediaTracker class of java.awt is generated with use of the instance variable of the Hscreen class as an argument. When the variable name of the instance of the Hscreen class is "hs", and the variable of the instance of MediaTracker class is "mt", MediaTracker mt=newMediaTracker(hs) is written.

(h-4) The instance of the image class in a normal state, the instance of the image class in a focus state and the instance of the image class in an action state are generated by calling the StereoGraphics#drawImage with use of the file names of the left-view and right-view image files as arguments.

For example, when the variable name of the instance variable of the image class when the button members are in the normal state is normal, the file name of the left-view image file is "NormalButton1.bmp" and the file name of the right-view image file is "NormalButton2.bmp", Image normal=StereoGraphics#drawImage(x1,y1,x2,y2, NormalButton1.bmp,x3,y3,x4,y4,NormalButton2.bmp) is written.

For example, when the variable name of the instance variable of the image class when the button members are in the focus state, the file name of the left-view image files is "FocusedButton1.bmp" and the file name of the right-view image file is "FocusedButton2.bmp", Image focused=StereoGraphics#drawImage(x1,y1,x2,y2, FocusedButton 1.bmp,x3,y3,x4,y4,FocusedButton2.bmp); is written.

For example, when the variable name of the instance variable of the image class when the button members are in the action state, the file name of the left-view image file is "actionedButton1.bmp" and the file name of the right-view image file is "actionedButton2.bmp", Image actioned=StereoGraphics#drawImage(x1,y1,x2, y2,actionedButton1.bmp,x3,y3,x4,y4, actionedButton2.bmp); is written.

(h-5) A state image in the normal state, a state image in the focus state and a state image in the action state are added to the instance of the MediaTracker class, by calling an addImage method of the MediaTracker with use of the state images as arguments.

When the variable name if the instance of the MediaTracker class is "mt",
mt.addImage(normal,0);
mt.addImage(focused,0);
mt.addImage(actioned,0); is written.

(h-6) The instance of the HGraphicsButton class of java.awt is generated. When the variable name of the instance of the HGraphicsButton class is "hgb1,hgb2", and the button members are in the "normal", "focused" or "auctioned" state,
hgb1=new HGraphicsButton(normal, focused, actioned);
hgb2=new HGraphicsButton(normal, focused, actioned);
is written.

(h-7) The instance of the HGraphicsButton class is added to the instance of the setLayout class with use of add( ) which is the member function of the setLayout class. When the variable name of the instance of the setLayout class is "hs", and the name of the instance of the HGraphicsButton class to be added is "hgb1,hgb2", hs.add(hgb1); hs. add(hgb1) is written.

(h-8) The instance of setLayout class is visualized with use of the setVisible method which is the member function of the setLayout class. When the variable name of the instance of the setLayout class is "hs", hs.setVisible(true); is written.

(h-9) The instance of the HGraphicsButton class is brought into the focus state with use of the requestFocus method which is the member function of the HGraphicsButton class. When the variable name of the instance of the HGraphicsButton class is "hgb1", hgb1.requestFocus( ) is written.

(Connection Between Playback Device 200 and TV 400)

It is desirable that the playback device 200 and the TV 400 are connected to one another through a digital interface having a high bandwidth transfer function.

When connected to another device in the home theater system through the interface, the digital interface having the high bandwidth transfer function make transition to data transfer phase through the negotiation phase, and transfer data.

This negotiation phase recognizes capabilities of TV of the digital interface (including decoding capability, playback capability and display frequency), sets the capabilities in the player setting register and determines a transfer method of subsequent transfer. The negotiation phase includes mutual authentication phase that mutually check the authentication of the other device. The playback device 200 transfers, to TV through this negotiation phase, the pixel data corresponding to one line of picture data in an uncompressed/plain-text format after the layer composition, at a high transfer rate in accordance with the horizontal synchronization period in TV. In a horizontal flyback and a vertical flyback of TV, audio data in the uncompressed/plain-text format is transferred to the other device (including amplifier and speaker) connected to the playback device. In this way, devices such as TV, the amplifier and the speaker can receive the picture data in the uncompressed/plain-text format and audio data in the uncompressed/plain-text format. This realizes the playback output. Also, when the decoding capability exists in the other device with which the playback device 200 communicates, a pass-through transfer of the video stream and the audio stream is possible. With the pass-through transfer, the video stream and audio stream in the compressed/encrypted format can be transferred as they are. The digital interfaces having such high bandwidth transfer function includes HDMIs and USBs.

Integrated Circuit Embodiment

The integrated circuit of the present invention is a system LSI, and includes therein a core part of a logic circuit (i.e. a part corresponding to a logic circuit or a memory element of the hardware elements of the playback device other than a mechanical parts such as a drive unit of the recording medium and a connector that is connected externally. The system LSI is manufactured by packaging a high-density substrate on which bare chips are mounted. With the packaged high-density substrate on which the bare chips are mounted, the bare chips look like one LSI when viewed externally. Such LSI is referred to as a multi-chip module, and is included in the system LSI.

The types of packages are a QFP (Quad Flat Package) and a PGA (Pin Grid Array). The QFP is a system LSI in which pins are attached to four sides of the package. The PGA is an system LSI to which many pins are attached to an entire bottom surface.

These pins function as an interface with a power supplier, a ground and other circuits. Since the pins of the system LSI function as such an interface, the system LSI functions as a core of the playback device when these pins are connected to the other circuits.

Figure 37:
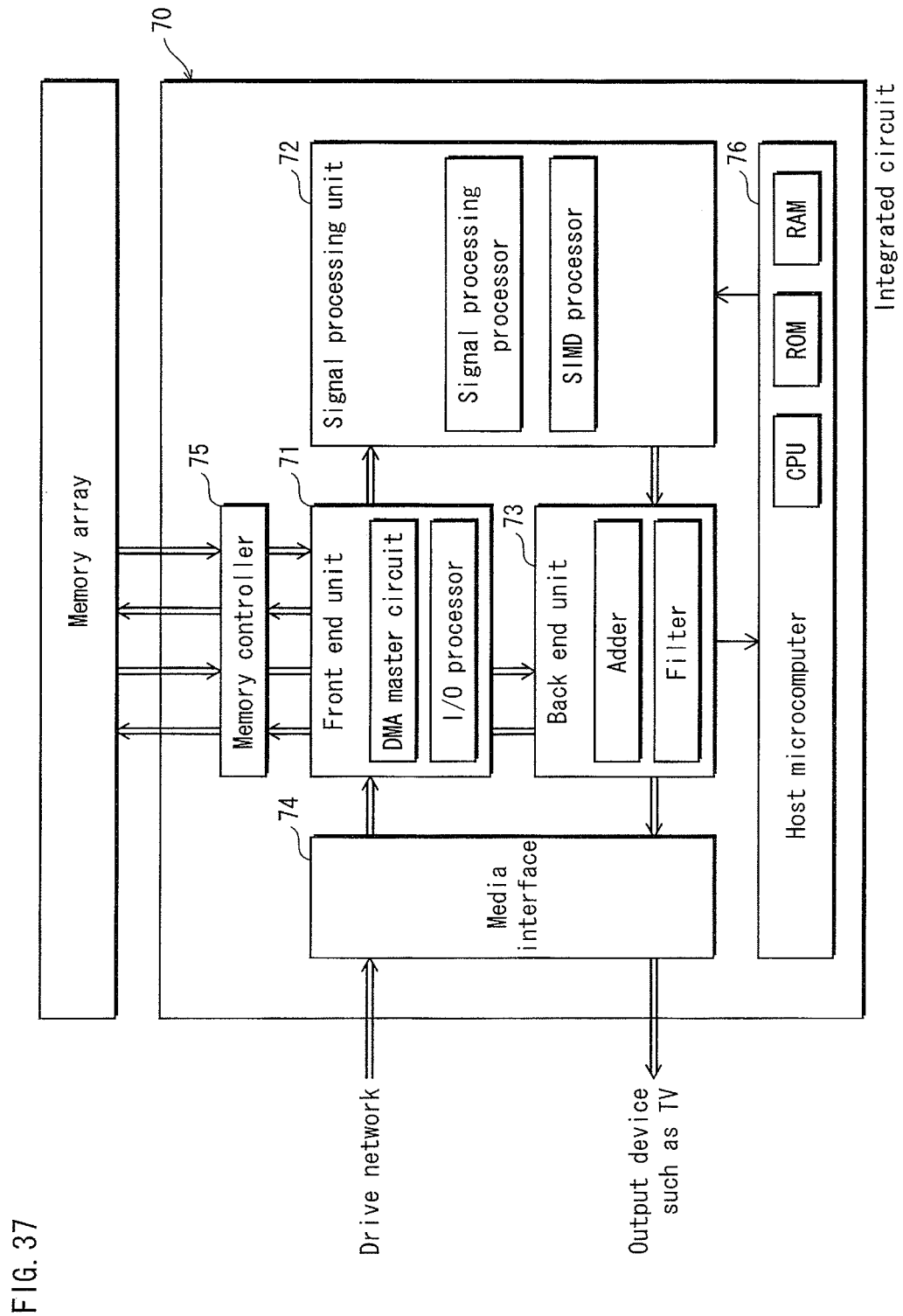
FIG. 37 shows architecture of an integrated circuit.

FIG. 37 shows architecture of an integrated circuit. As shown in FIG. 37, according to the architecture of the integrated circuit 70 (which is a system LSI), the integrated circuit 70 is composed of a front end unit 71, a signal processing unit 72, a back end unit 73, a media interface 74, a memory controller 75 and a host microcomputer 76. The integrated circuit 70 is connected to a drive, a memory and a transmission/reception unit in the playback device through the media interface 74 and a memory controller 75. The drive in the playback device includes a drive of a BD-ROM, a drive of a local storage and a drive of a removable medium, for example.

The front end processing unit 71 is composed of a preprogrammed DMA master circuit and an I/O processor, for example, and executes general packet processing. This packet processing includes processing of restoring an ATC sequence from a stereoscopic interleaved stream file, processing for source packet depacketizer by the demultiplexer and processing for the PID filter. The above-stated stream processing is realized by performing the DMA transfer among the track buffer, various types of plane memories, a coded data buffer in the video decoder and a decoded data buffer in the video decoder.

The signal processing unit 72 is composed of a signal processing processor and an SIMD processor, for example, and executes general signal processing. The signal processing includes decoding by the video decoder and decoding by the audio decoder.

The back end unit 73 is composed of an adder and a filter, and performs general AV output processing. The AV output processing includes pixel processing. The pixel processing includes overlay of images, resizing and image format conversion that are for the layer composition. Also, the above processing is executed together with digital/analog conversion, for example.

The media interface 74 is an interface with a drive and the network.

The memory controller 75 is a slave circuit for memory access. The memory controller 75 realizes reading and writing of packets and picture data in the memory in response to the front end unit, a signal processing unit and a back end unit. Such reading and writing in the memory through the memory controller 75 causes the memory to function as a coded data buffer, a decoded data buffer and an elementary buffer that are included in the video decoder, a coded data buffer, a composition data buffer and an object buffer that are included in the graphics decoder, the track buffer, the video plane and the graphics plane.

The host microcomputer 76 is composed of a CPU, a ROM and a RAM, and executes general control over a media interface, a front end unit, a signal processing unit and an back end unit. Such general control includes control as the control unit, the BD-J module, the HDMV module and the module manager. The CPU included in the host microcomputer 76 has an instruction fetch unit, a decoder, an execution unit, a register file and a program counter. The programs that execute the various types of processing described in the above embodiments are stored in the ROM of a microcomputer of the host microcomputer as embedded program, together with a basic input/output system (BIOS) types of middleware (operation systems). Therefore, main functions of the playback device may be embedded in such a system LSI.

Program Embodiment

Programs shown in the flowcharts in the respective embodiments can be created in the following manner. First, using a programming language, a software developer writes source program to implement each flowchart and the functional elements shown in the flowchart. In accordance with the syntax of the programming language, the software developer writes source program to embody the flowchart and functional elements using class structures, variables, array variables, and calls to external functions.

The written source program is provided to a compiler as a file. The compiler translates this source program into one or more object programs.

Translation by the compiler involves a process of syntax analysis, optimization, resource allocation, and code generation. During syntax analysis, the compiler performs lexical analysis, syntax analysis, and semantic analysis on the source program to convert the source program into intermediate program. During optimization, the compiler divides the intermediate program into basic blocks, performs control flow analysis, and data flow analysis. During resource allocation, in order to adapt to the instruction set of the target processor, the compiler allocates the variables in the intermediate program to the register or the memory of the target processor. During code generation, the compiler converts each intermediate instruction in the intermediate program into program code to obtain object programs.

The generated object programs consist of one or more program code pieces to cause a computer to execute each step in the flowcharts shown in each embodiment and each procedure in the functional elements. There are many varieties of program code, such as the processor's native code, JAVA bytecode, etc. There are many ways to implement each step by a program code. When each step can be implemented using an external function, the call to the external function is the program code. A program code implementing one step may also belong to different object programs. In a RISC processor, in which instruction types are restricted, each step in the flowcharts can be implemented by combining arithmetic calculation instructions, logical calculation instructions, branch instructions, etc.

After object programs are generated, the programmer uses a linker on these object programs. The linker allocates the object programs and associated library programs to memory and combines them to generate a load module. A load module generated in this way is assumed to be read by a computer, and the load module causes a computer to execute the procedures shown in each flowchart and the procedures for the functional elements. The program is recorded on a non-transitional computer readable recording medium and provided to users.

(Variation on Recording Medium)

The recording medium in the embodiments includes package media in general, such as an optical disc, semiconductor memory card, etc. An optical disc with necessary data prerecorded (e.g. an existing readable optical disc, such as a BD-ROM or DVD-ROM) is used as an example of a recording medium in the embodiments. The recording medium need not be limited, however, in this way. For example, 3D contents including the data necessary for implementing the present invention could be broadcast or could be transmitted over a network and then recorded on a writable optical disc (e.g. an existing writeable optical disc, such as a BD-RE or DVD-RAM) using a terminal device having a function to write on an optical disc. This function could be embedded in the playback device, or could be a device separate from the playback device. The optical disc recorded in this way could then be used by a playback device according to the present invention, thereby to practice the present invention.

(Essential Elements of Playback Device)

The left-view video plane and right-view video plane are not essential elements of the playback device. Therefore, just the left-view graphics plane and the right-view graphics plane are enough to compose the playback device. The following describes the reasons for this. Some of the rendering images to be displayed on the graphics planes are moving images.

When these moving images are written in the graphics planes, the problems of the present application can be solved even if the video decoders and video planes are not included in the playback device.

(Essential Elements of Home Theater System)

The shutter glasses 500 are not essential elements but are optional. This is because the shutter glasses 500 are not necessary if the TV 400 is in an integral imaging method (optical playback method) which makes glasses-free stereoscopic viewing possible. The TV 400 and the playback device 200 may be integrated.

(Embodiments as Semiconductor Memory Card Recording Device and Playback Device)

The following describes an embodiment of a semiconductor memory that recodes the data structure described in the above embodiments, and of a playback device that plays back such semiconductor memory.

First, the following describes a mechanism for protecting a copyright of data recorded on a BD-ROM, as the precondition of the following description.

From a standpoint, for example, of improving the confidentiality of data and copyright protection, there are cases in which part of the data recorded on the BD-ROM are encoded as necessary.

For example, the encoded data of the data recorded on the BD-ROM may be, for example, data corresponding to a video stream, data corresponding to an audio stream, or data corresponding to a stream that includes both video and audio.

The following describes deciphering of encoded data, which is part of the data recorded on the BD-ROM.

The semiconductor memory card playback device stores in advance data corresponding to a key necessary for deciphering encoded data on the BD-ROM (for example, a device key).

Meanwhile, the BD-ROM stores data corresponding to the key necessary for deciphering encoded data (for example, an MKB (media key block) corresponding to the device key mentioned above) and data in which the key per se, for deciphering the encoded data, is encoded (for example an encoded title key corresponding to the device key and the MKB). Here, the device key, the MKB, and the encoded title key correspond to each other, and furthermore correspond to an identifier (for example, a volume ID) written in an area that cannot be normally copied on the BD-ROM (an area called BCA). If this combination is not correct, the code cannot be deciphered. Only if the combination is correct, the key necessary for deciphering the code (for example, a decoded title key obtained by decoding the encoded title key based on the device key, the MKB and volume key, can be derived, and with use of the key necessary for the encoding, the encoded data can be deciphered.

When the inserted BD-ROM is played back in the playback device, encoded data cannot be played back unless the BD-ROM includes a device key that is paired with a title key or MKB (or corresponds to a title key or MKB). The reason is that the key necessary for deciphering the encoded data (the title key) per se is recorded in encrypted form on the BD-ROM (as an encoded title key), and if the composition of the MKB and the device key is not correct, the key necessary for deciphering the code cannot be derived.

On the other hand, the playback device is configured so that, if the combination of the encoded title key, MKB, device key, and volume ID is correct, the video stream is decoded, for example with use of the key necessary for deciphering the code (the decoded title key obtained by decoding the encoded title key based on the device key, the MKB and the volume ID), and the audio stream is decoded by the audio decoder.

This completes the description of the mechanism for protecting the copyright of data recorded on the BD-ROM. This mechanism is not necessarily limited to the BD-ROM, and may be applicable to, for example, a readable/writable semiconductor memory (for example, a semiconductor memory card having a nonvolatile property such as an SD card).

The following describes the playback procedure of a semiconductor memory card playback device. In contrast to an optical disk that is configured so that data is read via, for example, an optical disk drive, when using a semiconductor memory card, data may be read via an I/F for reading the data on the semiconductor memory card.

More specifically, when the semiconductor memory card is inserted into a slot (not depicted) in the playback device, the playback device and the semiconductor memory card are electrically connected via the semiconductor memory card I/F. The data recorded on the semiconductor memory card may be read via the semiconductor memory card I/F.

(Embodiment as Receiver)

The playback device described in each of the embodiments can be realized as a terminal device that receives data (distribution data) corresponding to the data described in the embodiment, from the distribution server of the electrical distribution service, and records the semiconductor memory card.

The playback device according to the embodiments described above may be configured to perform the above-mentioned operation of recoding distribution data to a semiconductor memory. Alternatively, the operation for recoding distribution data may be performed by a dedicated terminal device provided separately from the playback device according to the above embodiments. The following describes an example in which the playback device records distribution data and an SD memory card is used as the semiconductor memory for recording the distribution data.

First, the playback device issues a request for transmission of distribution data, to a distribution server (not illustrated) that stores the distribution data when the playback device is to record distribution data into an SD memory card inserted in the slot of the playback device. In so doing, the playback device reads identification information uniquely identifying the inserted SD memory card (for example, identification information uniquely assigned to each SD memory card, more specifically, the serial number or the like of the SD memory card), from the SD memory card, and transmits the identification information to the distribution server together with the distribution request.

The identification information for uniquely identifying the SD memory card corresponds to, for example, the volume ID having been described earlier.

On the other hand, the distribution server stores necessary data (for example, video stream, audio stream and the like) in encrypted form such that the necessary data can be decrypted by using a predetermined key (for example, a title key).

For example, the distribution server holds a private key so that it can dynamically generate different pieces of public key information in correspondence with the respective identification numbers uniquely assigned to each semiconductor memory card.

Also, the distribution server is structured to be able to encrypt the key (title key) per se that is necessary for decrypting the encrypted data (that is to say, the distribution server is structured to be able to generate an encrypted title key).

The generated public key information includes, for example, information corresponding to the above-described MKB, volume ID, and encrypted title key. With a correct combination of (i) the identification number of the semiconductor memory card, (ii) the public key contained in the public key information which will be explained later, and (iii) the device key that is recorded in advance in the playback device, a key (for example, a title key that is obtained by decrypting the encrypted title key by using the device key, the MKB, and the identification number of the semiconductor memory) necessary for decrypting the encrypted data is obtained, and the encrypted data is decrypted by using the obtained necessary key (title key).

Following this, the playback device records the received piece of public key information and distribution data into a recording area of the semiconductor memory card being inserted in the slot thereof.

Next, a description is given of an example of the method for decrypting and playing back the encrypted data among the data contained in the public key information and distribution data recorded in the recording area of the semiconductor memory card.

The received public key information includes, for example, a public key (for example, the above-described MKB and encrypted title key), signature information, identification number of the semiconductor memory card, and device list being information regarding devices to be invalidated.

The signature information includes, for example, a hash value of the public key information.

The device list is, for example, information for identifying the devices that might execute unauthorized playback. This is, for example, information for uniquely specifying devices that may be used without authorization, the parts included in the device, and the functions (programs). This information may be the device key previously recorded in the device, the device identification number, or the identification number of the decoder provided with the device.

Playback of the encrypted data within the distribution data recorded in the recording area of the semiconductor memory card will be explained.

First, before decoding the data encrypted by using the public key itself, checks are carried out to determine whether or not it is best to allow use of the decoding key itself.

Specifically, (1) a check on whether the identification information of the semiconductor memory card contained in the public key information matches the identification number of the semiconductor memory card preliminarily stored in the semiconductor memory card;

(2) a check on whether the hash value of the public key information calculated in the playback device matches the hash value included in the signature information; and (3) a check, based on the information included in the device list, on whether the playback device to perform the playback is authentic (for example, the device key shown in the device list included in the public key information matches the device key preliminarily stored in the playback device).

These checks (1), (2) and (3) may be performed in any order.

After the above described checks (1) through (3), the playback device performs a control not to decrypt the encrypted data when any of the following conditions is satisfied:

(i) the identification information of the semiconductor memory card contained in the public key information does not match the identification number of the semiconductor memory card preliminarily stored in the semiconductor memory card;

(ii) the hash value of the public key information calculated in the playback device does not match the hash value included in the signature information; and (iii) the playback device to perform the playback is not authentic.

On the other hand, suppose that all of the following conditions (i), (ii) and (iii) are satisfied: (i) the identification information of the semiconductor memory card contained in the public key information matches the identification number of the semiconductor memory card preliminarily stored in the semiconductor memory card; (ii) the hash value of the public key information calculated in the playback device matches the hash value included in the signature information; and (iii) the playback device to perform the playback is authentic, are satisfied. In that case, it is judged that the combination of the identification number of the semiconductor memory, the public key contained in the public key information, and the device key that is preliminarily recorded in the playback device, is correct, and the encrypted data is decrypted by using the key necessary for the decryption (the title key that is obtained by decrypting the encrypted title key by using the device key, the MKB, and the identification number of the semiconductor memory).

When the encrypted data is, for example, a video stream and an audio stream, the video decoder decrypts (decodes) the video stream by using the above-described key necessary for the decryption (the title key that is obtained by decrypting the encrypted title key), and the audio decoder decrypts (decodes) the audio stream by using the above-described key necessary for the decryption.

With such a structure, when devices, parts of the devices, and functions (programs) that might be used in an unauthorized manner are known at the time of the electronic distribution, a device list showing such devices and the like may be distributed. This enables the playback device having received the list to inhibit the decryption with use of the public key information (public key per se) when the playback device includes anything shown in the list. Therefore, even if the combination of the identification number of the semiconductor memory, the public key per se contained in the public key information, and the device key that is preliminarily recorded in the playback device, is correct, a control is performed not to decrypt the encrypted data. This makes it possible to prevent the distribution data from being used by an unauthentic device.

INDUSTRIAL APPLICABILITY

The present invention relates to a technique of suppressing tearing occurring at video image outputs in the playback device that plays back the stereoscopic video images, and is suitably applicable to a playback device that has function of switching between a playback mode for monoscopically playing back video images and a mode for stereoscopically playing back video images.

REFERENCE SIGNS LIST

1 BD-ROM drive
4 video decoder
5 left-view video plane
6 right-view video plane
7 image memory
8 image decoder
9 left-view graphics plane
10 right-view graphics plane
15 BD-J module
20 plane composition unit
22 rendering engine
28 left-view background plane
29 right-view background plane
30 left-view subtitle plane 31 right-view subtitle plane
100 BD-ROM
200 playback device
300 remote control
400 display
500 shutter/polarization glasses

The invention claimed is:

1. A playback device, comprising:
a platform configured to activate and execute a bytecode application, the bytecode application issuing a request for rendering graphics;
a left-view graphics plane and a right-view graphics plane; and
a renderer that receives and accepts the request and renders the graphics in response to the request;
a switch configured to switch a current plane setting between a one-plane setting and a two-plane setting, the one-plane setting being a setting with which one of the left-view graphics plane and the right-view graphics plane is used for rendering the graphics at a time of monoscopic playback and stereoscopic playback of the graphics, the two-plane setting being a setting with which both of the left-view graphics plane and the right-view graphics plane are used for rendering the graphics at a time of stereoscopic playback of the graphics, wherein
the request is either a request for rendering 2D graphics or a request for rendering 3D graphics,
the renderer, when accepting the request for rendering the 2D graphics when the current plane setting is the one-plane setting, renders the 2D graphics by using the one of the left-view graphics plane and the right-view graphics plane, and when accepting the request for rendering the 3D graphics when the current plane setting is the two-plane setting, renders the 3D graphics by using both of the left-view graphics plane and the right-view graphics plane, and
when the switch switches the current plane setting from the one-plane setting to the two-plane setting and the request for rendering the 2D graphics has been issued before the switch switches the current plane setting from the one-plane setting to the two-plane setting, the renderer, before accepting the request for rendering the 3D graphics, performs first processing of invalidating the request for rendering the 2D graphics, second processing of copying the 2D graphics stored in the one of the left-view graphics plane and the right-view graphics plane having been used for rendering the 2D graphics to the other of the left-view graphics plane and the right-view graphics plane, and third processing of outputting the 2D graphics stored in each of the left-view graphics plane and the right-view graphics plane.

2. The playback device of claim 1, further comprising:
a decoder configured to decode a stereoscopic video stream stored on a recording medium to obtain first viewpoint picture data and second viewpoint picture data;
a first viewpoint video plane configured to store therein the first viewpoint picture data;
a second viewpoint video plane configured to store therein the second viewpoint picture data;
a composer configured to perform first viewpoint composition and second viewpoint composition,
the first viewpoint composition composing the graphics stored in the one of the left-view graphics plane and the right-view having been used for rendering the 2D graphics with the first viewpoint picture data; and
the second viewpoint composition composing the graphics stored in the other of the left-view graphics plane and the right-view graphics plane with the second viewpoint picture data, wherein
when the switch switches the current plane setting from the one-plane setting to the two-plane setting, the composer starts composing the graphics stored in the other of the left-view graphics plane and the right-view graphics plane with the second viewpoint picture data after the renderer has copied the graphics stored in the one of the left-view graphics plane and the right-view having been used for rendering the 2D graphics to the other of the left-view graphics plane and the right-view graphics plane, and
the renderer accepts the request for rendering the 3D graphics after the composer has composed the graphics stored in the other of the left-view graphics plane and the right-view graphics plane with the second viewpoint picture data.

3. The playback device of claim 2, wherein
the switch switches the current plane setting from the two-plane setting to the one-plane setting after the renderer invalidates the request for rendering the 3D graphics, the composer composes the graphics stored in the one of the left-view graphics plane and the right-view graphics plane having been used for rendering the 2D graphics with the first viewpoint picture data and the renderer accepts the request for rendering the 2D graphics from the bytecode application after the composer has composed the graphics stored in the one of the left-view graphics plane and the right-view graphics plane having been used for rendering the 2D graphics with the first viewpoint picture data.

4. The playback device of claim 3, wherein
the switch switches the current plane setting between the one-plane setting and the two-plane setting in response to an issuance of a plane setting request from the bytecode application, and
the request for rendering the 2D graphics to be invalidated follows the plane setting request.

5. The playback device of claim 4, wherein
the plane setting request is a code for calling an API for plane setting,
an argument in the code for calling the API for the plane setting specifies one of the one-plane setting and the two-plane setting,
the request for rendering the 2D graphics is a code for calling an API for rendering 2D graphics, and
the renderer invalidates the request for rendering the 2D graphics by an exceptional operation of ending the code for calling the API for rendering the 2D graphics that follows the code for calling the API of the plane setting.

6. The playback device of claim 5, wherein
the platform causes the bytecode application and the renderer to perform multi-thread processing,
the request for rendering the 2D graphics and the plane setting request are made by thread-to-thread transfer of the code pieces for calling the APIs between the bytecode application and the renderer, and
the renderer invalidates the request for rendering the 2D graphics by deleting the request for rendering the 2D graphics during the thread-to-thread transfer.

7. The playback device of claim 5, wherein
the API for rendering the 2D graphics is java.awt.Graphics#drawImage API, and
the API for the plane setting is a HAVi screen configuration setting in a HAVi graphics device.

8. The playback device of claim 3, wherein
the renderer includes a left/right plane rendering module that renders, exclusively in a 3D playback mode, the graphics simultaneously in each of the left-view graphics plane and the right-view graphics plane,
the renderer accepts the request for rendering the 3D graphics by starting the left/right plane rendering module, and
the renderer invalidates the request for rendering the 3D graphics by ending the left/right plane rendering module.

9. The playback device of claim 1, wherein
a recording medium has a plurality of contents recorded thereon,
when specific content is selected as a current playback target, the platform activates and executes the bytecode application according to an application management table associated with the current playback target, and
the current plane setting is determined according to plane setting information contained in an operation mode object at a time of start of playback of a content.

10. The playback device of claim 9, wherein
the plane setting information includes a resolution code, and
the resolution code defines a number of horizontal pixels and a number of vertical pixels.

11. A playback method that is used in a computer that includes a platform that activates and executes a bytecode application, the bytecode application issuing a request for rendering graphics, and a left-view graphics plane and a right-view graphics plane, the method comprising:
receiving the request from the bytecode application; and
switching a current plane setting between a one-plane setting and a two-plane setting, the one-plane setting being a setting with which one of the left-view graphics plane and the right-view graphics plane is used for rendering the graphics at a time of monoscopic playback and stereoscopic playback of the graphics, the two-plane setting being a setting with which both of the left-view graphics plane and the right-view graphics plane are used for rendering the graphics at a time of stereoscopic playback of the graphics, wherein
the request is either a request for rendering 2D graphics or a request for rendering 3D graphics, and
when the switching switches the current plane setting from the one-plane setting to the two-plane setting and the request for rendering the 2D graphics has been issued before the switching switches the current plane setting from the one-plane setting to the two-plane setting, before the request for rendering the 3D graphics is accepted, first processing is performed of invalidating the request for rendering the 2D graphics, second processing is performed of copying the 2D graphics stored in the one of the left-view graphics plane and the right-view graphics plane having been used for rendering the 2D graphics to the other of the left-view graphics plane and the right-view graphics plane, and third processing is performed of outputting the 2D graphics stored in each of the left-view graphics plane and the right-view graphics plane.

12. A non-transitory computer readable recording medium storing a program that operates on a computer that includes a platform that activates and executes a bytecode application, the bytecode application issuing a request for rendering graphics, and a left-view graphics plane and a right-view graphics plane, the program causing the computer to perform:
receiving the request from the bytecode application; and
switching a current plane setting between a one-plane setting and a two-plane setting, the one-plane setting being a setting with which one of the left-view graphics plane and the right-view graphics plane is used for rendering the graphics at a time of monoscopic playback and stereoscopic playback of the graphics, the two-plane setting being a setting with which both of the left-view graphics plane and the right-view graphics plane are used for rendering the graphics at a time of stereoscopic playback of the graphics, wherein
the request is either a request for rendering 2D graphics or a request for rendering 3D graphics, and
when the switching switches the current plane setting from the one-plane setting to the two-plane setting and the request for rendering the 2D graphics has been issued before the switching switches the current plane setting from the one-plane setting to the two-plane setting, before the request for rendering the 3D graphics is accepted, first processing is performed of invalidating the request for rendering the 2D graphics, second processing is performed of copying the 2D graphics stored in the one of the left-view graphics plane and the right-view graphics plane having been used for rendering the 2D graphics to the other of the left-view graphics plane and the right-view graphics plane, and third processing is performed of outputting the 2D graphics stored in each of the left-view graphics plane and the right-view graphics plane.

* * * * *